US008216045B2

(12) United States Patent
Wright et al.

(10) Patent No.: US 8,216,045 B2
(45) Date of Patent: Jul. 10, 2012

(54) METHOD AND APPARATUS FOR PROVIDING A LOTTERY

(75) Inventors: Robert J. Wright, Palm Beach Gardens, FL (US); Michael D. Frick, Crawfordville, FL (US)

(73) Assignee: Integrated Group Assets Inc., Crawfordville, FL (US)

(*) Notice: Subject to any disclaimer, the term of this patent is extended or adjusted under 35 U.S.C. 154(b) by 816 days.

(21) Appl. No.: 12/045,653

(22) Filed: Mar. 10, 2008

(65) Prior Publication Data

US 2008/0254853 A1 Oct. 16, 2008

Related U.S. Application Data

(63) Continuation-in-part of application No. 12/034,657, filed on Feb. 20, 2008, which is a continuation-in-part of application No. 11/315,417, filed on Dec. 21, 2005, which is a continuation-in-part of application No. 11/044,427, filed on Jan. 26, 2005, now Pat. No. 7,635,304, which is a continuation-in-part of application No. 11/043,913, filed on Jan. 25, 2005, now Pat. No. 7,347,776, said application No. 12/045,653 is a continuation-in-part of application No. 10/879,939, filed on Jun. 28, 2004, now Pat. No. 7,635,303, which is a continuation-in-part of application No. 10/876,390, filed on Jun. 25, 2004, now Pat. No. 7,635,302, said application No. 12/045,653 is a continuation-in-part of application No. 10/766,656, filed on Jan. 27, 2004, now abandoned, and a continuation-in-part of application No. 10/987,474, filed on Nov. 12, 2004, now abandoned.

(51) Int. Cl.
*G06F 17/00* (2006.01)

(52) U.S. Cl. .......................................................... 463/17
(58) Field of Classification Search ............... 463/16–25
See application file for complete search history.

(56) References Cited

U.S. PATENT DOCUMENTS 4,087,092 A 5/1978 Krause et al.
(Continued)

FOREIGN PATENT DOCUMENTS

WO WO 9408673 4/1994
(Continued)

OTHER PUBLICATIONS

Arrow International, Inc. "Game Patterns" [online]. Oct. 2000 [retrieved Dec. 3, 2008 from the Internet]. URL: http://arrowinternational.com/homepage_images/pdf/bingo%20game%20patterns.pdf.

(Continued)

*Primary Examiner* — Ronald Laneau
(74) *Attorney, Agent, or Firm* — Samuel K. Simpson; Patent Ingenuity, P.C.

(57) ABSTRACT

A process provides a first price category and a second price category in which a lottery ticket can be purchased for a lottery game. The first price category is distinct from the second price category. The first price category corresponds to a first known portion of a linear prize and a first known portion of a non-linear prize associated with the lottery game. Further, the second price category corresponds to a second known portion of a linear prize and a second known portion of a non-linear prize associated with the lottery game. The second known portion of the linear prize is more than the first known portion of the linear prize, the second known portion of the non-linear prize being more than the first known portion of the non-linear prize.

70 Claims, 53 Drawing Sheets

U.S. PATENT DOCUMENTS

| | | | |
|---|---|---|---|
| 4,157,829 | A | 6/1979 | Goldman et al. |
| 4,494,197 | A | 1/1985 | Troy et al. |
| 4,652,998 | A | 3/1987 | Koza et al. |
| 4,689,742 | A | 8/1987 | Troy et al. |
| 5,083,784 | A | 1/1992 | Nilssen |
| 5,116,049 | A | 5/1992 | Sludikoff et al. |
| 5,158,293 | A | 10/1992 | Mullins |
| 5,193,815 | A | 3/1993 | Pollard |
| 5,232,221 | A | 8/1993 | Sludikoff et al. |
| 5,280,909 | A | 1/1994 | Tracy |
| 5,282,620 | A | 2/1994 | Keesee |
| 5,286,023 | A | 2/1994 | Wood |
| 5,380,007 | A | 1/1995 | Travis et al. |
| 5,482,289 | A | 1/1996 | Weingardt |
| 5,545,088 | A | 8/1996 | Kravitz et al. |
| 5,641,167 | A | 6/1997 | Behm et al. |
| 5,647,798 | A | 7/1997 | Falciglia |
| 5,755,619 | A | 5/1998 | Matsumoto et al. |
| 5,772,510 | A | 6/1998 | Roberts |
| RE35,864 | E | 7/1998 | Weingardt |
| 5,779,545 | A | 7/1998 | Berg et al. |
| 5,851,149 | A | 12/1998 | Xidos et al. |
| 5,855,514 | A | 1/1999 | Kamille |
| 5,935,002 | A | 8/1999 | Falciglia |
| 5,979,894 | A | 11/1999 | Alexoff |
| 6,000,725 | A | 12/1999 | Nicolosi et al. |
| 6,017,032 | A | 1/2000 | Grippo et al. |
| 6,080,062 | A | 6/2000 | Olson |
| 6,099,407 | A | 8/2000 | Parker, Jr. et al. |
| 6,105,007 | A | 8/2000 | Norris |
| 6,120,378 | A | 9/2000 | Moody et al. |
| 6,168,521 | B1 | 1/2001 | Luciano et al. |
| 6,220,959 | B1 | 4/2001 | Holmes, Jr. et al. |
| 6,234,899 | B1 | 5/2001 | Nulph |
| 6,241,606 | B1 | 6/2001 | Riendeau et al. |
| 6,280,325 | B1 | 8/2001 | Fisk |
| 6,296,569 | B1 | 10/2001 | Congello, Jr. |
| 6,305,687 | B1 | 10/2001 | Pollock et al. |
| 6,368,213 | B1 | 4/2002 | McNabola |
| 6,368,218 | B2 | 4/2002 | Angell, Jr. |
| 6,371,855 | B1 | 4/2002 | Gavriloff |
| 6,398,645 | B1 | 6/2002 | Yoseloff |
| 6,416,408 | B2 | 7/2002 | Tracy et al. |
| 6,477,251 | B1 | 11/2002 | Szrek et al. |
| 6,514,144 | B2 | 2/2003 | Riendeau et al. |
| 6,527,175 | B1 | 3/2003 | Dietz et al. |
| 6,547,242 | B1 | 4/2003 | Sugiyama et al. |
| 6,554,710 | B1 | 4/2003 | Olson |
| 6,572,106 | B2 | 6/2003 | Alexoff |
| 6,581,935 | B1 | 6/2003 | Odom |
| 6,599,188 | B2 | 7/2003 | Hirsch et al. |
| 6,602,138 | B2 | 8/2003 | Nulph |
| 6,648,753 | B1 | 11/2003 | Tracy et al. |
| 6,666,767 | B1 | 12/2003 | Dayan |
| 6,692,354 | B2 | 2/2004 | Tracy et al. |
| 6,702,288 | B1 | 3/2004 | Ohman |
| 6,702,668 | B2 | 3/2004 | Banyai |
| 6,830,514 | B2 | 12/2004 | Meyer et al. |
| 6,874,783 | B2 | 4/2005 | Higginson |
| 6,918,589 | B2 | 7/2005 | Thibault |
| 6,935,948 | B2 | 8/2005 | Wright |
| 6,942,570 | B2 | 9/2005 | Schneier et al. |
| 6,969,067 | B1 | 11/2005 | Borruso |
| 7,666,084 | B2 | 2/2010 | Herrmann et al. |
| 7,883,405 | B2 | 2/2011 | Robb |
| 2002/0022511 | A1 | 2/2002 | Eklund et al. |
| 2002/0072404 | A1 | 6/2002 | Gerow |
| 2002/0094859 | A1 | 7/2002 | Hirsch et al. |
| 2002/0142829 | A1 | 10/2002 | Inoue |
| 2002/0142844 | A1 | 10/2002 | Kerr |
| 2002/0155876 | A1 | 10/2002 | Taylor et al. |
| 2003/0003984 | A1 | 1/2003 | Petruzzi |
| 2003/0045339 | A1 | 3/2003 | Ghela |
| 2003/0047869 | A1 | 3/2003 | Walker |
| 2003/0050109 | A1 | 3/2003 | Caro et al. |
| 2003/0069059 | A1 | 4/2003 | Stanek |
| 2003/0080507 | A1 | 5/2003 | Higginson |
| 2003/0134672 | A1 | 7/2003 | Fulton |
| 2003/0144050 | A1 | 7/2003 | Keaton et al. |
| 2003/0154094 | A1 | 8/2003 | Bredemeier et al. |
| 2003/0178770 | A1 | 9/2003 | Stewart |
| 2003/0178771 | A1 | 9/2003 | Banyai |
| 2003/0181231 | A1 | 9/2003 | Vancura et al. |
| 2003/0186735 | A1 | 10/2003 | Byrne |
| 2003/0187765 | A1 | 10/2003 | Sgaraglio |
| 2003/0190959 | A1 | 10/2003 | Olson |
| 2003/0224847 | A1 | 12/2003 | Jaimet |
| 2003/0226028 | A1 | 12/2003 | Kra |
| 2003/0232651 | A1 | 12/2003 | Huard et al. |
| 2004/0009806 | A1 | 1/2004 | Odom |
| 2004/0029630 | A1 | 2/2004 | Walker et al. |
| 2004/0053011 | A1 | 3/2004 | Behm et al. |
| 2004/0058726 | A1 | 3/2004 | Klugman |
| 2004/0088203 | A1 | 5/2004 | Kakuwa et al. |
| 2004/0103011 | A1 | 5/2004 | Hatano et al. |
| 2004/0110554 | A1 | 6/2004 | Bromfield |
| 2004/0110556 | A1 | 6/2004 | Bromfield |
| 2004/0139032 | A1 | 7/2004 | Rowan |
| 2004/0166919 | A1 | 8/2004 | Duhamel et al. |
| 2004/0166929 | A1 | 8/2004 | Tarantino |
| 2004/0173965 | A1 | 9/2004 | Stanek |
| 2004/0245722 | A1 | 12/2004 | Henderson |
| 2004/0259628 | A1 | 12/2004 | Randall |
| 2005/0003884 | A1 | 1/2005 | Meyer et al. |
| 2005/0014551 | A1 | 1/2005 | Packes, Jr. et al. |
| 2005/0059464 | A1 | 3/2005 | Bozeman |
| 2005/0064930 | A1 | 3/2005 | Jubinville et al. |
| 2005/0148382 | A1 | 7/2005 | Fox |
| 2005/0164767 | A1 | 7/2005 | Wright |
| 2005/0164768 | A1 | 7/2005 | Wright |
| 2005/0164769 | A1 | 7/2005 | Wright |
| 2005/0164770 | A1 | 7/2005 | Wright |
| 2005/0165619 | A1 | 7/2005 | Wright |
| 2005/0181858 | A1 | 8/2005 | Caro et al. |
| 2005/0192088 | A1 | 9/2005 | Hartman et al. |
| 2006/0100008 | A1 | 5/2006 | Wright |
| 2006/0151943 | A1 | 7/2006 | Bozeman |
| 2006/0160602 | A1 | 7/2006 | Blythe et al. |
| 2006/0172793 | A1 | 8/2006 | Desposito |
| 2006/0217181 | A1 | 9/2006 | Jubinville |
| 2008/0132314 | A1 | 6/2008 | Robb et al. |
| 2008/0254851 | A1 | 10/2008 | Wright et al. |
| 2008/0254853 | A1 | 10/2008 | Wright et al. |
| 2008/0300041 | A1* | 12/2008 | Strutt et al. .................... 463/17 |
| 2009/0247255 | A1* | 10/2009 | Batoff et al. .................... 463/17 |
| 2009/0264177 | A1* | 10/2009 | Walker et al. .................... 463/17 |
| 2010/0185523 | A1* | 7/2010 | Tulley et al. .................... 705/20 |
| 2010/0203951 | A1* | 8/2010 | Frick .............................. 463/22 |

FOREIGN PATENT DOCUMENTS

| | | |
|---|---|---|
| WO | WO 01/18759 | 3/2001 |
| WO | WO 01/42968 | 6/2001 |
| WO | WO 02/07018 | 1/2002 |
| WO | WO 02/27424 | 4/2002 |
| WO | WO 03022380 | 3/2003 |
| WO | WO 03/091958 | 11/2003 |

OTHER PUBLICATIONS

McQueen, Patricia A. “Lotteries offer add-on games attached to existing online options.” International Gaming & Wagering Business, Apr. 2004, pp. 22, 26-27.

Patel, Freny, “Lottery firms seek cover for jackpots,” www.rediff.com, Jul. 4, 2003.

www.littlewoodsgameon.com/gameon/new/Games/sports.html, Jan. 12, 2006.

International Search Report for PCT/US2008/080236, Dec. 24, 2008.

* cited by examiner

Ticket Number

| | | | | | | |
|---|---|---|---|---|---|---|
| 13 | 7 | 41 | 20 | 31 | 24 | 2 |

500

| | | | | | | |
|---|---|---|---|---|---|---|
| 10 | 38 | 4 | 28 | 44 | 16 | 30 |
| 48 | 27 | 14 | 35 | 5 | 25 | 43 |
| 6 | 18 | 41 | 13 | 40 | 2 | 20 |
| 32 | 1 | 19 | 22 | 29 | 7 | 39 |
| 11 | 15 | 34 | 9 | 46 | 49 | 12 |
| 36 | 42 | 45 | 17 | 26 | 23 | 47 |
| 24 | 8 | 21 | 3 | 37 | 31 | 33 |
| 10 | 48 | 6 | 32 | 11 | 36 | 24 |
| 38 | 27 | 18 | 1 | 15 | 42 | 8 |
| 4 | 14 | 41 | 19 | 34 | 45 | 21 |
| 28 | 35 | 13 | 22 | 9 | 17 | 3 |
| 44 | 5 | 40 | 29 | 46 | 26 | 37 |
| 16 | 25 | 2 | 7 | 49 | 23 | 31 |
| 30 | 43 | 20 | 39 | 12 | 47 | 33 |
| 24 | 42 | 34 | 22 | 40 | 25 | 30 |
| 10 | 27 | 41 | 22 | 46 | 23 | 33 |

700

Fig. 7

Ticket Number

| | | | | | | |
|---|---|---|---|---|---|---|
| 13 | 40 | 41 | 20 | 18 | 6 | 2 |

902

Players Game Board

| | | | | | | |
|---|---|---|---|---|---|---|
| 10 | 38 | 4 | 28 | 44 | 16 | 30 |
| 48 | 27 | 14 | 35 | 5 | 25 | 43 |
| **6** | **18** | **41** | **13** | **40** | **2** | **20** |
| 32 | 1 | 19 | 22 | 29 | 7 | 39 |
| 11 | 15 | 34 | 9 | 46 | 49 | 12 |
| 36 | 42 | 45 | 17 | 26 | 23 | 47 |
| 24 | 8 | 21 | 3 | 37 | 31 | 33 |

502

Fig. 9A

Ticket Number

| | | | | | | |
|---|---|---|---|---|---|---|
| 16 | 7 | 49 | 20 | 31 | 24 | 2 |

908

Players Game Board

| | | | | | | |
|---|---|---|---|---|---|---|
| 10 | 38 | 4 | 28 | 44 | **16** | 30 |
| 48 | 27 | 14 | 35 | 5 | 25 | 43 |
| 6 | 18 | 41 | 13 | 40 | **2** | 20 |
| 32 | **1** | 19 | 22 | 29 | **7** | 39 |
| 11 | 15 | 34 | 9 | 46 | **49** | 12 |
| 36 | 42 | 45 | 17 | 26 | 23 | 47 |
| 24 | 8 | 21 | 3 | 37 | **31** | 33 |

502

Fig. 9C

Ticket Number

| | | | | | | | |
|---|---|---|---|---|---|---|---|
| 13 | 7 | 41 | 20 | 31 | 24 | 2 | 50 |

1102

Players Game Board

| | | | | | | | |
|---|---|---|---|---|---|---|---|
| 10 | 38 | 64 | 28 | 44 | 58 | 30 | 16 |
| 48 | 53 | 14 | 60 | 5 | 25 | 43 | 59 |
| 6 | 18 | 41 | 13 | 55 | 2 | 62 | 4 |
| 32 | 57 | 50 | 22 | 29 | 7 | 39 | 51 |
| 11 | 15 | 34 | 9 | 46 | 49 | 12 | 27 |
| 52 | 42 | 45 | 61 | 26 | 54 | 47 | 17 |
| 24 | 8 | 21 | 3 | 63 | 31 | 33 | 37 |
| 56 | 1 | 17 | 35 | 40 | 23 | 20 | 36 |

1104

Fig. 11

1700

Jackpot = $2,500,000

| Price Category | Jackpot % |
|---|---|
| $5 | 100% |
| $4 | 60% |
| $3 | 40% |
| $2 | 20% |

Fig. 17

2600

2602 2604 2606 2608

| Instant Game Ticket Price | $2 | $3 | $4 | $5 |
|---|---|---|---|---|
| | $1,000 | $2,500 | $10,000 | $50,000 |
| | $100 | $250 | $500 | $2,500 |
| | $20 | $50 | $250 | $500 |
| | $10 | $20 | $100 | $100 |
| | $5 | $10 | $50 | $50 |
| | Free Ticket | $5 | $20 | $20 |
| | | Free Ticket | $10 | $10 |
| | | | Free Ticket | Free Ticket |

Fig. 26

2802

| Jackpot |
| --- |
| $2,500,000 |

| Instant Lottery Ticket Price | $2 | $3 | $4 | $5 |
| --- | --- | --- | --- | --- |

2804

| | | | | |
| --- | --- | --- | --- | --- |
| Complete match | $500,000 | $1,000,000 | $1,500,000 | $2,500,000 |
| First partial match | $1,000 | $1,500 | $2,000 | $2,500 |
| Second partial match | $10 | $15 | $20 | $25 |
| Third partial match | $2 | $2 | $2 | $2 |

2806

| | | | | |
| --- | --- | --- | --- | --- |
| Instant Game Prizes | $1,000 | $2,500 | $10,000 | $50,000 |
| | $100 | $250 | $500 | $2,500 |
| | $20 | $50 | $250 | $500 |
| | $10 | $20 | $100 | $100 |
| | $5 | $10 | $50 | $50 |
| | Free Ticket | $5 | $20 | $20 |
| | | Free Ticket | $10 | $10 |
| | | | Free Ticket | Free Ticket |

Fig. 28

3800

Instant Online Prize Structure

| | $1 3602 | $2 3604 | $3 3638 |
|---|---|---|---|
| 3606 7 of 7 | 3614 $500,000 | 3616 $1,000,000 | 3640 $3,500,000 |
| 3608 6 of 7 | 3618 $1,000 | 3620 $2,000 | 3642 $3,500 |
| 3610 5 of 7 | 3622 $20 | 3624 $40 | 3644 $65 |
| 3612 4 of 7 | 3626 $1 | 3628 $2 | 3646 $4 |
| 3802 4 Corners and Center | 3814 $5,000 | 3816 $10,000 | 3818 $35,000 |
| 3804 4 Corners | 3820 $200 | 3822 $400 | 3824 $650 |
| 3806 3 Corners | 3826 $20 | 3828 $40 | 3830 $65 |
| 3812 2 Corners | 3832 $1 | 3834 $2 | 3836 $4 |

*Figure 38*

METHOD AND APPARATUS FOR PROVIDING A LOTTERY

RELATED APPLICATIONS

This application is a Continuation-In-Part application of U.S. patent application Ser. No. 12/034,657, entitled METHOD AND APPARATUS FOR AN INSTANT ONLINE LOTTERY TICKET, which is a Continuation-In-Part application of Ser. No. 11/315,417, filed on Dec. 21, 2005, entitled INSTANT ONLINE LOTTERY METHOD AND SYSTEM, which is a Continuation-In-Part application of U.S. patent application Ser. No. 11/044,427, filed on Jan. 26, 2005, entitled MULTIPLE LEVELS OF PARTICIPATION IN A LOTTERY JACKPOT, which is Continuation-In-Part application of U.S. patent application Ser. No. 11/043,913, filed on Jan. 25, 2005, entitled LOTTERY TICKET PROVIDING FOR MULTIPLE GAMES, which are hereby incorporated by reference in their entireties. This application is also a Continuation-In-Part application of U.S. patent application Ser. No. 10/879,939, filed on Jun. 28, 2004, entitled LOTTERY TICKET DISPENSING MACHINE FOR MULTIPLE Priced TICKETS BASED ON VARIABLE RATIOS, which is Continuation-In-Part application of U.S. patent application Ser. No. 10/876,390, filed on Jun. 25, 2004, entitled MULTIPLE PRICING IN A LOTTERY BASED ON VARIABLE RATIOS, all of which are hereby incorporated by reference in their entireties. This application is also a Continuation-In-Part application of U.S. patent application Ser. No. 10/766,656, filed on Jan. 27, 2004, entitled A SYSTEM AND METHOD OF PROVIDING A GUARANTEE IN A LOTTERY, and is also a Continuation-In-Part application of U.S. patent application Ser. No. 10/987,474, filed on Nov. 12, 2004, entitled VIRTUAL LOTTERY, both of which are hereby incorporated by reference in their entireties.

BACKGROUND

1. Field

This disclosure generally relates to the field of gaming. More particularly, the disclosure relates to wagering for a game.

2. General Background

A lottery is generally a distribution of tokens such that a subset of the distributed tokens may win a prize. The token can be in the form of a ticket. One of the most popular forms of lottery involves the distribution of lottery tickets. Each lottery ticket includes a lottery number. After the lottery tickets have been distributed to the lottery ticket holders, the winning number is chosen. The usual method of selecting the winning number involves a random selection of the winning number. A random number generator can be used to randomly select the winning number. Some lottery systems require the ticket to have the entire number that is randomly selected while other lottery systems require the ticket to have a subset of an ordered sequence of numbers that are randomly selected.

Online lotteries and games typically require a waiting period for a winning number to be drawn and a prize to be awarded. In some cases, the player must wait a week, or at least several days, to determine the draw results. In addition, higher odds are set for the higher-prized games (i.e. those offering higher minimum and average jackpots), thereby reducing the chance of winning the jackpot. Moreover, higher-prized online lotteries and games generally require longer waiting periods than lower-prized daily draw games or those conducted more than once per day. In addition, traditional online lotteries sell tickets for a single price. Additional customer expenditures permit the purchase of additional tickets or participating numbers, thereby improving the odds of someone winning a prize, but without affecting or increasing the prize which may be won. If there are multiple winners of a jackpot, the winners split the jackpot prize. Players desiring a higher jackpot must defer play until the jackpot builds to a player-acceptable level through the roll-over process. In addition, if a jackpot is won, the jackpot for the next game automatically reverts to the minimum jackpot level.

Furthermore, traditional instant games, such as peel-off or scratch-off-style games, involve pre-determined results reflected by pre-printed tickets. Generally, the results are blocked and the player must scratch off material or pull tabs to reveal the results of the instant game. A traditional instant game is generally offered at a single price, with each game having its own price and independent fixed prize structure. Players seeking higher prizes must choose a different game; typically, a single game does not provide the player with prize and price options.

SUMMARY

In one aspect of the disclosure, a process is provided. The process provides a first price category and a second price category in which a lottery ticket can be purchased for a lottery game. The first price category is distinct from the second price category. The first price category corresponds to a first known portion of a linear prize and a first known portion of a non-linear prize associated with the lottery game. Further, the second price category corresponds to a second known portion of a linear prize and a second known portion of a non-linear prize associated with the lottery game. The second known portion of the linear prize is more than the first known portion of the linear prize, the second known portion of the non-linear prize being more than the first known portion of the non-linear prize. The process selects a set of lottery game numbers. Further, the process randomly generates, for each of a plurality of lottery tickets, an assortment of the set of lottery game numbers in a lottery matrix of numbers. In addition, the process determines, for each of a predetermined quantity of the plurality of lottery tickets, a non-linear subset of the lottery game numbers. The process also performs a drawing of a linear subset of the set of lottery game numbers that is utilized for each of the plurality of lottery tickets. Further, the process provides the first known portion of the linear prize associated with the lottery game to a player if the player purchased the lottery ticket from the first price category and a linear match in the lottery matrix of numbers is displayed. The linear match is a linear display in the lottery matrix of numbers of at least a predetermined quantity of numbers from the linear subset. The process provides the second known portion of the linear prize associated with the lottery game to the player if the player purchased the lottery ticket from the second price category and a linear match is displayed in the lottery matrix of numbers. The process provides the first known portion of the non-linear prize associated with the lottery game to the player if the player purchased the lottery ticket from the first price category and a non-linear match is displayed in the lottery matrix of numbers. The non-linear match is a predetermined arrangement of numbers in the non-linear subset that is a display in the lottery matrix of numbers. The quantity of numbers in the predetermined arrangement of numbers is less than the predetermined quantity of numbers. The process provides the second known portion of the non-linear prize associated with the lottery game to the player if the player purchased the lottery ticket from the second price category and a non-linear match is displayed in the lottery matrix of numbers.

In another aspect of the disclosure, the process is provided. The process provides a first price category and a second price category in which a lottery ticket can be purchased for a lottery game. The first price category is distinct from the second price category. Further, the first price category corresponds to a first known portion of a linear prize and a first known portion of a non-linear prize associated with the lottery game. The second price category corresponds to a second known portion of a linear prize and a second known portion of a non-linear prize associated with the lottery game. The second known portion of the linear prize is more than the first known portion of the linear prize. Further, the second known portion of the non-linear prize being more than the first known portion of the non-linear prize. In addition, the process selects a set of lottery game numbers. The process randomly generates, for each of a plurality of lottery tickets, an assortment of the set of lottery game numbers in a lottery matrix of numbers. Further, the process determines, for each of a predetermined quantity of the plurality of lottery tickets, a non-linear subset of the lottery game numbers. In addition, the process selects, for a lottery ticket provided consecutively after the predetermined quantity of lottery tickets. A non-linear subset of the set of lottery game numbers that results in a non-linear match, the non-linear match is a predetermined arrangement of numbers in the non-linear subset that is a display in the lottery matrix of numbers. The quantity of numbers in the predetermined arrangement of numbers is less than a predetermined quantity of numbers. Further, the process performs a drawing of a linear subset of the set of lottery game numbers that is utilized for each of the plurality of lottery tickets. In addition, the process provides the first known portion of the linear prize associated with the lottery game to a player if the player purchased the lottery ticket from the first price category and a linear match in the lottery matrix of numbers is displayed, the linear match being a linear display in the lottery matrix of numbers of at least the predetermined quantity of numbers from the linear subset. The process provides the second known portion of the linear prize associated with the lottery game to the player if the player purchased the lottery ticket from the second price category and a linear match is displayed in the lottery matrix of numbers. Further, the process provides the first known portion of the non-linear prize associated with the lottery game to the player if the player purchased the lottery ticket from the first price category and a non-linear match is displayed in the lottery matrix of numbers. In addition, the process provides the second known portion of the non-linear prize associated with the lottery game to the player if the player purchased the lottery ticket from the second price category and a non-linear match is displayed in the lottery matrix of numbers.

In yet another aspect of the disclosure, the process provides a first price category and a second price category in which a lottery ticket can be purchased for a lottery game, the first price category being distinct from the second price category, the first price category corresponding to a first known portion of a linear prize and a first known portion of a non-linear prize associated with the lottery game. The second price category corresponding to a second known portion of a linear prize and a second known portion of a non-linear prize associated with the lottery game, the second known portion of the linear prize being more than the first known portion of the linear prize. The second known portion of the non-linear prize is more than the first known portion of the non-linear prize. The process selects a set of lottery game numbers. Further, the process also randomly generates, for each of a predetermined quantity of a plurality of lottery tickets, an assortment of the set of lottery game numbers in a lottery matrix of numbers. In addition, the process randomly generates, for each of the predetermined quantity of the plurality of lottery tickets and a lottery ticket that is provided consecutively after the predetermined quantity of the plurality of lottery tickets, a non-linear subset of the lottery game numbers. The process selects, for the lottery ticket that is provided consecutively after the predetermined quantity of the plurality of lottery tickets, an assortment of the set of lottery game numbers in the lottery matrix of numbers such that a non-linear match is displayed for the non-linear subset of the lottery game numbers randomly generated for the lottery ticket that is provided consecutively after the predetermined quantity of the plurality of lottery tickets. The non-linear match is a predetermined arrangement of numbers in the non-linear subset that is a display in the lottery matrix of numbers, the quantity of numbers in the predetermined arrangement of numbers being less than a predetermined quantity of numbers. The process performs a drawing of a linear subset of the set of lottery game numbers that is utilized for each of the plurality of lottery tickets. Further, the process provides the first known portion of the linear prize associated with the lottery game to a player if the player purchased the lottery ticket from the first price category and a linear match in the lottery matrix of numbers is displayed. The linear match being a linear display in the lottery matrix of numbers of at least the predetermined quantity of numbers from the linear subset. The process provides the second known portion of the linear prize associated with the lottery game to the player if the player purchased the lottery ticket from the second price category and a linear match is displayed in the lottery matrix of numbers. Further, the process provides the first known portion of the non-linear prize associated with the lottery game to the player if the player purchased the lottery ticket from the first price category and a non-linear match is displayed in the lottery matrix of numbers. In addition, the process provides the second known portion of the non-linear prize associated with the lottery game to the player if the player purchased the lottery ticket from the second price category and a non-linear match is displayed in the lottery matrix of numbers.

In another aspect of the disclosure, a process is provided. The process provides a first price category and a second price category in which a lottery ticket can be purchased for a lottery game. The first price category is distinct from the second price category. The first price category corresponds to a first known portion of a linear prize and a first known portion of a non-linear prize associated with the lottery game. The second price category corresponds to a second known portion of a linear prize and a second known portion of a non-linear prize associated with the lottery game. The second known portion of the linear prize is more than the first known portion of the linear prize. The second known portion of the non-linear prize is more than the first known portion of the non-linear prize. The process selects a set of lottery game numbers. Further, the process randomly generates an assortment of the set of lottery game numbers in a lottery matrix of numbers. In addition, the process determines a subset of the set of lottery game numbers. The process performs a drawing of a subset of the set of lottery game numbers that is utilized for each of the plurality of lottery tickets. Further, the process provides the first known portion of the linear prize associated with the lottery game to a player if the player purchased the lottery ticket from the first price category and a linear match in the lottery matrix of numbers is displayed. The linear match is a linear display in the lottery matrix of numbers of at least the predetermined quantity of numbers from the subset. In addition, the process provides the second known portion of the linear prize associated with the lottery game to the player if the player purchased the lottery ticket from the second price category and a linear match is displayed in the lottery matrix of numbers. The process provides the first known portion of the non-linear prize associated with the lottery game to the player if the player purchased the lottery ticket from the first price category and a non-linear match in the lottery matrix of numbers is displayed. The non-linear match is a predetermined arrangement of numbers from the plurality of numbers in the subset that is not a linear display in the lottery matrix of numbers of at least the predetermined quantity of numbers from the subset. The process provides the second known portion of the non-linear prize associated with the lottery game to the player if the player purchased the lottery ticket from the second price category and a non-linear match is displayed in the lottery matrix of numbers.

In yet another aspect of the disclosure, the process provides a first price category and a second price category in which a lottery ticket can be purchased for a lottery game. The first price category is distinct from the second price category. The first price category corresponds to a first known portion of a linear prize and a first known portion of a non-linear prize associated with the lottery game. The second price category corresponding to a second known portion of a linear prize and a second known portion of a non-linear prize associated with the lottery game. The second known portion of the linear prize is more than the first known portion of the linear prize. Further, the second known portion of the non-linear prize being more than the first known portion of the non-linear prize. In addition, the process selects a set of lottery game numbers. The process randomly generates an assortment of the set of lottery game numbers in a lottery matrix of numbers. Further, the process determines a subset of the set of lottery game numbers. In addition, the process performs a drawing of a linear subset of the set of lottery game numbers that is utilized for each of the plurality of lottery tickets. In addition, the process performs a drawing of a non-linear subset of the set of lottery game numbers that is utilized for each of the plurality of lottery tickets. The process provides the first known portion of the linear prize associated with the lottery game to a player if the player purchased the lottery ticket from the first price category and a linear match in the lottery matrix of numbers is displayed. The linear match is a linear display in the lottery matrix of numbers of at least the predetermined quantity of numbers from the linear subset. The process provides the second known portion of the linear prize associated with the lottery game to the player if the player purchased the lottery ticket from the second price category and a linear match is displayed in the lottery matrix of numbers. Further, the process provides the first known portion of the non-linear prize associated with the lottery game to the player if the player purchased the lottery ticket from the first price category and a non-linear match in the lottery matrix of numbers is displayed. The non-linear match is a predetermined arrangement of numbers from the plurality of numbers in the subset that is not a linear display in the lottery matrix of numbers of at least the predetermined quantity of numbers from the non-linear subset. Finally, the process provides the second known portion of the non-linear prize associated with the lottery game to the player if the player purchased the lottery ticket from the second price category and a non-linear match is displayed in the lottery matrix of numbers.

In another aspect of the disclosure, an apparatus is provided. The apparatus includes a price category module that provides a first price category and a second price category in which a lottery ticket can be purchased for a lottery game. The first price category is a distinct from the second price category. The first price category corresponds to a first known portion of a linear prize and a first known portion of a non-linear prize associated with the lottery game. The second price category corresponds to a second known portion of a linear prize and a second known portion of a non-linear prize associated with the lottery game. The second known portion of the linear prize is more than the first known portion of the linear prize, the second known portion of the non-linear prize being more than the first known portion of the non-linear prize. The apparatus includes a selection module that selects a set of lottery game numbers. Further, the apparatus includes a first random number generator that randomly generates, for each of a plurality of lottery tickets, an assortment of the set of lottery game numbers in a lottery matrix of numbers. In addition, the process includes a second random number generator that randomly generates, for each of a predetermined quantity of the plurality of lottery tickets, a non-linear subset of the lottery game numbers. The process also includes a drawing module that performs a drawing of a linear subset of the set of lottery game numbers that is utilized for each of the plurality of lottery tickets. The process includes a prize distribution module that provides first known portion of the linear prize associated with the lottery game to a player if the player purchased the lottery ticket from the first price category and a linear match in the lottery matrix of numbers is displayed, the linear match being a linear display in the lottery matrix of numbers of at least a predetermined quantity of numbers from the linear subset, provides the second known portion of the linear prize associated with the lottery game to the player if the player purchased the lottery ticket from the second price category and a linear match is displayed in the lottery matrix of numbers, provides the first known portion of the non-linear prize associated with the lottery game to the player if the player purchased the lottery ticket from the first price category and a non-linear match is displayed in the lottery matrix of numbers, the non-linear match being a predetermined arrangement of numbers in the non-linear subset that is a display in the lottery matrix of numbers, the quantity of numbers in the predetermined arrangement of numbers being less than the predetermined quantity of numbers, and provides the second known portion of the non-linear prize associated with the lottery game to the player if the player purchased the lottery ticket from the second price category and a non-linear match is displayed in the lottery matrix of numbers.

A computer program product is provided. The computer program product includes a computer useable medium that has a computer readable program. The computer readable program when executed on a computer causes the computer to provide a first price category and a second price category in which a lottery ticket can be purchased for a lottery game, the first price category being distinct from the second price category. The first price category corresponds to a first known portion of a linear prize and a first known portion of a non-linear prize associated with the lottery game. The second price category corresponds to a second known portion of a linear prize and a second known portion of a non-linear prize associated with the lottery game, the second known portion of the linear prize being more than the first known portion of the linear prize. The second known portion of the non-linear prize is more than the first known portion of the non-linear prize. The computer readable program when executed on a computer also causes the computer to selects a set of lottery game numbers. The computer readable program when executed on a computer also causes the computer to randomly generate, for each of a plurality of lottery tickets, an assortment of the set of lottery game numbers in a lottery matrix of numbers. The computer readable program when executed on a computer also causes the computer to determine, for each of a predetermined quantity of the plurality of lottery tickets, a non-linear subset of the lottery game numbers. Further, the computer readable program when executed on a computer also causes the computer to perform a drawing of a linear subset of the set of lottery game numbers that is utilized for each of the plurality of lottery tickets. In addition, the computer readable program when executed on a computer also causes the computer to provide the first known portion of the linear prize associated with the lottery game to a player if the player purchased the lottery ticket from the first price category and a linear match in the lottery matrix of numbers is displayed. The linear match is a linear display in the lottery matrix of numbers of at least a predetermined quantity of numbers from the linear subset. The computer readable program when executed on a computer also causes the computer to provide the second known portion of the linear prize associated with the lottery game to the player if the player purchased the lottery ticket from the second price category and a linear match is displayed in the lottery matrix of numbers. The computer readable program when executed on a computer also causes the computer to provide the first known portion of the non-linear prize associated with the lottery game to the player if the player purchased the lottery ticket from the first price category and a non-linear match is displayed in the lottery matrix of numbers. The non-linear match is a predetermined arrangement of numbers in the non-linear subset that is a display in the lottery matrix of numbers, the quantity of numbers in the predetermined arrangement of numbers being less than the predetermined quantity of numbers. Further, the computer readable program when executed on a computer also causes the computer to provide the second known portion of the non-linear prize associated with the lottery game to the player if the player purchased the lottery ticket from the second price category and a non-linear match is displayed in the lottery matrix of numbers.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 7 illustrates a set of game-play combinations and an instant online lottery number.

FIGS. 9A-9C illustrates an instant online lottery game where the instant online lottery number matches all of the numbers in a game-play combination.

FIG. 11 illustrates an instant online lottery game that utilizes an eight-by-eight matrix.

FIG. 17 illustrates an example of a winnings table for the instant online lottery game system of FIG. 16.

FIG. 26 illustrates a table of prizes in a multi-priced instant game.

FIG. 28 illustrates the prize distributions for an instant online lottery game in combination with a separate instant game offered online.

FIG. 38 illustrates an example of the prize structure from FIG. 36C that is utilized for both linear game prizes and non-linear game prizes.

DETAILED DESCRIPTION

A system and method are disclosed for an instant online lottery game. A lottery player can purchase an online lottery ticket and determine instantly whether the purchased ticket has a winning lottery number, rather than having to wait days or even a week for a drawing with respect to a traditional online lottery game. In essence, the instant online lottery player can be provided with a similar experience to playing an electronic gaming machine at a casino that can be networked with other machines to offer a wide-area progressive jackpot. As such, a player can play a lottery game offering relatively high jackpots every day without having to wait for a drawing.

By way of contrast, in the casino-style game, only the highest-priced ticket holder or maximum-unit player has an opportunity to win the progressive jackpot. In the disclosed system and method, any player, without regard to ticket price or amount spent per play, can win a progressive jackpot prize and can determine through player choice the pre-established percentage of the jackpot for which he or she desires to play. In addition, the participating lottery or lottery operator does not have to invest substantial sums in purchasing new free-standing machines to offer the game. Rather, the lottery operator can use its existing online terminals for game play and can use the existing ticket distribution network to maximize the opportunities for play.

Figure 1:
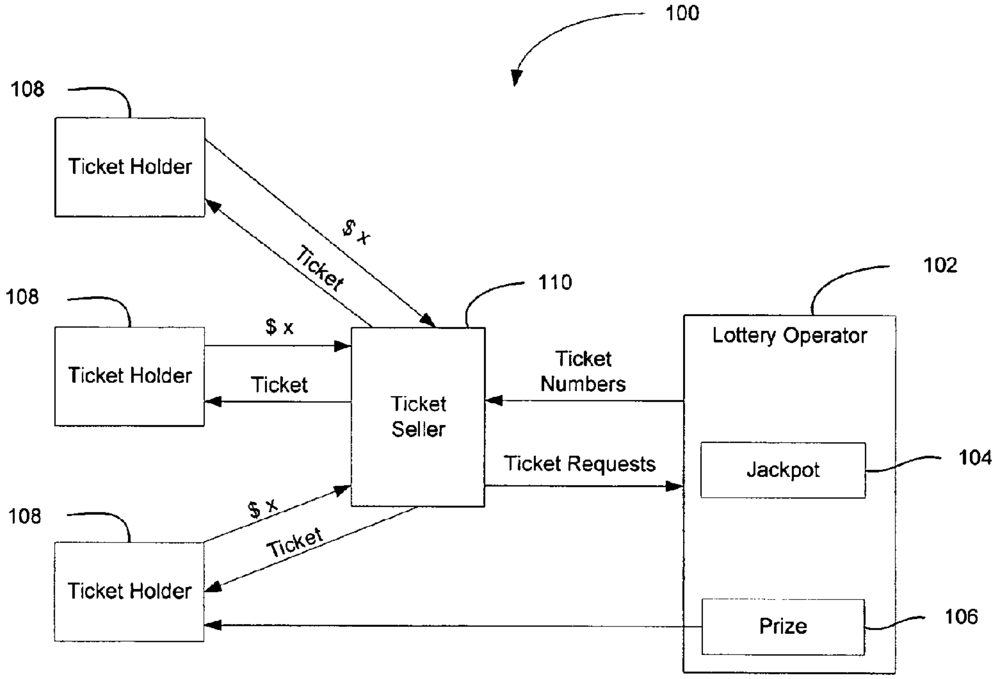
FIG. 1 illustrates an instant online lottery game system.

FIG. 1 illustrates an instant online lottery game system 100. A lottery operator 102 establishes the lottery. The lottery operator 102 can be a jurisdiction such as a country, state, province, city, town, municipality, or any division or department thereof. Further, the lottery operator 102 can be a private organization that a jurisdiction hires to coordinate the lottery. The lottery operator 102 can also be a private organization independent of any jurisdiction. The lottery operator 102 performs functions such as establishment, maintenance, operation and oversight and/or winnings determination of the lottery games.

The lottery operator 102 can advertise that a lottery game has a prize. For example, the lottery operator 102 can advertise that the lottery game prize can be a minimum of ten million dollars. The lottery operator 102 can provide the largest lottery prize as a jackpot 104. In one embodiment, the jackpot 104 can be a progressive jackpot that increases through allocation of a portion of the ticket sales. The lottery operator 102 can also provide a fixed prize 106. In an alternative embodiment, a fixed prize such as a probabilities-based prize may be provided without a progressive jackpot prize. In one embodiment, ticket holders 108 can purchase tickets at a price of $x per ticket from a ticket seller 110. The ticket seller 110 can then send the ticket requests for each of the tickets to the lottery operator 102, typically through a computer network. The lottery operator 102 can transmit randomly generated instant online lottery numbers to the terminal maintained by the ticket seller 110. The numbers can be printed on the ticket that is provided to the ticket holders 108. In another embodiment, the numbers can be displayed on a computer screen. In another embodiment, the numbers can be displayed on a ticket display.

In one embodiment, the lottery operator 102 can use a random number generator to determine the winning number. In another embodiment, the lottery operator 102 can use a ball draw machine to randomly select the winning number. If one of the ticket holders 108 wins the lottery, the lottery operator 102 can disburse the jackpot 104 to the ticket holder 108. Typically, in an instant online lottery drawing there is a single winner because the instant online lottery number and the game-play combinations are provided simultaneously.

Figure 2:
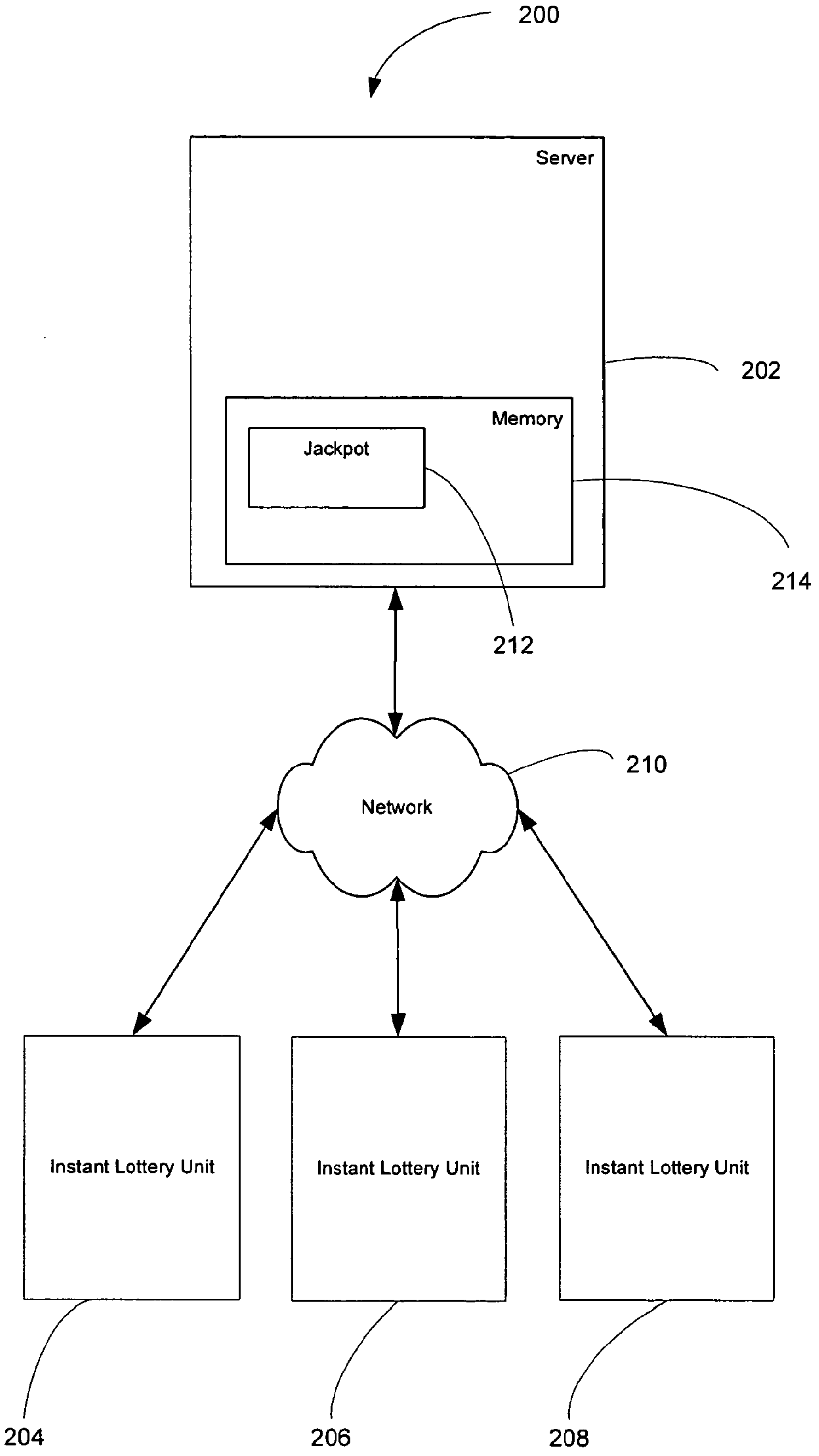
FIG. 2 illustrates an instant online lottery system with multiple lottery units.

FIG. 2 illustrates an instant online lottery system 200 with multiple lottery units. In one embodiment, a server 202 can communicate with a first instant online lottery unit 204, a second instant online lottery unit 206, and a third instant online lottery unit 208. The server 202 can communicate with these units through a network 210 such as a Local Area Network ("LAN"), a Wide Area Network ("WAN"), the Internet, cable, satellite, etc. Alternatively, the server 202 can be hardwired to the instant online lottery units.

In one embodiment, the first instant online lottery unit 204, the second instant online lottery unit 206, and the third instant online lottery unit 208 can all be linked to one another. For instance, the server 202 can provide updated prize information based on lottery wins and/or losses to the first instant online lottery unit 204, the second instant online lottery unit 206, and the third instant online lottery unit 208. Thus, the jackpot can change in value according to the wins and/or losses of any of the players at the first instant online lottery unit 204, the second instant online lottery unit 206, and the third instant online lottery unit 208. In another embodiment, the server 202 is not needed to update the jackpot information because the instant online lottery units can communicate with one another. When the player at the first instant online lottery unit 204 requests a ticket, the player is essentially purchasing a lottery ticket for a drawing in which that lottery ticket is the only lottery ticket that exists. Accordingly, the player can instantly determine if a winning lottery ticket has been purchased. Each instant online lottery unit may be identical to the units deployed for a lottery's traditional online game.

Similar to a traditional online lottery game, the first instant online lottery unit 204 can provide the player with the opportunity to select an instant online lottery number or to have the first instant online lottery unit 204 randomly generate a "quick pick" for the player. The first instant online lottery unit 204 can then randomly select the game-play combinations or winning instant online lottery numbers. Further, the first instant online lottery unit 204 can compare the instant online lottery number to determine if the player won the instant online lottery game. If the player won the instant online lottery game, then a pre-established portion of the jackpot or the jackpot in its entirety can be provided to the player and can be deducted from the jackpot for future play. On the other hand, if the player does not win the instant online lottery jackpot, the jackpot can remain available to future players of the instant online lottery game. If only a portion is won, the remaining portion can remain available to future players. If there is only a partial match of numbers, non-jackpot secondary prizes can be won, depending on the extent of the match and the amount wagered in the game (e.g. price selection as discussed later).

In yet another embodiment, the player can select the instant online lottery number by entering the number of the instant online lottery ticket without having a quick pick option. In yet another embodiment, the player can select the instant online lottery number by selecting the quick-pick option and does not manually enter the numbers of the instant online lottery tickets. In yet another embodiment, the player does not select game numbers, and the game numbers are only selected by the random number generator or other selection device and are reported automatically to the instant online lottery unit.

In one embodiment, the jackpot 212 can be probabilistic. In other words, a relatively large amount is indicated at the onset as being the jackpot 212 in order to induce the purchase of instant online lottery tickets regardless of whether sufficient sales of instant online lottery tickets have occurred to cover the jackpot 212. Accordingly, there is an increased likelihood that the sales of the instant online lottery tickets can suffice to cover the jackpot 212 because players are more likely to purchase instant online lottery tickets for a large jackpot than for a low jackpot. In one embodiment, prize indemnity insurance can be purchased from a third party to provide a guarantee that the jackpot 212 will be paid in the event that the instant online lottery ticket sales are insufficient to cover the jackpot 212 and fixed secondary prizes.

Figure 3:
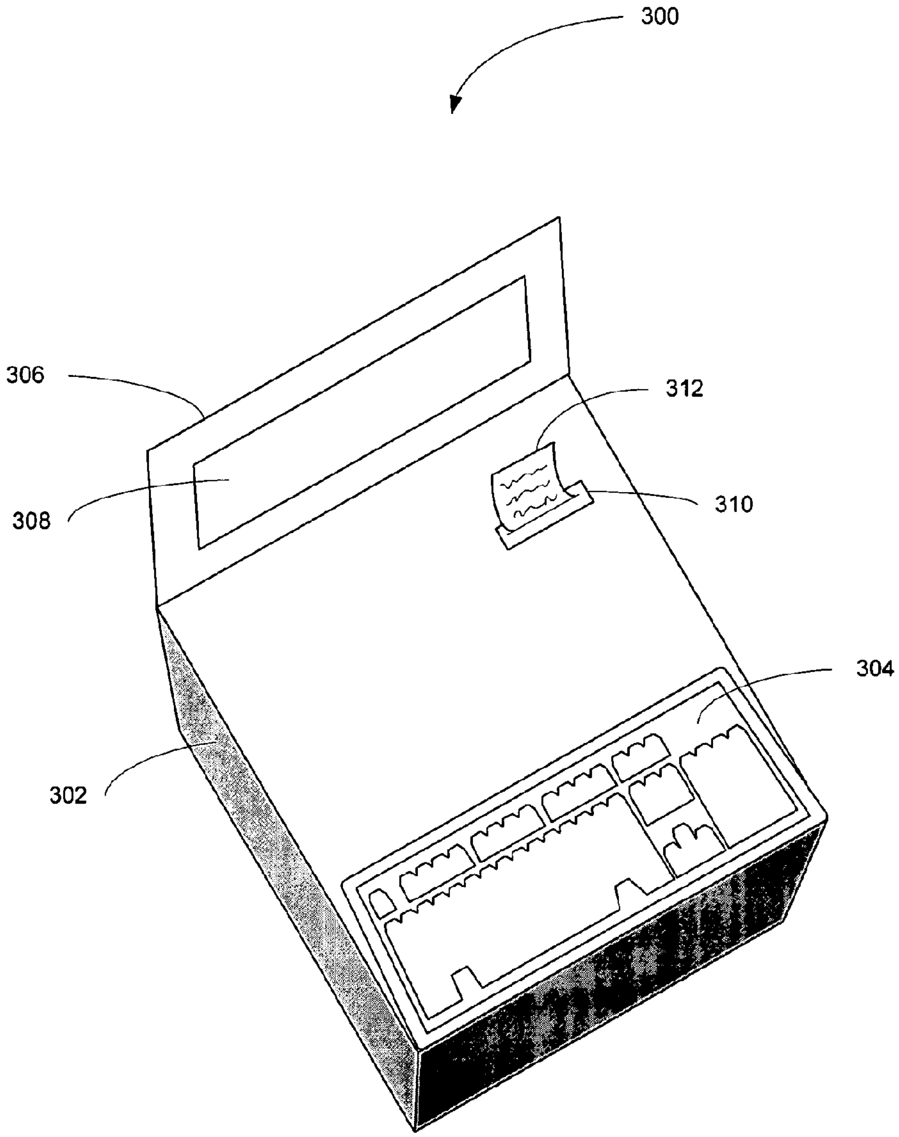
FIG. 3 illustrates a lottery ticket dispensing machine.

FIG. 3 illustrates a lottery ticket dispensing machine 300. In one embodiment, instant online lottery units 204, 206 and 208 can be implemented with the use of the lottery ticket dispensing machine 300, which can be positioned at various point-of-sale locations. The lottery ticket dispensing machine can have a housing 302 that stores the internal components of the lottery ticket dispensing machine 300. In addition, the lottery ticket dispensing machine 300 can also have a user input device 304 on which a user can input data for the sale of a lottery ticket. For instance, the vendor can input the instant online lottery number. In one embodiment, the vendor can also input player price selection. As described below, a player can also select a ticket price category in order to participate in other winning opportunities.

The instant online lottery number that the vendor enters can be displayed on a screen 308 of a display 306. In one embodiment, the display 306 is a graphical user interface. In another embodiment, the display 306 communicates data other than the instant online lottery number such as the jackpot 212. When a player purchases a lottery ticket, the vendor can enter the purchase information into the lottery ticket dispensing machine 300 via the user input device 304. In one embodiment, the user input device can be a keyboard. In another embodiment, the user input device can be operated by using a computer mouse. In an alternate embodiment, the user input device can be a touch screen. In yet another embodiment, the user input device can be voice activated. In an alternative embodiment, the display 306 can communicate the purchase information that is entered via the user input device 304.

In one embodiment, the lottery ticket dispensing machine 300 can have a payment reception module (not shown) that receives a payment for the purchase of a lottery ticket. In another embodiment, the payment reception module can receive an electronic payment.

After the vendor inputs the data needed to sell a ticket, a ticket 312 can be printed from a lottery ticket printer 310. In one embodiment, the ticket printer 310 can be housed within the housing 302. In another embodiment, the lottery ticket printer 310 can be positioned outside of the housing 302 and can be operably connected to the lottery ticket dispensing machine 300. In yet another embodiment, the lottery ticket printer 310 can receive data from the lottery ticket dispensing machine 300 through a wireless connection.

Figure 4:
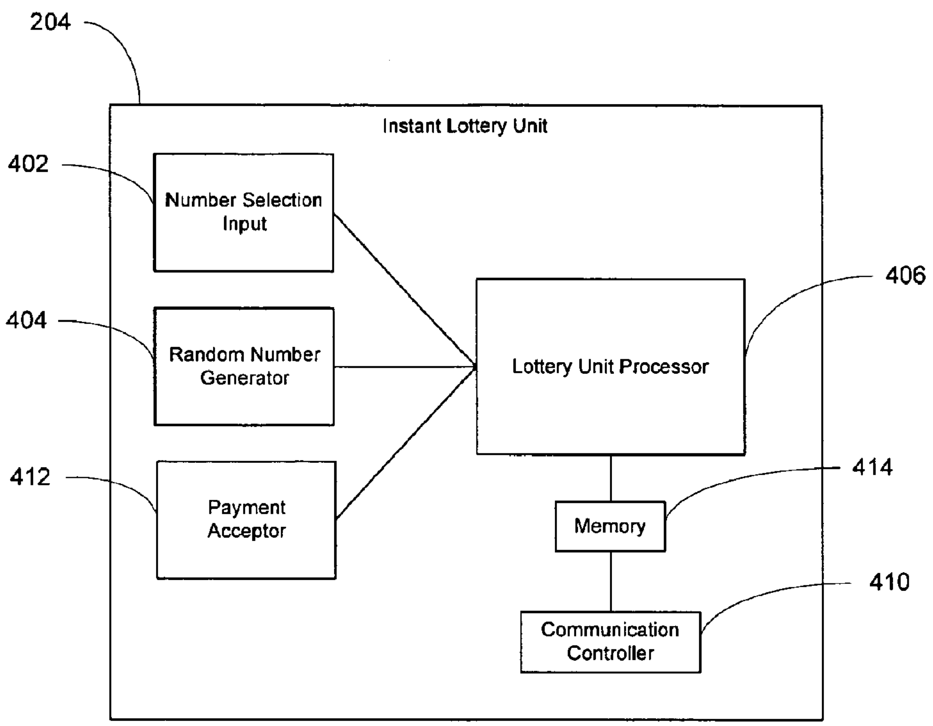
FIG. 4 illustrates the internal components of the housing of the lottery ticket dispensing machine.

FIG. 4 illustrates the internal components of the housing 302 of the lottery ticket dispensing machine 300. The housing 302 can include a lottery unit processor 406, a memory 414, a communication controller 410, a number selection input 402, a random number generator 404, and a payment acceptor 412.

The lottery unit processor can coordinate the various operations of the first instant online lottery unit 204. For instance, the lottery unit processor 406 can receive the instant online lottery number from the number selection input 402 that was selected by the player. The lottery unit processor 406 can then store the instant online lottery number in a memory 414. In addition, the lottery unit processor 406 can receive the winning instant online lottery number from the random number generator 404 and can store the winning instant online lottery number in the memory 414. The lottery unit processor 406 can then retrieve the instant online lottery number in the memory 414. The lottery unit processor 406 can then retrieve the instant online lottery number to compare the two numbers. If the two numbers are the same in entirety, then the player wins a known percentage of the instant online lottery prize. If subsets of the two numbers are the same, then the player wins a secondary prize which is a fixed prize.

In one embodiment, a communication controller 410 in the instant online lottery unit 204 can communicate with the server 2402. The communication controller 410 can receive data such as the value of the jackpot. The communication controller 410 can store this value on the memory 414 so that the lottery unit processor 406 can compute a known percentage of the jackpot that can be won by the player. In another embodiment, the lottery unit processor 406 can communicate with the communication controller 410 after data is received by the communication controller 410 from the memory 414. The lottery unit processor 406 can then store the data in the memory 414.

In one embodiment, a payment acceptor 412 can accept payment for an instant online lottery ticket. The lottery unit processor 406 can store the amount provided by the player. In one embodiment, the payment acceptor 412 can be a bill acceptor that accepts paper currency. In another embodiment, the payment acceptor 412 can be a coin acceptor that can accept coins for payment. In yet another embodiment, the payment acceptor can accept cashless payment. Various forms of cashless payment can include a credit card, a smart card, a stored value card purchased at a kiosk, a stored value card received in a promotion, a code such as a number that is printed on a ticket, etc. In yet another embodiment, the payment, in cash or other form, can be received, and deposited independent of the unit, by the vendor, who then can record and confirm the payment and receipt of the payment.

The first instant online lottery unit 204 can be implemented in a number of different combinations. Any type of computing device, such as a personal computer, can be utilized. Further, various displays can be operably attached or integrated into the first instant online lottery unit 204 to provide the player with data such as the jackpot value, the instant online lottery ticket, and the winning instant online lottery number. Other embodiments may provide displays with other pertinent information.

Figure 5:
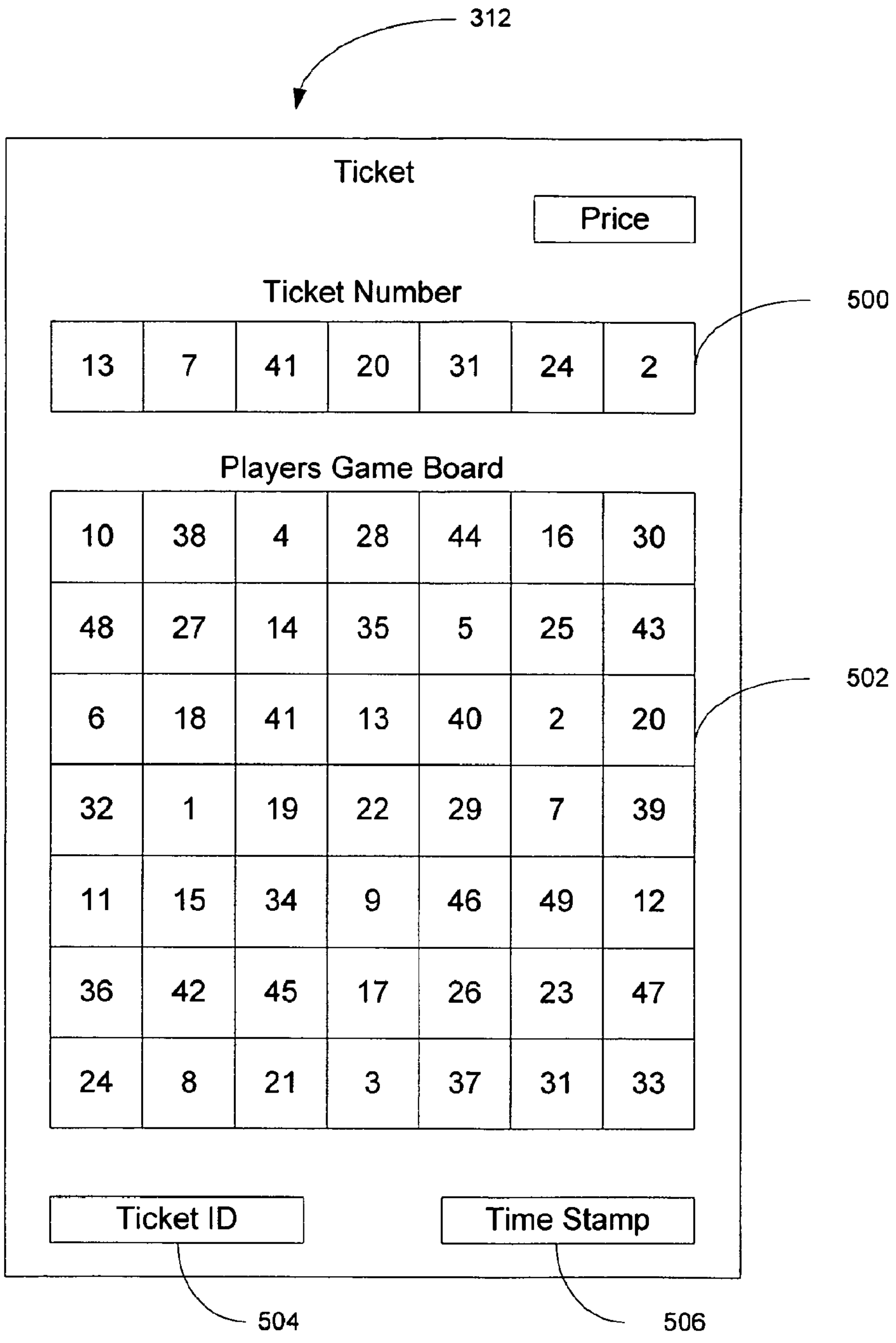
FIG. 5 illustrates an instant online lottery ticket.

FIG. 5 illustrates an instant online lottery ticket 312. In one embodiment, the instant online lottery ticket can include an instant online lottery number 500, a player's game board 502, a ticket identifier 504 and a timestamp 506. In one embodiment, the instant online lottery number 500 can include a number combination that is utilized to compare against one or more game-play combinations in order to determine whether the player has won. Each game-play combination can be an unordered collection of numbers. The instant online lottery number 500 can also be an unordered collection of numbers.

The instant online lottery number matches the game-play combination in full when all of the numbers in the instant online lottery number are present in the game-play combination. In one example, if the instant online lottery number is {2, 4, 6}, a game-play combination {2, 4, 6} matches in full the instant online lottery number. In another example, if the instant online lottery number is {2, 4, 6}, a game-play combination {4, 2, 6} matches in full the instant online lottery number. In yet another example, if the instant online lottery number is {2, 4, 6}, a game-play combination {6, 4, 2} matches in full the instant online lottery number.

The instant online lottery number matches the game-play combination partially when only some of the numbers in the instant online lottery number are present in the game-play combination. In one example, if the instant online lottery number is {2, 4, 6}, a game-play combination {2, 4} partially matches the instant online lottery number. In another example, if the instant online lottery number is {2, 4, 6}, a game-play combination {4, 6} partially matches the instant online lottery number. In yet another example, if the instant online lottery number is {2, 4, 6}, a game-play combination {6, 2} partially matches the instant online lottery number.

In order to improve the player's odds of winning, the player can be provided multiple game-play combinations. Thus, the player can be provided with a set of game-play combinations.

The ticket identifier 504 can be, for example, a serial number, a bar code, etc., that can uniquely identify the instant online lottery ticket among other instant online lottery tickets. In addition, a time stamp 506 can also be provided on the instant online lottery ticket 312 to display the time at which the ticket was printed and presented to the player. In another embodiment, the time stamp 506 can correspond to the time at which the set of game-play combinations was generated.

In one embodiment, the player's game board 502 can be a matrix or grid containing a set of game-play combinations. In another embodiment, the set of game-play combinations can be printed as a listing on the instant online lottery ticket 312. In another embodiment, the set of game-play combinations can be displayed as a listing on the screen 308 of the lottery ticket dispensing machine 300. In one example, the player's game board 502 can be a seven-by-seven matrix that includes forty-nine numbers from a range of one to forty-nine and sixteen play-game combinations of seven numbers. In one embodiment, all of the numbers in the matrix can be unique.

It will be apparent to one skilled in the art that matrices with other ranges of numbers as well as different numbers of rows and columns can be used. In another embodiment, for example, a seven-by-seven matrix that includes forty-nine numbers can have a range of fifty-one to one-hundred. In another embodiment, an eight-by-eight matrix can be utilized wherein the matrix includes sixty-four numbers having a range of one to sixty-four and provides eighteen combinations of eight numbers.

Figure 6A:
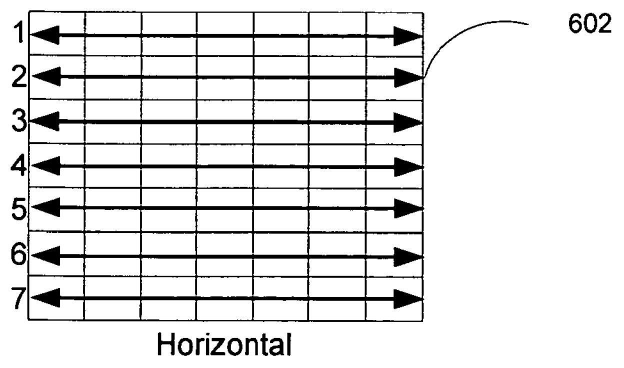
FIGS. 6A-6C illustrate a configuration of playlines or number sets or game-play combinations on a seven-by-seven matrix.
Figure 6B:
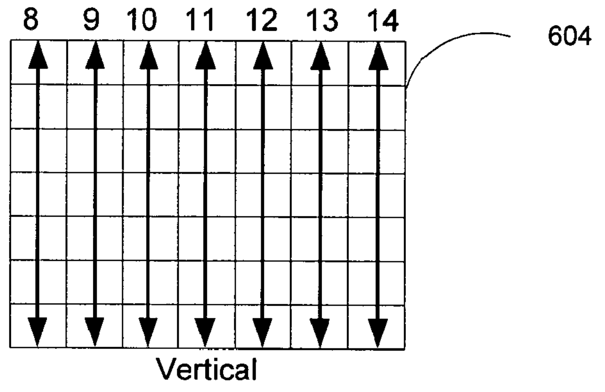
Figure 6C:
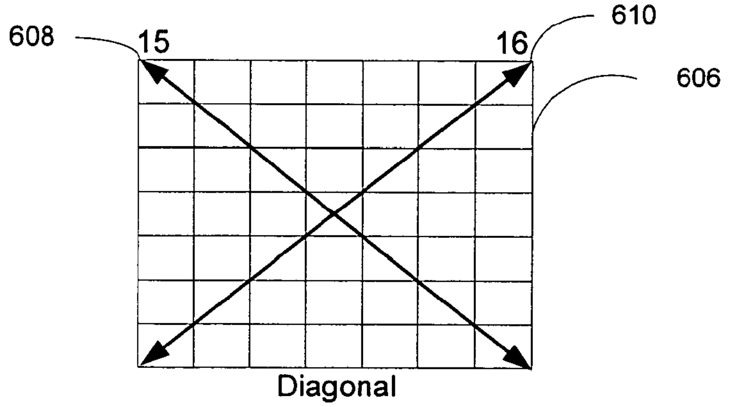

FIGS. 6A, 6B and 6C illustrate a configuration of playlines or number sets or game-play combinations on a seven-by-seven matrix. The configuration of the playlines defines the set of game-play combinations. In one embodiment, the playlines are the seven horizontal lines across the rows of the matrix shown in matrix 602, the seven vertical lines across the columns of matrix 604, and the two diagonal playlines across diagonals 608 and 610 of matrix 606.

Thus, a seven-by-seven matrix yields sixteen game-play combinations of numbers or potential winning combinations. Seven of the game-play combinations are defined by the horizontal playlines as illustrated in FIG. 6A. Another seven of the game-play combinations are defined by the vertical playlines as illustrated in FIG. 6*b*. Finally, two additional game-play combinations are defined by the diagonal playlines 608 and 610 as illustrated in FIG. 6C.

In another example, a six-by-six matrix yields fourteen different sets of game-play combinations. Six of the game-play combinations are defined by the horizontal play-lines, another six of the game-play combinations are defined by the vertical playlines, and two additional playlines are defined by the diagonals of the matrix.

FIG. 7 illustrates a set of game-play combinations and an instant online lottery number. In one embodiment, the set of game-play combinations 700 can be presented to the user in a form of a list. The set of game-play combinations 700 can correspond to the sixteen sets of seven numbers derived from a seven-by-seven matrix. The set of game-play combinations 700 illustrates the seven sets of numbers derived from each of the horizontal playlines across seven rows, the seven sets of numbers derived from each of the vertical playlines across the seven columns, and the two sets of seven numbers derived from the diagonal playlines. Thus, the set of game-play combinations 700 can continue to have a matrix relationship of rows, columns, and diagonals, even if the set of game-play combinations 700 is presented in the form of a list.

For example, the first row in the player's game board 502 includes the numbers 110, 38, 4, 28, 44, 16, 30}. The first column of the player's game board 502 includes the numbers 110, 48, 6, 32, 11, 36, 24}. These two sets of numbers have the number ten at the beginning. As such, the sets of seven numbers corresponding to the first row and the first column of the matrix can have the first number in common. Each of the other sets of numbers of the set of game-play combinations can have a number in common with one or more other sets depending on where the game-play combinations are placed in the game-board matrix 700.

In another embodiment, the set of game-play combinations 700 can be a list of numbers that are independent of each other and randomly generated. As such, there would be no matrix relation between each of the randomly generated game-play combinations.

Figure 8:
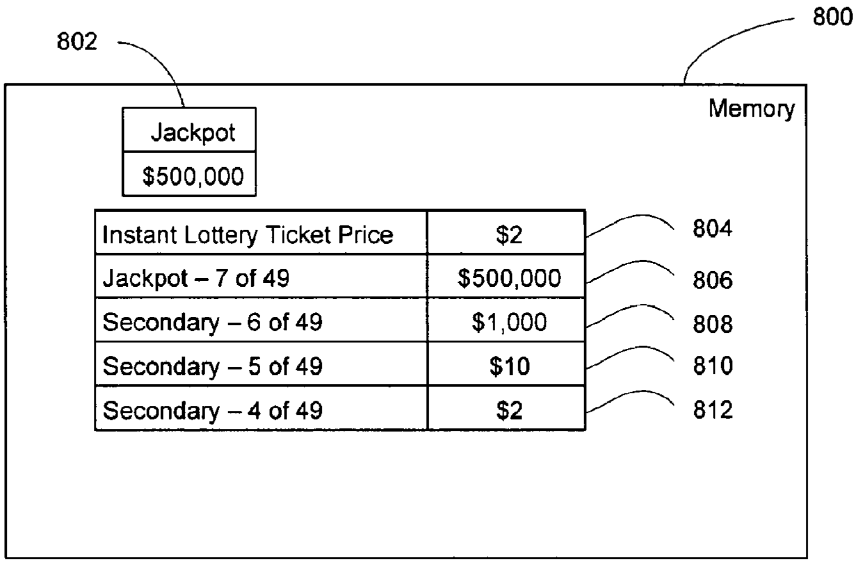
FIG. 8 illustrates a prize distribution in an instant online lottery game.

FIG. 8 illustrates a prize distribution in an instant online lottery game. The prize distribution can be stored in a computer memory 800. In one embodiment, the computer memory 800 can be the same as memory 214 in server 202. In another embodiment, the computer memory 800 can be the same as memory 414 in the instant online lottery unit 204. In yet another embodiment, the computer memory 800 can be the same as both memory 214 and memory 414. A jackpot 802 can be stored in memory 800. In one example, the jackpot 802 can be $500,000. The instant online lottery ticket price 804, and prize distributions, 806, 808, 810, and 812, can also be stored in memory.

In one embodiment, the prize distribution can be for a matching of the entirety of the lottery number with any of the game-play combinations. In a seven-by-seven matrix, for example, the jackpot is the prize distribution for matching the entire game-play combination of seven numbers. Thus, if all seven numbers of the lottery number match the seven numbers of one of the game-play combinations, without regard to the order of the numbers, the ticket holder instantly wins the jackpot 802. Thus, a jackpot prize distribution 804 can be awarded to the ticket holder.

In another embodiment, the prize distributions can be for a partial matching of the lottery number with any one or more of the set of game-play combinations. In the seven-by-seven matrix, a secondary prize distribution 808 can be the prize awarded for matching six numbers of any of the game-play combinations. If the lottery number contains six numbers of the seven numbers in the game-play combination, the ticket holder can instantly win a secondary prize distribution 808, by way of example, of one thousand dollars. A secondary prize distribution 810, or a specific amount, can result from matching six numbers of any of the game-play combinations. If the lottery number contains five numbers of the seven numbers in the game-play combination, the ticket holder can instantly win a secondary prize distribution 810, by way of example, of ten dollars. A secondary prize distribution 812, or a specified amount, may result from matching four numbers of any of the game-play combinations. If the lottery number contains four numbers of the seven numbers in the game-play combination, the ticket holder can instantly win a secondary prize distribution 812 of, for example, two dollars. A prize distribution can result from the matching of any subset of numbers and the prizes can vary as determined by the lottery operator to induce play of the game based on the matching combinations. In one embodiment, the prize distribution can be a fixed prize. In another embodiment, the prize distribution can be a percentage of the jackpot or a percentage of ticket sales revenue. In yet another embodiment, the prize distribution can be a fixed prize plus a percentage of the jackpot.

FIG. 9A illustrates an instant online lottery game where the instant online lottery number matches all of the numbers in a game-play combination. In one embodiment, an instant online lottery number 902 is a winning number if the numbers contained in the instant online lottery number 902 match the numbers in any of the game-play combinations. If all the numbers are matched then the instant online lottery number 902 wins the jackpot. For example, the instant online lottery number 902 can be {13, 40, 41, 20, 18, 6, 2}. The third row in the player's game board 502 provides a game-play combination {6, 18, 41, 13, 40, 2, 20}. The instant online lottery number 902 wins the jackpot because all of the numbers in the game-play combination {6, 18, 41, 13, 40, 2, 20} are in the instant online lottery number 902. Thus, the ticket holder can win a prize distribution 806 as shown in FIG. 8.

Figure 9B:
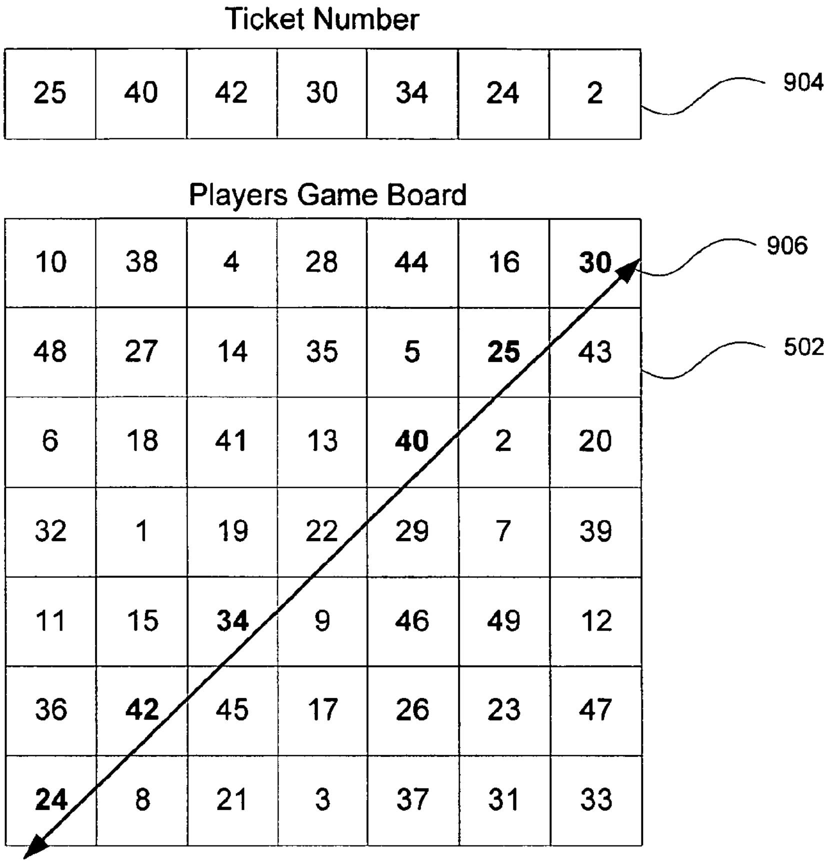

FIG. 9B illustrates an instant online lottery game where the instant online lottery number partially matches the numbers in a game-play combination. In one embodiment, an instant online lottery number 904 can be a winning number if the numbers contained in the instant online lottery number 904 partially match the numbers in any of the game-play combinations. In a seven-by-seven matrix, if six numbers are matched then the instant online lottery number 904 wins a prize distribution 808. For example, the instant online lottery number 904 can be {25, 40, 42, 30, 34, 24, 2}. A diagonal 906 in the player's game board 502 provides a game-play combination {24, 42, 34, 22, 40, 25, 30}. Six of the seven numbers of this game-play combination are found in the instant online lottery number. Namely, {25, 40, 42, 30, 34, 24} are found in the game-play combination {24, 42, 34, 22, 40, 25, 30}. Thus, the ticket holder can win a prize distribution 808 as shown in FIG. 8.

FIG. 9C illustrates an instant online lottery game where the instant online lottery number partially matches the numbers in a game-play combination. In one embodiment, an instant online lottery number 908 can be a winning number if the numbers contained in the instant online lottery number 908 partially match the numbers in any of the game-play combinations. In a seven-by-seven matrix, if five numbers are matched then the instant online lottery number 908 wins a prize distribution 810. For example, the instant online lottery number 908 can be {16, 7, 49, 20, 31, 24, 2}. The sixth column in the player's game board 502 provides a game-play combination {16, 25, 2, 7, 49, 23, 31}. Five of the seven numbers of this game-play combination are found in the instant online lottery number. Namely, {16, 2, 7, 49, 31} are found in the game-play combination {16, 25, 2, 7, 49, 23, 31}. Thus, the ticket holder can win a prize distribution 810 as shown in FIG. 8.

Figure 10:
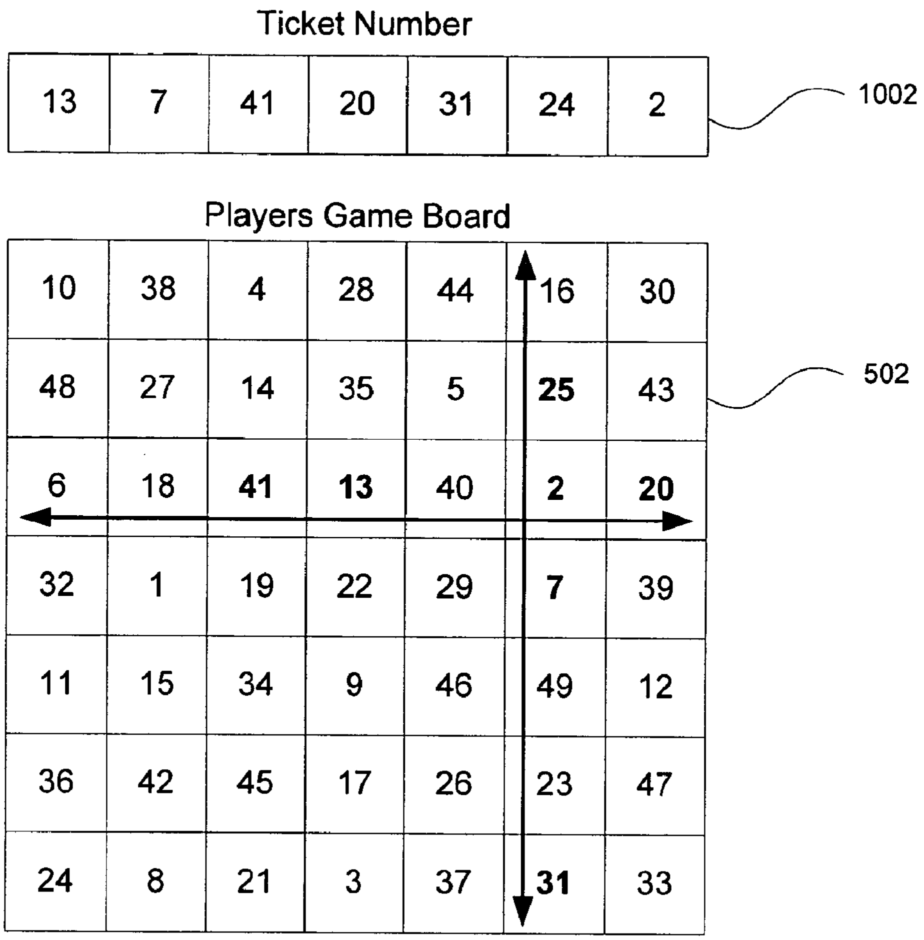
FIG. 10 illustrates an instant online lottery game where the instant online lottery number partially matches the numbers in a game-play combination.

FIG. 10 illustrates an instant online lottery game where the instant online lottery number partially matches the numbers in a game-play combination. In one embodiment, an instant online lottery number 1002 can be a winning number if the numbers contained in the instant online lottery number 1002 partially match the numbers in any of the game-play combinations. More than one combination can be partially matched. In a seven-by-seven matrix, for example, if four numbers of a first game-play combination are matched then the instant online lottery number 1002 wins a prize distribution 812. If four numbers of a second game-play combination are matched, then the instant online lottery number 1002 wins another prize distribution 812. For example, the instant online lottery number 1002 can be {13, 7, 41, 20, 31, 25, 2}. The sixth column in the player's game board 502 provides a game-play combination {16, 25, 2, 7, 49, 23, 31}. Four of the seven numbers of the game-play combination are found in the instant online lottery number. Namely, {25, 2, 7, 31} are found in the game-play combination {16, 25, 2, 7, 49, 23, 31}. In addition, the third row in the player's game board 502 provides a second game-play combination {6, 18, 41, 13, 40, 2, 20}. Four of the seven numbers of the second game-play combination are found in the instant online lottery number. Namely, {41, 13, 2, 20} are found in the second game-play combination {6, 18, 41, 13, 40, 2, 20}. Thus, the ticket holder can twice receive a prize distribution 812 as shown in FIG. 8. Other secondary prize distributions can be established depending on the number and extent of the matches. For example, a secondary prize distribution can be awarded for matching three numbers of seven. In another example, a secondary distribution can be awarded for matching two numbers of seven. In yet another example, two or more secondary distributions can be awarded in the same game, if the instant online lottery game ticket provides two or more partial matches between the instant online lottery number and subsets of two or more game-play combinations.

FIG. 11 illustrates an instant online lottery game that utilizes an eight-by-eight matrix 1104. In one embodiment, the eight-by-eight matrix 1104 yields a set of eighteen game-play combinations. Eight of the game-play combinations are defined by the horizontal playlines; another eight of the game-play combinations are defined by the vertical playlines, and two additional playlines are defined by the diagonals of the matrix. Furthermore, the winning number 1102 includes eight different numbers that can match any of the eighteen game-play combinations. The player's game board is a grid of sixty-four squares including a number from one to sixty-four in each of the boxes.

As discussed above, the full jackpot can be the prize distribution for matching the entire game-play combination. In an eight-by-eight matrix, each game-play combination has eight numbers. Thus, if all eight numbers of the lottery number 1102 match the eight numbers of one of the eighteen game-play combinations, the ticket holder can instantly win a jackpot. Thus, a jackpot prize distribution can be awarded to the ticket holder. In another embodiment, the prize distributions can be for a partial matching of the lottery number with any one of the set of game-play combinations. For example, matching seven numbers of one of the game-play combinations with seven numbers in the instant online lottery number 1102 would win a secondary prize as discussed above.

Figure 12:
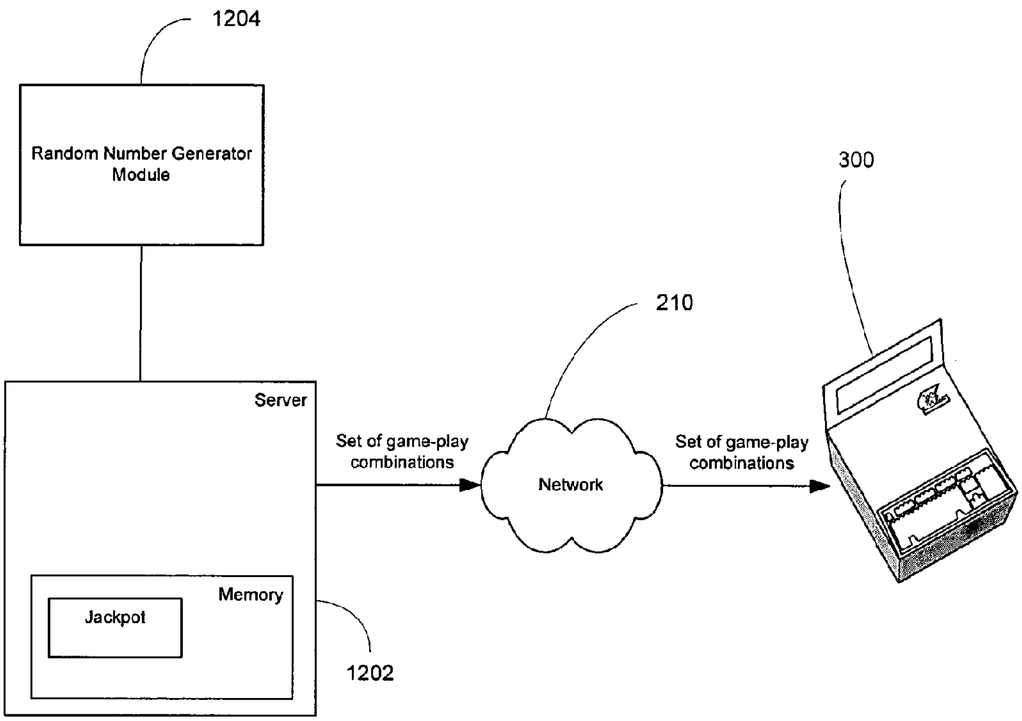
FIG. 12 illustrates a configuration in which a server sends game-play combinations to the lottery ticket dispensing machine.

FIG. 12 illustrates a configuration in which a server 1202 sends game-play combinations to the lottery ticket dispensing machine 300. The server 1202 can include a random number generator 1204. The random number generator 1204 can be utilized to generate the set of game-play combinations while the player can manually select the instant online lottery number. In one embodiment, the server 1202 first receives the instant online lottery number selected by the player such that the game-play combinations can be compared at the server 1202 against the selected instant online lottery number. If there is matching, the server 1202 reduces the jackpot by the prize distribution to the winning player. In another embodiment, the server 1202 does not receive the instant online lottery number and simply transmits the game-play combinations to the lottery ticket dispensing machine 300 to be compared against the various instant online lottery number, which can also be transmitted by the server. The lottery ticket dispensing machine 300 can then utilize lottery unit processor 406 to make the comparison. If there is a matching, the lottery unit processor 406 transmits a confirmation of the win, the extent of the match and the applicable prize or prizes to the server 1202.

In another embodiment, the random number generator 1204 can randomly generate a quick pick instant online lottery number. In another embodiment, the random number generator 1204 can randomly generate an instant online lottery number and the set of game-play combinations.

Figure 13:
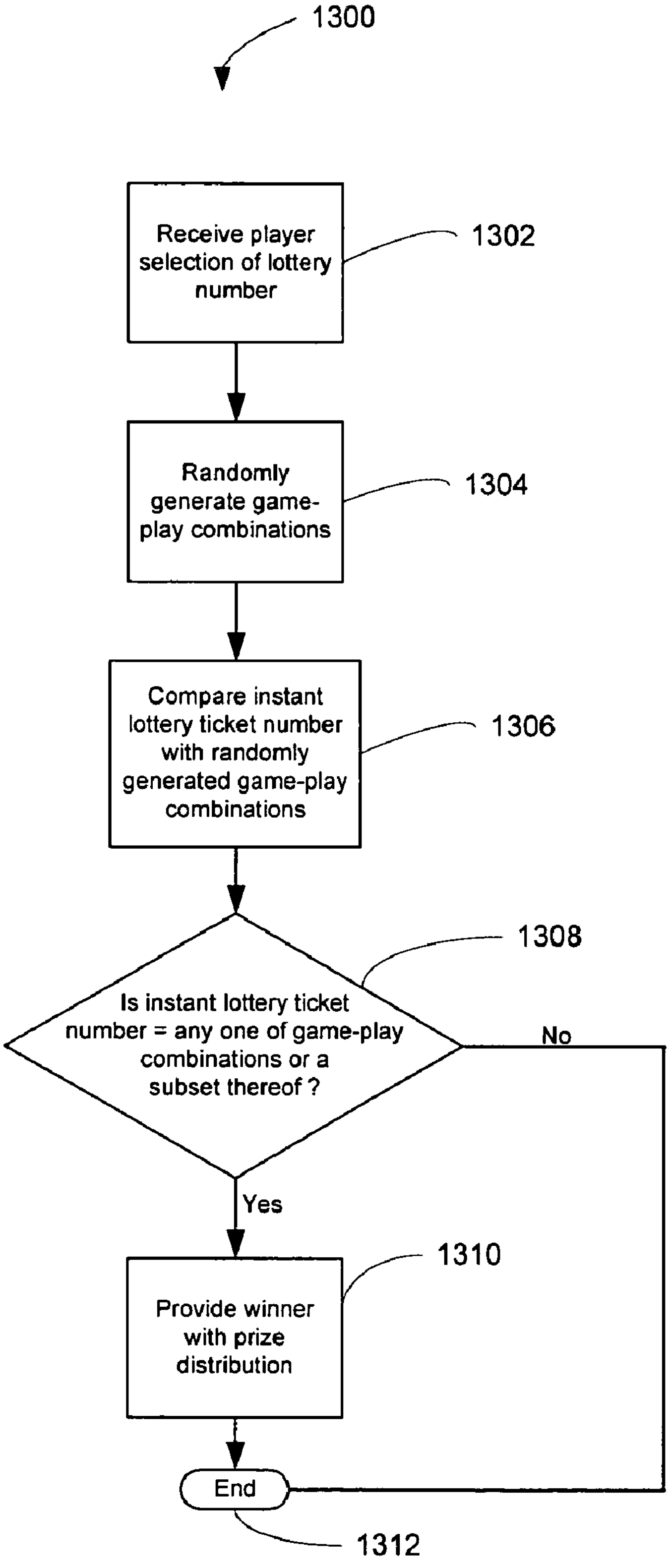
FIG. 13 illustrates a process for operating the instant online lottery game wherein the player selects the lottery number.

FIG. 13 illustrates a process 1300 for operating the instant online lottery game wherein the player can select the lottery number. At a process block 1302, the player can select an instant online lottery number. The player can manually enter the instant online lottery number through the input module 304 on the instant online lottery machine 300. At a process block 1304, the game-play combinations can be generated. In one embodiment, the instant online lottery unit 204 can generate the set of game-play combinations using the random generator 404. In another embodiment, the server can generate the game-play combinations using the random number generator 1204. In one embodiment, a second random generator can generate the instant online lottery number to be matched against the game-play combinations.

At a process block 1306, a comparison can be made between instant online lottery number and the set of game-play combinations. In one embodiment, the instant online lottery unit 204 can perform this comparison. In another embodiment, the server can perform this comparison. At a process block 1308, a determination can be made if the instant online lottery number matches any one of the game-play combinations partially or entirely. If the instant online lottery number partially or entirely matches one of the game-play combinations, the process 1300 can proceed to a process block 1310 where the winner is provided with the appropriate prize distribution. The process 1300 can then proceed to the end block 1312. If the instant online lottery number does not match any one of the game-play combinations, in whole or in part, the process 1300 can proceed to the end block 1312.

Figure 14:
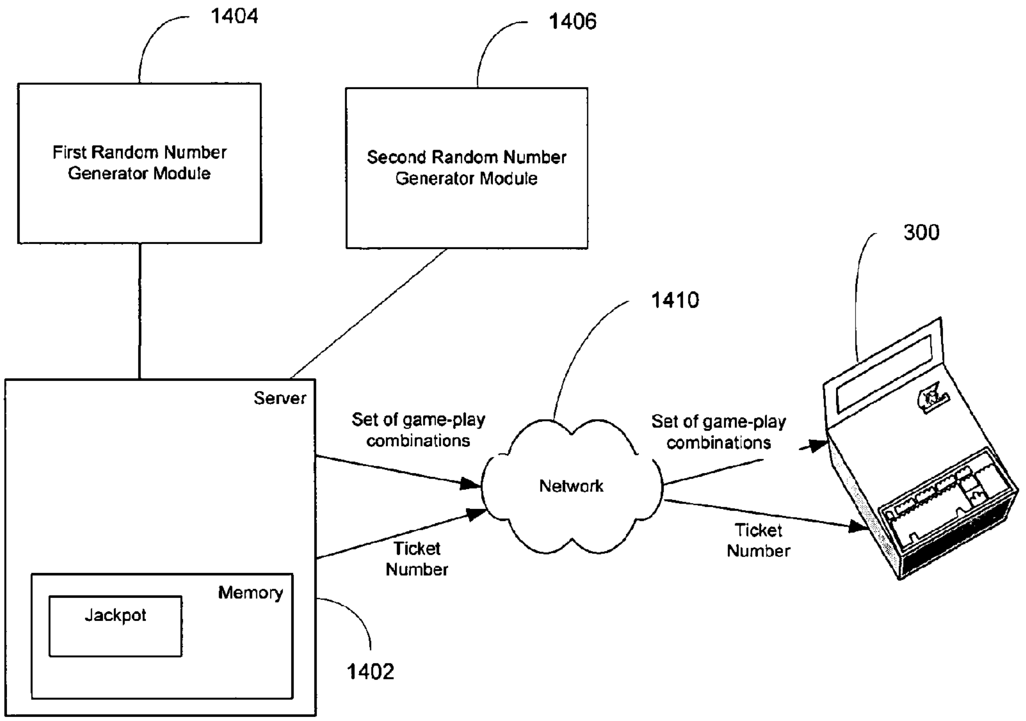
FIG. 14 illustrates a configuration in which a server sends game-play combinations and the instant online lottery number to the lottery ticket dispensing machine.

FIG. 14 illustrates a configuration in which a server 1402 sends game-play combinations and the instant online lottery number to the lottery ticket dispensing machine 300 through a network 1410. The server 1402 can include a first random number generator 1404 and a second random number generator 1406. The first random number generator 1404 can randomly generate the set of game-play combinations while the second number generator can randomly generate the instant online lottery number. In one embodiment, the game-play combinations can be compared at the server 1402 against the instant online lottery number. If there is complete matching, the server 1402 can reduce the jackpot by the prize distribution to the winning player. In the case of a partial match, where one or more fixed secondary prizes are won, the jackpot is not reduced.

Figure 15:
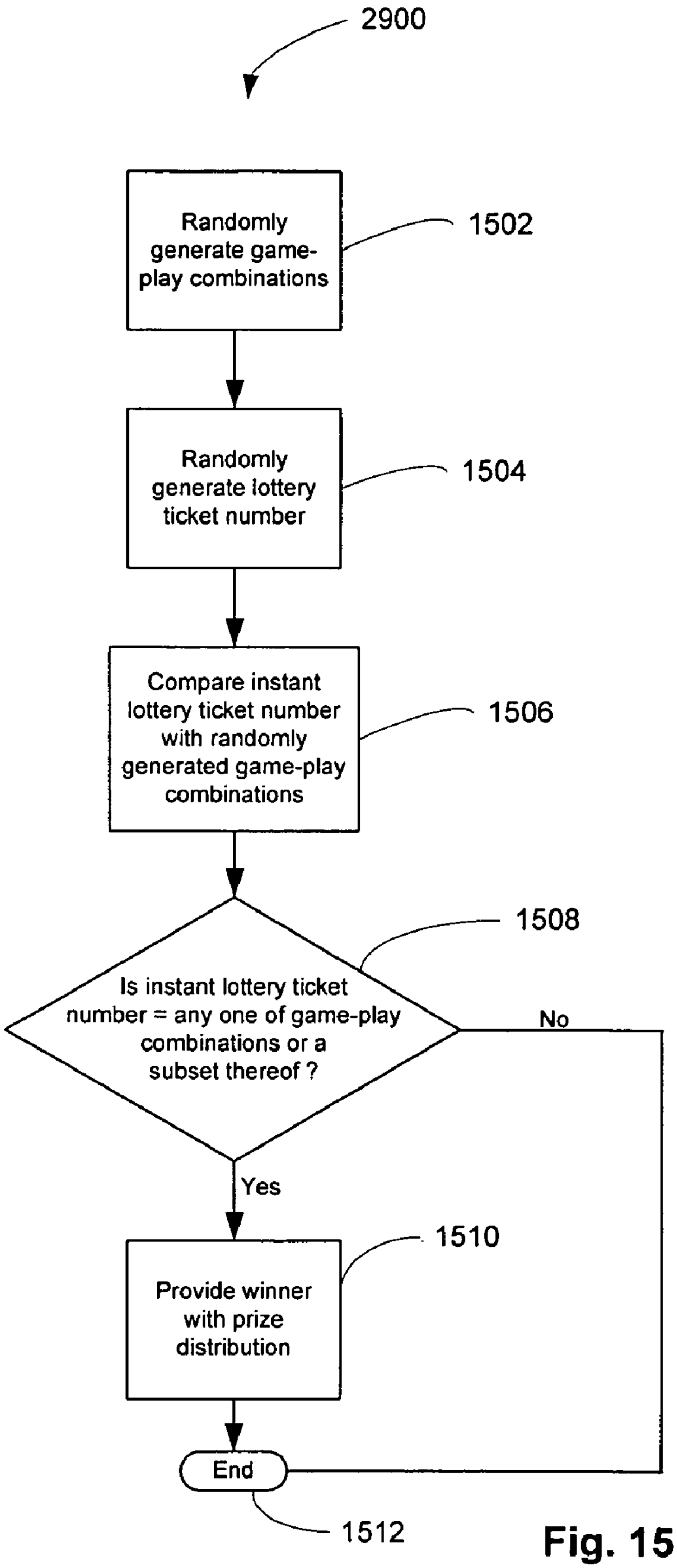
FIG. 15 illustrates a process for operating the instant online lottery game wherein the sever generates the game-play combinations and the instant online lottery number.

FIG. 15 illustrates a process 1500 for operating the instant online lottery game wherein the server can generate the game-play combinations and the instant online lottery number. At a process block 1502, the game-play combinations can be generated. In one embodiment, the instant online lottery unit 204 can generate the set of game-play combinations using the random number generator 404. In another embodiment, the server 1402 can generate the game-play combinations using the random number generator 1404. At a process block 1504, the instant online lottery number can be randomly generated. In one embodiment, the instant online lottery unit 204 can generate the lottery number using the random number generator 404. In another embodiment, the server 1402 can generate the game-play combinations using the random number generator 1406.

In one embodiment, the player can elect to have an instant online lottery number be randomly generated. The player can choose a quick pick button to have the instant online lottery unit 300 randomly generate the instant online lottery number for the player. In another embodiment, the lottery ticket can be randomly generated by default.

At a process block 1506, a comparison can be made between the instant online lottery number and the set of game-play combinations. In one embodiment, the instant online lottery unit 204 can perform this comparison. In another embodiment, the server can perform this comparison. At a process block 1508, a determination can be made if the instant online lottery number matches any one of the game-play combinations partially or entirely. If the instant online lottery number partially or entirely matches one of the game-play combinations, the process 1500 can proceed to a process block 1510 where the winner is provided with the prize distribution. The process 1500 can then proceed to the end block 1512. If the instant online lottery number does not match any one of the game-play combinations, the process 1500 can proceed to the end block 1512. In one embodiment, a minimum starting jackpot can be offered. Thus, if a jackpot is won, in whole or in part, and is thereby reduced, the balance of the jackpot can be the starting jackpot amount for the next game, or it can be combined with the starting jackpot amount for the next game, so as to provide greater incentive for players to buy tickets for the next game.

An instant online lottery game with multiple levels of participation is provided. Players can select the price of the ticket to be purchased. In one embodiment, the price of the ticket can increase or reduce the odds of winning. In another embodiment, the price of the ticket can increase or reduce the prize distribution but the odds are the same for all ticket holders. All of the above-described features can be applied to a multiple pricing instant online lottery game.

Figure 16:
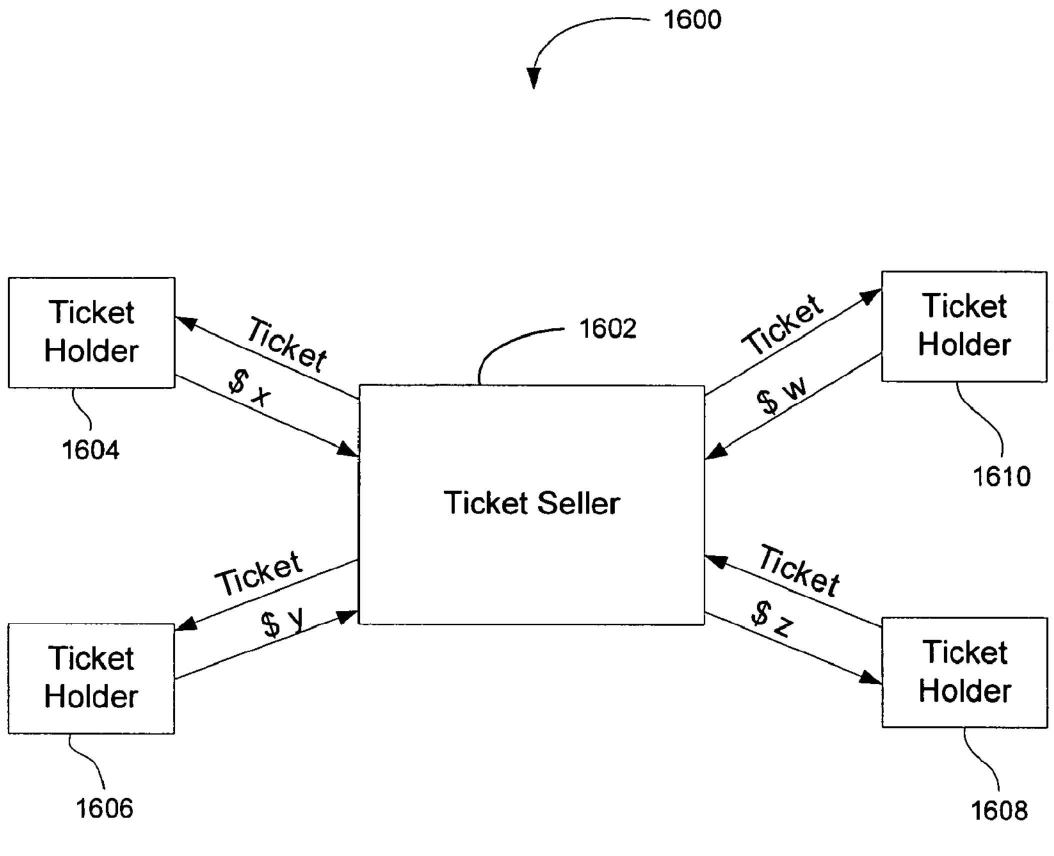
FIG. 16 illustrates an instant online lottery game system that utilizes multiple pricing.

FIG. 16 illustrates an instant online lottery game system 1600 that utilizes multiple pricing. Instant online lottery players can be provided with a selection of price categories and associated prize distributions. In one embodiment, a ticket holder 1604 can purchase a lottery ticket from a ticket seller 1602 in a first price category. The first price category can be for lottery tickets purchased for $w. The instant online lottery ticket in the first price category can be purchased from a ticket seller 1602. The first price category can be associated with a first prize distribution of a lottery prize that can be won. For example, the ticket holder 206 may have purchased the instant online lottery ticket for five dollars in order to play for a chance to win one hundred percent of the jackpot.

In another embodiment, a ticket holder 1606 can purchase an instant online lottery ticket in a second price category. The instant online lottery ticket can be purchased from a ticket seller 1602. For instance, the second price category can be lottery tickets purchased for $x. The second price category can be associated with a second distribution of an instant online lottery prize that can be won. For example, the ticket holder 1606 may have purchased the instant online lottery ticket for four dollars in order to play for a chance to win sixty percent of the jackpot.

In yet another embodiment, a ticket holder 1608 can purchase an instant online lottery ticket in a third price category. The instant online lottery ticket in the third price category can be purchased from a ticket seller 1602. For instance, the third price category can be lottery tickets purchased for $y. The third price category can be associated with a third distribution of an instant online lottery prize that can be won. For example, the ticket holder 1608 may have purchased the instant online lottery ticket for three dollars in order to play for a chance to win forty percent of the jackpot.

In another embodiment, a ticket holder 1610 can purchase an instant online lottery ticket in a fourth price category. The instant online lottery ticket in the fourth price category can be purchased from a ticket seller 1602. For instance, the fourth price category can be lottery tickets purchased for $z. The third price category can be associated with a fourth distribution of an instant online lottery prize that can be won. For example, the ticket holder 1610 may have purchased the instant online lottery ticket for two dollars in order to play for a chance to win twenty percent of the jackpot.

Although, in the above discussion, the first price category was associated with the ticket holder 204, the second price category with the ticket holder 206, and the third price category with the ticket holder 208, the ticket holders can be associated with different price categories. For instance, the first price category can be associated with the ticket holder 204 and the third price category can be associated with the ticket holder 206. Further, the methodologies discussed above can be extended to any number of price categories. For instance, there could be a fifth price category. Any number of price categories can be used. Also, the price categories can represent not only an opportunity to win a distinct pre-established portion of a jackpot but also a differing set of secondary prizes. The secondary prizes can be greater for a winning higher-priced ticket. Furthermore, the holder of a higher-priced ticket can qualify for the award of a secondary prize for the matching of a subset of numbers which would not qualify the holder of a lower-priced ticket for a prize.

FIG. 17 illustrates an example of a winnings table for the instant online lottery game system of FIG. 16. For example, a lottery can have a jackpot of two and a half million dollars. Lottery players can purchase a five-dollar ticket, a four-dollar ticket, a three-dollar ticket, and a two-dollar ticket.

The five-dollar ticket holder could receive the full jackpot of two million five hundred thousand dollars if the instant online lottery number of the five-dollar ticket matches in full any one of the game-play combinations. The four-dollar ticket gives the ticket holder a chance at receiving sixty percent of the jackpot. Therefore, the four-dollar ticket holder could at best receive one million five hundred thousand dollars if the instant online lottery number of the four-dollar ticket matches in full any one of the game-play combinations.

The three-dollar ticket could give the ticket holder a chance at receiving forty percent of the jackpot. Therefore, the three-dollar ticket holder could at best receive one million dollars if the instant online lottery number of the three-dollar ticket matches in full any one of the game-play combinations.

Finally, the two-dollar ticket could give the ticket holder a chance at receiving twenty percent of the jackpot. Therefore, the two-dollar ticket holder could at best receive five hundred thousand dollars if the instant online lottery number of the two-dollar ticket matches in full any one of the game-play combinations.

Figure 18:
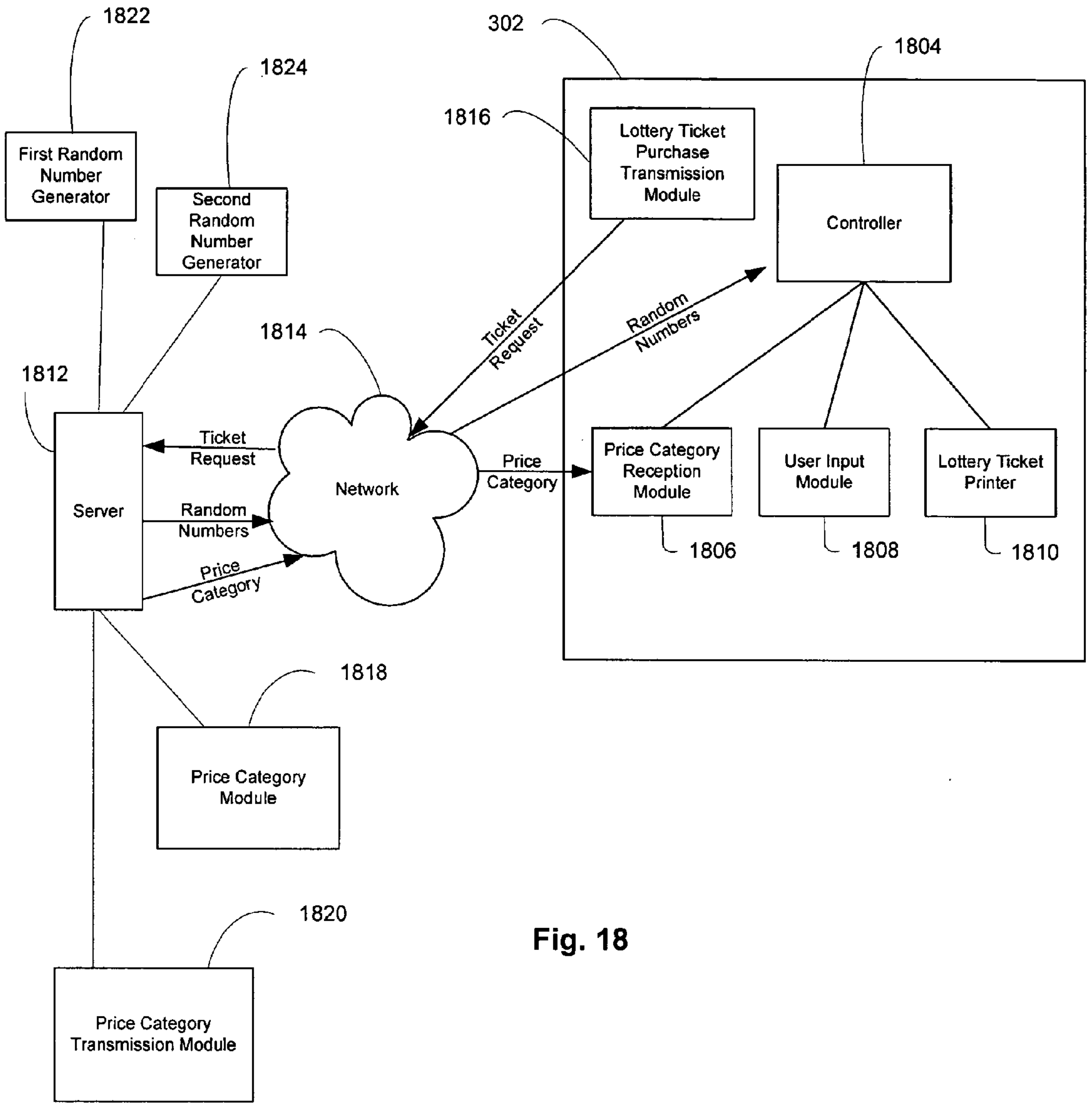
FIG. 18 illustrates an instant online lottery system.

FIG. 18 illustrates an instant online lottery system. The internal components of the housing 302 of the lottery ticket dispensing machine 300 can include a controller 1804, a price category reception module 1806, a user input module 1808, and a lottery ticket printer 1810. The controller 1804 coordinates the operation of these internal components.

The price category reception module 1806 can receive the different price categories in which lottery tickets can be purchased in the instant multi-priced lottery system. In one embodiment, the price category reception module can receive the different price categories and the associated distributions for each of the respective price categories. In one embodiment, a vendor can manually input the different price categories into the lottery ticket dispensing machine 300. In another embodiment, the vendor can electronically input the different price categories into the lottery ticket dispensing machine 300 by inserting a computer readable medium into the lottery ticket dispensing machine 300. In yet another embodiment, the price category reception module 1806 can receive the data related to the price category reception module from a server through a network.

In one embodiment, the user input module 1808 can receive a user input from the user input device 304. The user input module 1808 can communicate with the controller 1504 so that the controller can provide an instruction to the lottery ticket printer 1810 to print the lottery ticket.

In one embodiment, the lottery ticket dispensing machine 300 can communicate with a server 1812 to receive a price category and the associated distribution of the price category. The server 1812 can provide a price category through a network 1814 to the price category reception module 1806 in the lottery ticket dispensing machine 300. In one embodiment, multiple price categories can be sent simultaneously with their associated distributions. In another embodiment, each price category can be sent by itself with its associated distribution.

The lottery ticket dispensing machine 300 can communicate with a server 1812 to transmit a ticket request. In one embodiment, the housing 302 can also house a lottery ticket purchase transmission module 1816. The lottery ticket purchase transmission module 1816 can determine when a ticket has been purchased and can transmit a ticket request to a server 1812 through a network 1814. The ticket request received at the server 1812 can trigger the server 1812 to randomly generate lottery numbers as well as provide price categories to the lottery dispensing machine 300.

In another embodiment, the server 1812 can send price category information or data to the lottery ticket dispensing machine 300. The server 1812 can provide instructions to a price category module 1818 and to a price category transmission module 1820. The price category module 1818 can determine price categories and distributions in a multi-priced instant online lottery distribution as discussed above. The price category transmission module 1820 can then transmit the price category and the associated distribution through the network 1814 to the lottery ticket dispensing machine 300. In one embodiment, the price category reception module 1806 can receive information or data with respect to the price categories and associated distributions.

In another embodiment, the server 1812 can send random number ticket data to the lottery ticket dispensing machine 300. The server 1812 can provide instructions to a first random number generator module 1822 and to a second random number generator module 1824. The first random number generator module 1822 can randomly generate the instant online lottery numbers. The second random number generator 1824 can randomly generate a set of game-play combinations. In one embodiment, the controller 1802 can receive the data concerning price categories and associated distributions.

In another embodiment, the server can also send the ticket identifier 504 to be printed on the instant online lottery ticket. Thus, upon a lottery ticket holder winning a distribution, the lottery operator can verify that the ticket holder purchased a valid lottery ticket by confirming that the ticket identifier printed on the ticket matches the ticket identifier stored at the server 1812 and transmitted to the lottery operator.

Figure 19:
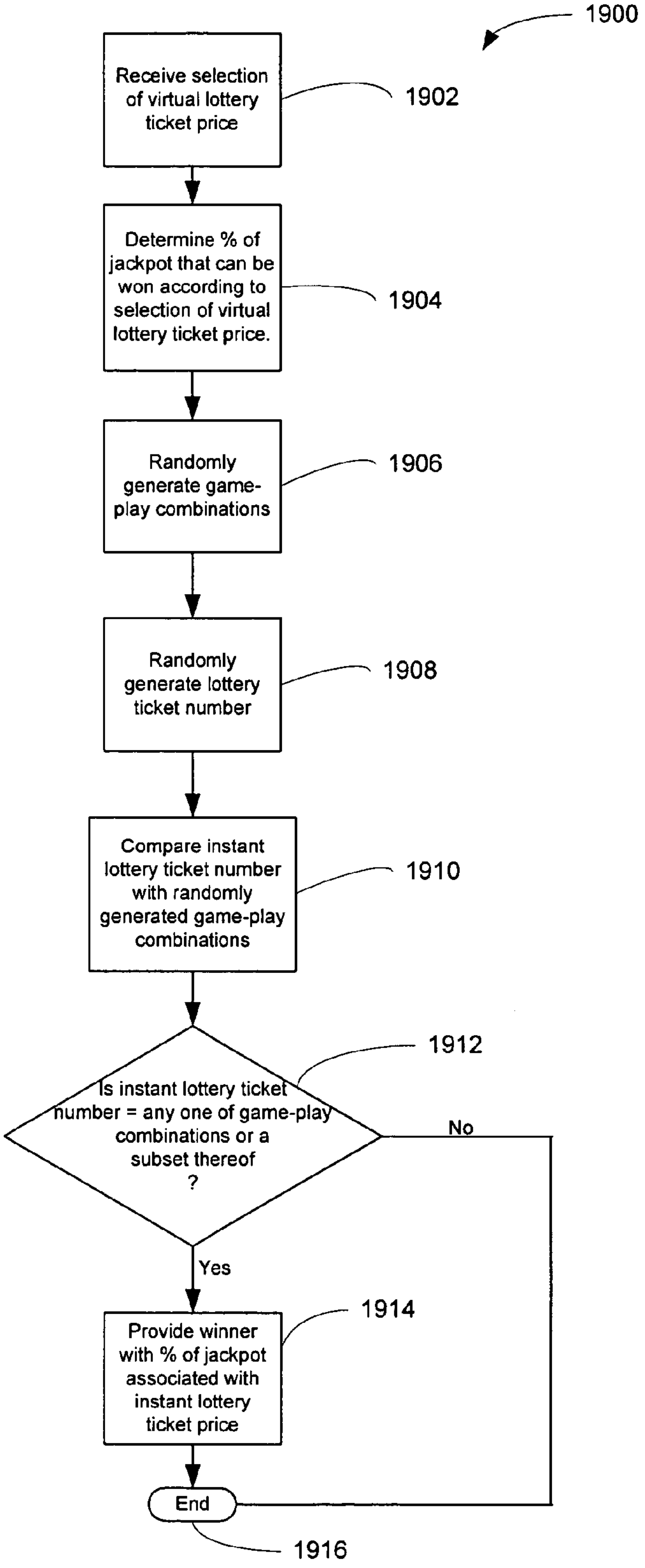
FIG. 19 illustrates a process for operating a multi-priced instant online lottery game.

FIG. 19 illustrates a process 1900 for operating a multi-priced instant online lottery game. At a process block 1902, a selection of an instant online lottery ticket price can be received. A determination of the potential distribution of the jackpot that can be won can be made at a process block 1904. If the lottery ticket price is associated with a percentage of the jackpot, the percentage of the current jackpot can be calculated and displayed to the player. In one embodiment, this calculation can be performed and displayed for all of the price categories prior to the player's selection at the process block 2802. Calculations can be performed to continuously enhance the jackpot based on the ongoing purchase of tickets. Thus, players can always be provided with updated jackpot prize distribution information through the linked instant online lottery units. If the secondary prizes for partial matching are fixed, then a calculation update is not needed for the secondary prizes.

At a process block 1906, an instant online lottery number can be randomly selected. In an alternative embodiment, the player can choose the quick pick button to have the instant online lottery unit 204, or a separate random number generator, randomly generate the instant online lottery number for the player. At a process block 1908, the game-play combinations for the instant online lottery numbers can be generated.

At a process block 1910, a comparison can be made between the instant online lottery number and various game-play combinations printed on the instant online lottery ticket. In one embodiment, the instant online lottery unit 204 can perform this comparison. In another embodiment, the server can perform this comparison.

At a process block 1912, a determination can be made as to whether the instant online lottery number matches a set of game-play combinations. If the instant online lottery number matches in full one of the game-play combinations, the process 19 can proceed to a process block 1914 where the winner can be provided with the percentage of the jackpot associated with the instant online lottery ticket price. Alternatively, if the instant online lottery number partially matches one of the game-play combinations the winner can be provided with a secondary prize which is determined based on the instant online lottery ticket price. Process 1900 can then proceed to the end block 1916. If the instant online lottery number does not match, in full or in part, the winning instant online lottery number, the process 1900 can proceed to the end block 1916.

Figure 20:
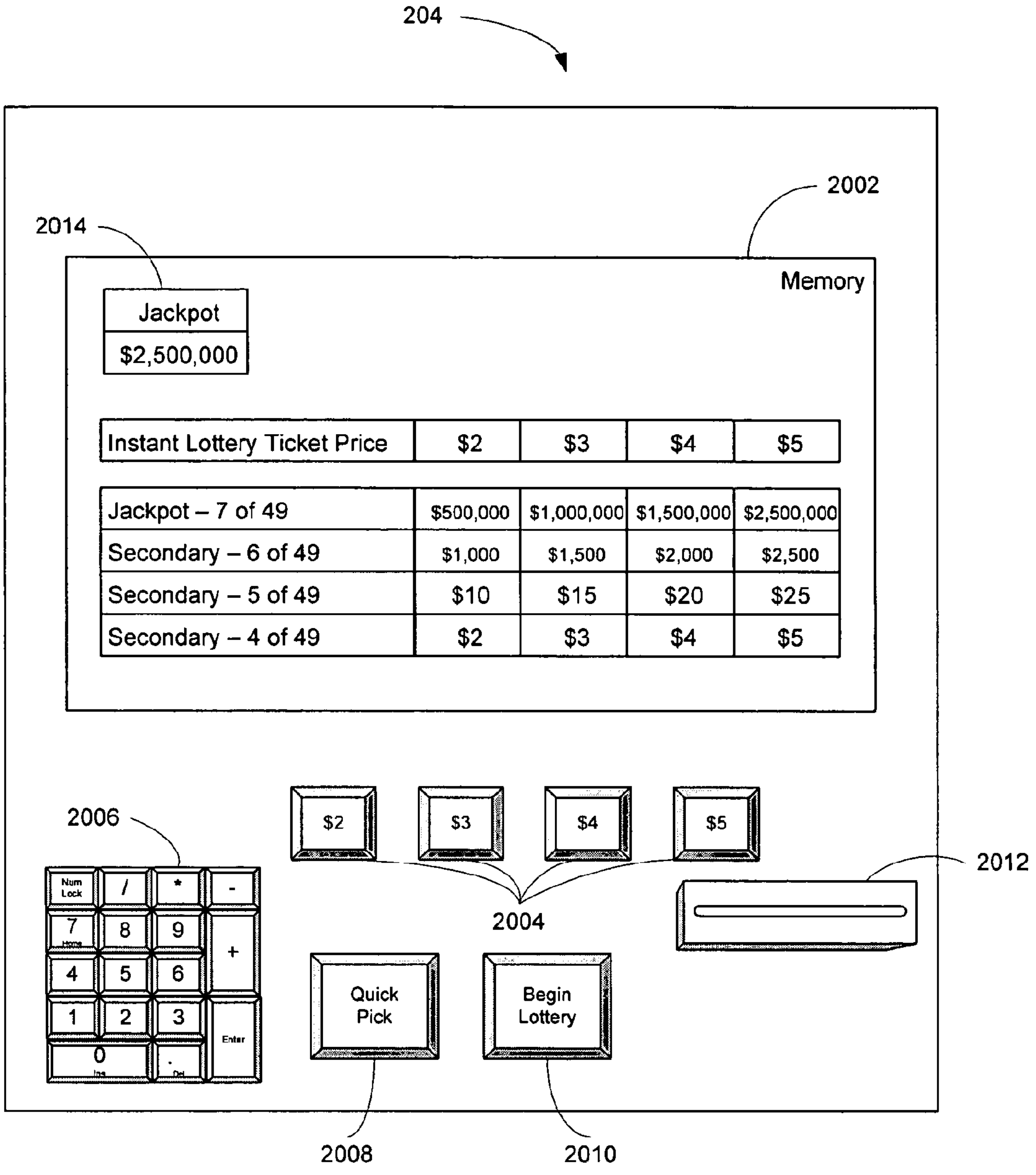
FIG. 20 illustrates the instant online lottery unit.

FIG. 20 illustrates the instant online lottery unit 204. The instant online lottery unit can have a jackpot display 2014 that indicates the jackpot value. In one embodiment, the server 1812 can send the jackpot value to the instant online lottery unit for display on the jackpot display 2014. The instant online lottery unit can also have an instant online lottery price display 2002 that displays prices for instant online lottery tickets and associated known prize distributions for each of the instant online lottery ticket prices.

An indication can also be provided as to whether an instant online lottery ticket allows for secondary prizes. In one embodiment, the secondary prizes can vary according to the number of matched numbers and the price of the instant online lottery ticket. In another embodiment, the secondary prices can vary only according to the number of matched numbers between the instant online lottery number and the set of game-play combinations.

In one example, the secondary prize distributions for a seven-by-seven matrix can be provided as part of the lottery ticket price display 2002. A two-dollar instant online lottery ticket can be purchased to potentially win a secondary prize. In one embodiment, the secondary prize value can depend on the partial matching of instant online lottery numbers with one or more of the game-play combinations. As previously discussed, each of the sixteen game-play combinations in a seven-by-seven matrix includes seven numbers. In one example, a two-dollar instant online lottery number matching six numbers of the game-play combination can win one thousand dollars. A two-dollar instant online lottery number matching five numbers of a game-play combination can win ten dollars. Finally, a two-dollar instant online lottery number matching four numbers of a game-play combination can win two dollars.

In another example, a three-dollar instant online lottery ticket can be purchased to potentially win a secondary prize. In a seven-by-seven matrix, a three-dollar instant online lottery number matching six numbers of the game-play combination can win one thousand five hundred dollars. A three-dollar instant online lottery number matching five numbers of a game-play combination can win fifteen dollars. Finally, a three-dollar instant online lottery number matching four numbers of a game-play combination can win three dollars.

In yet another example, a four-dollar instant online lottery ticket can be purchased to potentially win a secondary prize. In a seven-by-seven matrix, a four-dollar instant online lottery number matching six numbers of the game-play combination can win two thousand hundred dollars. A four-dollar instant online lottery number matching five numbers of a game-play combination can win twenty dollars. Finally, a four-dollar instant online lottery number matching four numbers of a game-play combination can win four dollars.

In another example, a five-dollar instant online lottery ticket can be purchased to potentially win a secondary prize.

In a seven-by-seven matrix, a five-dollar instant online lottery number matching six numbers of the game-play combination can win two thousand five hundred dollars. A five-dollar instant online lottery number matching five numbers of a game-play combination can win twenty-five dollars. Finally, a five-dollar instant online lottery number matching four numbers of a game-play combination can win five dollars.

A plurality of price selection inputs 2004 can be provided so that the player can select the instant online lottery ticket that the player would like to purchase. For instance, the player can press the two-dollar button if the player would like to purchase the two-dollar instant online lottery ticket to potentially win the jackpot distribution prize of five hundred thousand dollars, which can represent twenty percent of the jackpot, or any of the associated secondary prizes. Further, the player can press the three-dollar button if the player would like to purchase the three-dollar instant online lottery ticket to potentially win the jackpot distribution prize of one million dollars, which can represent forty percent of the jackpot, or any of the associated secondary prizes. In addition, the player can press the four-dollar button if the player would like to purchase the four-dollar instant online lottery ticket to potentially win the jackpot distribution prize of one million five hundred thousand dollar, which can represent sixty percent of the jackpot, or any associated secondary prizes. Finally, the player can press the five-dollar button if the player would like to purchase the five-dollar instant online lottery ticket to potentially win the jackpot of two million five hundred thousand, which can represent one hundred percent of the jackpot, or any of the associated secondary prizes. In a further aspect, in lieu of providing ticket process buttons, the player can inform the ticket vendor of his or her ticket price selection, either orally or through use of a ticket purchase form. The ticket vendor can then enter the appropriate data, including ticket price information.

The player can enter a selection of an instant online lottery number through an input module 2006. In one embodiment, the input module 2006 can be a keypad. In another embodiment, the input module 2006 can be a touch screen. Alternatively, the player can press a quick pick button 2008 to have the instant online lottery unit 204 select the instant online lottery number for the player. The player can press an instant online lottery initiation button 2010 to begin lottery play. Further, the payment module 2012 can receive one of the various forms of payment described above.

In one embodiment, the instant online lottery unit 202 can have the plurality of buttons illustrated, such as the input module 2006 and the quick pick button 2008, to determine the instant online lottery number. In another embodiment, a menu can be provided that provides the player with the ability to make a choice of a manual selection or of a quick pick selection of the instant online lottery number. The menu can be provided on a computerized display such as a liquid crystal display or a plasma display.

Figure 21B:
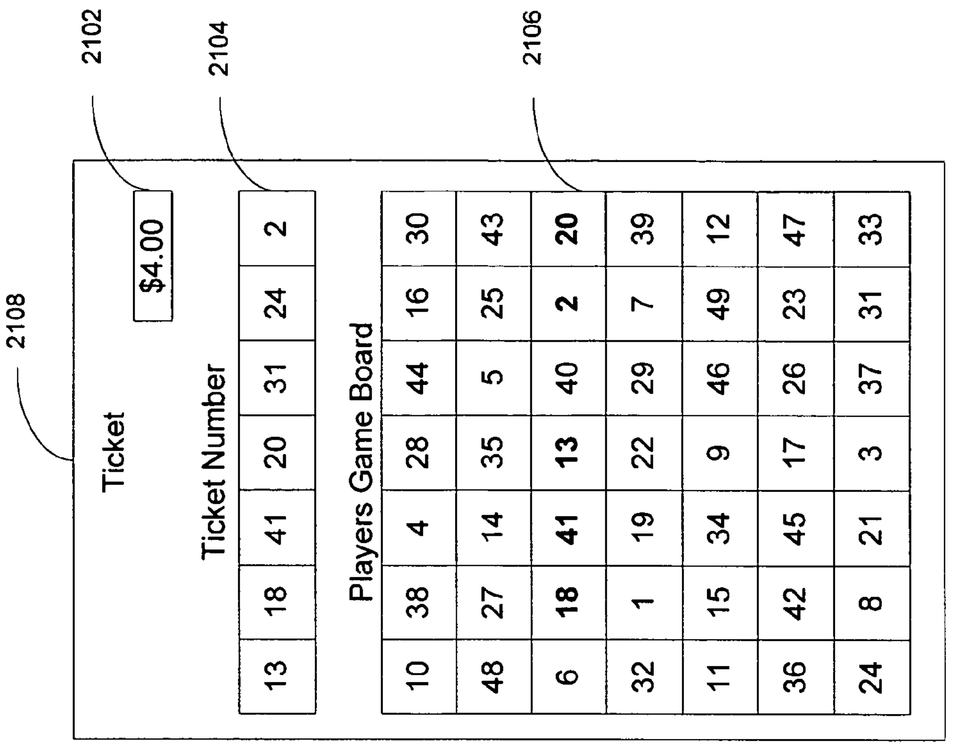
FIG. 21B illustrates a four-dollar ticket in a multi-priced instant online lottery game, with the ticket having a game-play combination with five matching numbers.
Figure 21A:
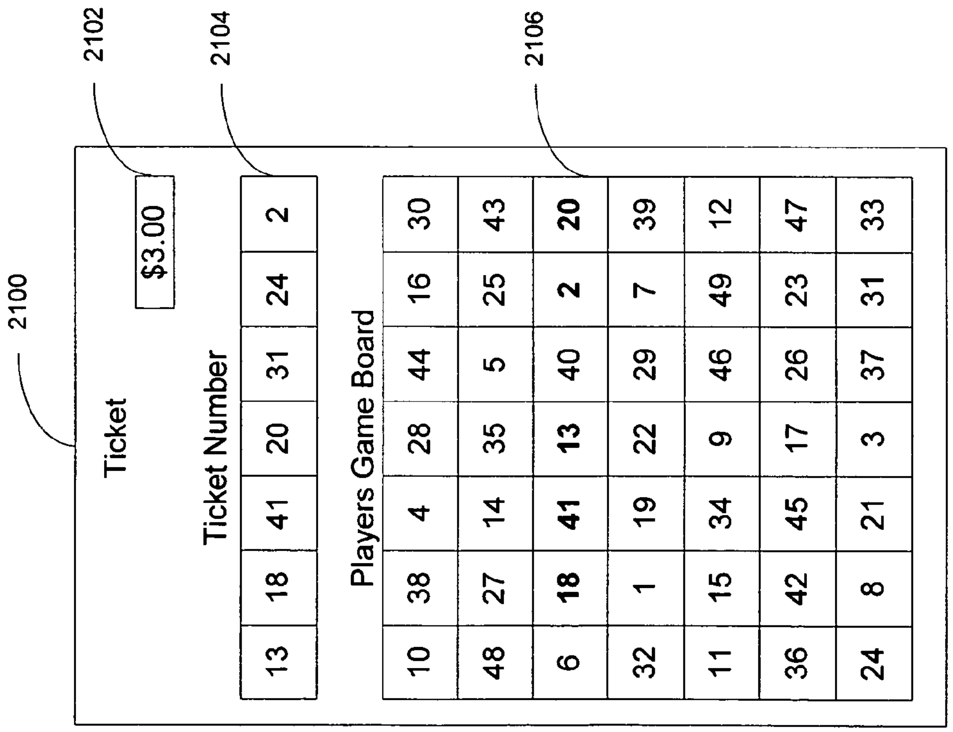
FIG. 21A illustrates a three-dollar ticket in a multi-priced instant online lottery game, with the ticket having a game-play combination with five matching numbers.

FIG. 21A illustrates a three-dollar ticket in a multi-priced instant online lottery game ticket, with the ticket having a game-play combination with five matching numbers. The ticket 2100 can include the price designation 2102, the instant online lottery number 2104, and a player's game board 2106. The player's game board can include the game-play combinations (for example sixteen game-play combinations in a seven-by-seven matrix). In one example, the prize distribution can be the prize distribution illustrated in FIG. 20. A player that purchases a three-dollar ticket for an instant online lottery game can have the opportunity to win a jackpot percentage of forty percent or one million dollars, or secondary prizes according to the prize distribution illustrated in FIG. 20. The instant online lottery ticket 2100 shows that the instant online lottery number matches five numbers of the third row of the player's game board 2106. In one embodiment, there can be sixteen game-play combinations. Based on the prize distribution illustrated in FIG. 20, the three-dollar instant online lottery number matching five numbers of a game-play combination can win fifteen dollars.

FIG. 21B illustrates a four-dollar ticket in a multi-priced instant online lottery game ticket, with the ticket having a game-play combination with five matching numbers. A player that purchases a four-dollar ticket for an instant online lottery game can have the opportunity to win a percentage of the jackpot that amounts to one million five hundred thousand dollars, or secondary prizes according to the prize distribution illustrated in FIG. 20. The instant online lottery ticket 2108 shows that the instant online lottery number matches five numbers of the third row of the player's game board 2106. In one embodiment, there can be sixteen game-play combinations. Based on the prize distribution illustrated in FIG. 20, the four-dollar instant online lottery number matching five numbers of a game-play combination can win twenty dollars. As such, the four-dollar ticket holder can win five more dollars in comparison with the three-dollar ticket holder, even when the instant online lottery number and the game-play combinations are the same.

Figure 22B:
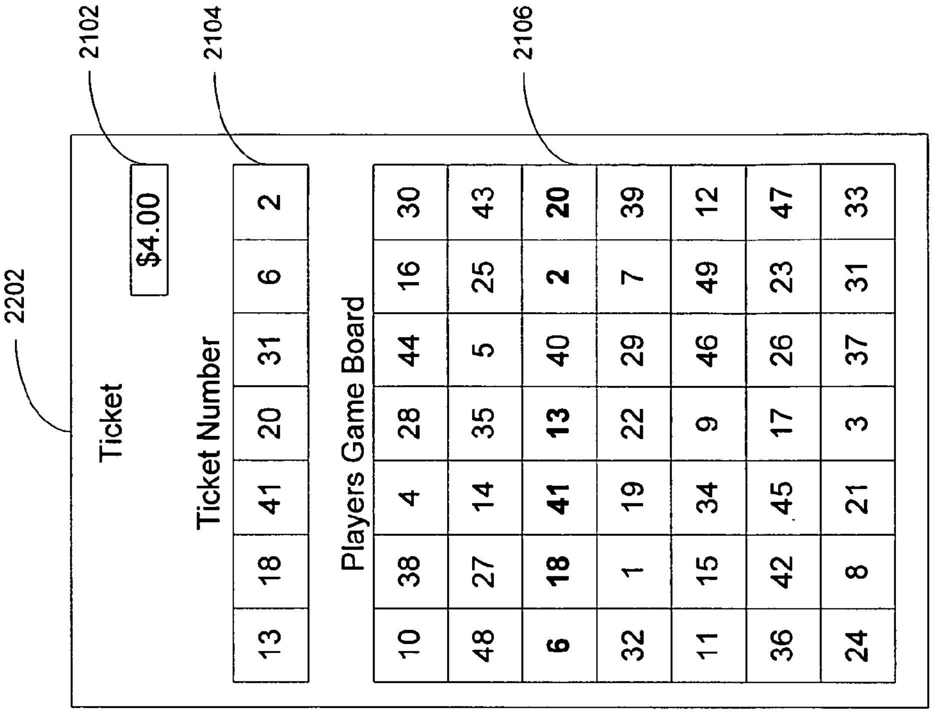
FIG. 22B illustrates a four dollar-ticket in a multi-priced instant online lottery game, with the ticket having a game-play combination with six matching numbers.
Figure 22A:
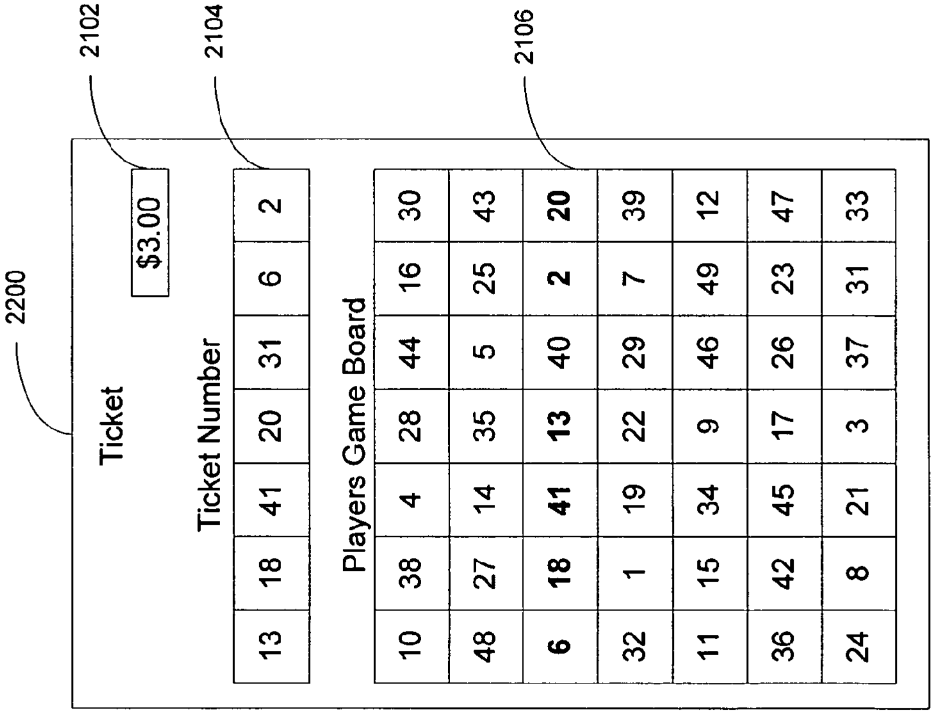
FIG. 22A illustrates a three-dollar ticket in a multi-priced instant online lottery game, with the ticket having a game-play combination with six matching numbers.

FIG. 22A illustrates a three-dollar ticket in a multi-priced instant online lottery game, with the ticket having a game-play combination with six matching numbers. Ticket 2200 is a three-dollar ticket for an instant online lottery game that can provide the player with the opportunity to win prizes according to the prize distribution illustrated in FIG. 20. The instant online lottery ticket 2108 shows that the instant online lottery number matches six numbers of the third row of the player's game board 2106. Thus, the three-dollar instant online lottery number matching six numbers of a game-play combination can win one thousand five hundred dollars.

FIG. 22B illustrates a four dollar-ticket in a multi-priced instant online lottery game, with the ticket having a game-play combination with six matching numbers. A player can likewise purchase a ticket 2202 with the same instant online lottery number and game-play combination numbers for a four-dollar price. Based on the prize distribution illustrated in FIG. 20, the player having the four-dollar ticket 2202 with a six-number match can instantly win two thousand dollars. Accordingly, in comparison with the three-dollar ticket holder, the four-dollar ticket holder can win an additional five hundred dollars. Thus, players have an incentive to buy higher-priced tickets, because of the potential of winning higher fixed secondary prizes and/or the potential to win a higher portion of the available jackpot.

Figure 23:
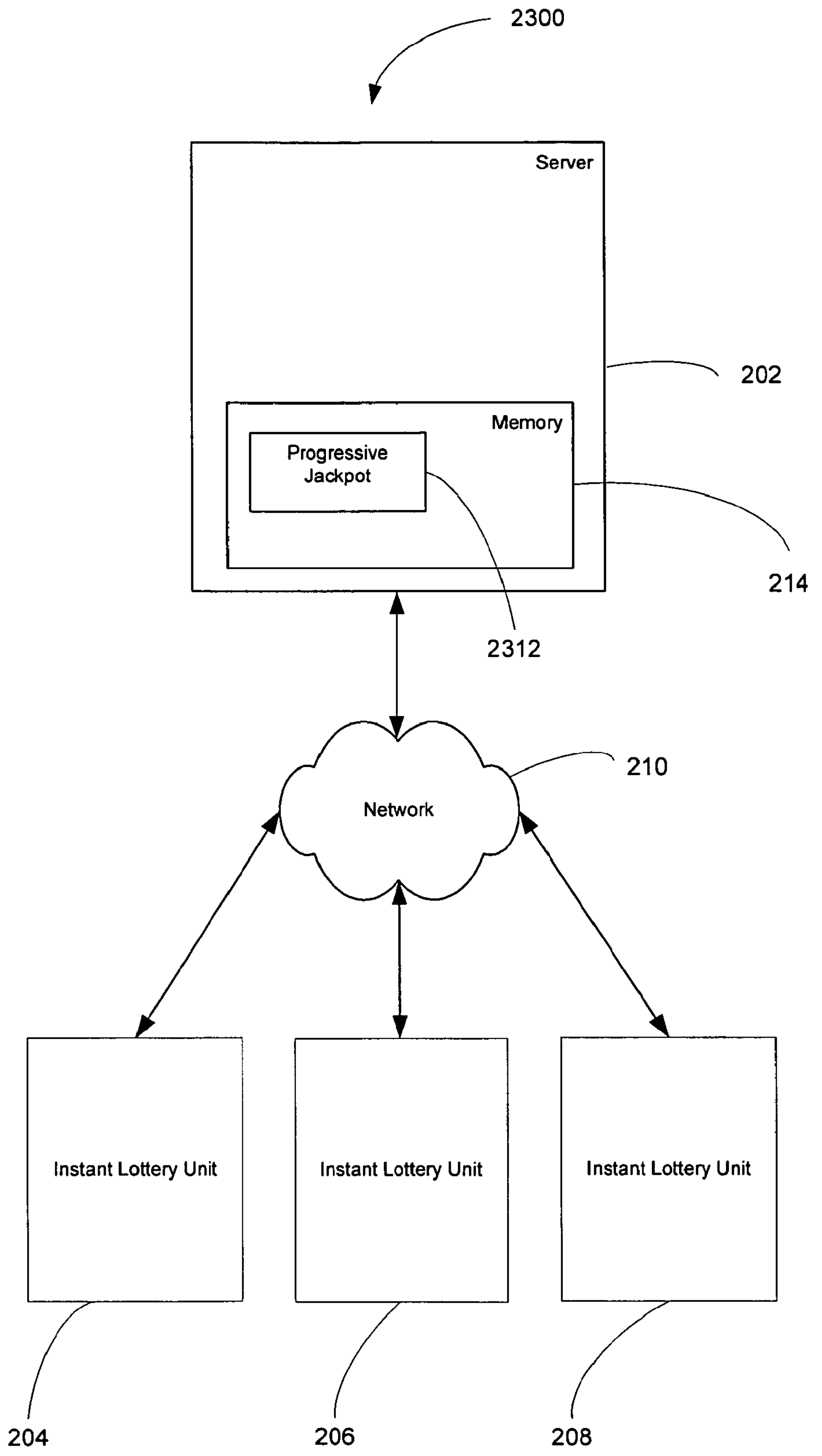
FIG. 23 illustrates an instant online lottery system with a progressive jackpot.

FIG. 23 illustrates an instant online lottery system 2300 with a progressive jackpot 2312. The lottery system 2300 depicted in FIG. 23 is the lottery system depicted in FIG. 2 with a jackpot that is illustrated as being progressive. Because the lottery system of FIG. 23 utilizes a progressive jackpot, the ticket holder can win a larger jackpot than initially advertised. In one embodiment, the jackpot can be increased with a portion of the revenue from each instant online lottery ticket sold.

In one embodiment, the server 202 can communicate with the first instant online lottery unit 204, the second instant online lottery unit 206, and the third instant online lottery unit 208. As players provide payment to enter or initiate an instant online lottery game at one of the units, at least a portion of the payment can be added to a progressive jackpot 2312 stored in the memory 214. As discussed above, the instant online lottery units can be stand-alone terminals configured to interact directly with the players. In another embodiment, the instant online lottery units can be configured within the existing terminals used by a lottery operator to provide the traditional online future-draw lottery games. In another embodiment, the instant online lottery units can be the existing terminals used by a lottery operator to provide the traditional online future-draw lottery games. Utilization of existing infrastructure can allow a lottery operator to avoid costs associated with the creation, acquisition and installation of a new distribution network, terminals and servers.

The networking capability between several instant online lottery units can allow each of the several units to access and report changes in a single progressive jackpot 2312. Furthermore, instant online lottery units can be linked together through a server 202 and network 210 such that data reported by one instant online lottery unit can be broadcasted or communicated to the other instant online lottery units. For example, an increase in the jackpot 202 can be immediately broadcasted or communicated to the rest of the linked instant online lottery units. Thus, the progressive jackpot 2312 can be shared among instant units 204, 206, and 208. In one embodiment, a minimum amount of ticket sales is not required and a starting jackpot can be provided and guaranteed with regard to ticket sales. The lottery prize can be a variable prize from the outset, increasing with each ticket sold. Accordingly, a percentage of each ticket sale can be contributed to the progressive jackpot 2312, with a greater amount contributed by higher-priced tickets.

In one embodiment, a fixed amount of money can be added to the jackpot for each ticket sold regardless of the value of the ticket. This would make the progressive jackpot increase in direct proportion to the number of tickets sold.

In another embodiment, a percentage of the value of each ticket sold can be added to the jackpot. This would make the progressive jackpot increase in direct proportion to the total sales of instant online lottery tickets.

By having the instant online lottery units connected through the network 210, the progressive jackpot 2312 can build up based on the quantity and the utilization of the instant online lottery units. Players do not have the time constraints of having to wait for a lottery drawing with a traditional online lottery game. Further, players do not have to wait for selections of other players. Accordingly, the progressive jackpot can build up quickly through this type of configuration. The progressive jackpot 2312 can also build up in a similar manner and more quickly, so as to create a larger jackpot, if the instant online lottery units are linked to one another.

In addition, the instant online lottery game having a progressive jackpot can be offered by a lottery operator at different ticket prices. Thus, the instant online lottery game can have a progressive jackpot where the tickets are multi-priced. As discussed above, different ticket prices provide a player with the opportunity to play for a pre-determined percentage of the progressive jackpot, or the progressive jackpot in its entirety, with the choice of ticket price and associated prizes being made by the player. For example, a one-dollar ticket holder can participate and play for a lower percentage of the progressive jackpot, while a three-dollar ticket holder can play for a higher percentage or, if the three-dollar ticket is the most expensive ticket, for the entire progressive jackpot. In addition, the offering of multi-priced tickets can afford the opportunity to quickly generate large increasing jackpots if the contribution to the progressive jackpot is a percentage of ticket sales.

Furthermore, the progressive jackpot feature can continue to operate after a prize is distributed to a winning ticket holder and the jackpot need not automatically revert to the minimum or starting jackpot if the winning ticket holder purchased other than the highest-priced ticket. For example, if a one-dollar instant online lottery ticket holder wins, the progressive jackpot distribution can be a portion of the progressive jackpot, leaving the balance of the progressive jackpot for subsequent players. This balance can be enhanced through additional contributions to the jackpot through, for example, an insurance-backed third-party prize guarantee. As such, the progressive jackpot can continue to increase as new instant online lottery tickets are purchased.

In one embodiment, both the one-dollar ticket holder and the three-dollar ticket holder can participate with the same odds but for different prizes. In contrast, traditional online lotteries only offer single-priced tickets.

In one embodiment, the instant online lottery ticket is associated with a percentage of the progressive jackpot 2312 based on the instant online lottery ticket price. For example, instant online lottery tickets can be offered at three different prices: one dollar, two dollars, and three dollars. In another example, a greater or lesser number of ticket price categories can exist. A player with a one-dollar ticket could win twenty-five percent of the progressive jackpot, a player with a two-dollar ticket could win fifty percent of the progressive jackpot, and a player with a three-dollar ticket could win one hundred percent of the progressive jackpot. Consequently, the percentage of the possible jackpot winnings associated with each ticket price can vary. This can afford a player purchasing an instant online lottery ticket at a lower price the benefit of participating in a jackpot where other players purchasing an instant online lottery ticket at higher prices are contributing even more to the progressive jackpot. For example, a player with a one-dollar ticket can have an associated percentage of the progressive jackpot that the player can win, and a player with a two-dollar ticket or a three-dollar ticket can also have an associated and higher percentage of the progressive jackpot that the player can win. If the one-dollar ticket holder wins, the one-dollar ticket holder benefits from the portion of the ticket sales revenues contributed by the purchase of two-dollar tickets and three-dollar tickets to the progressive jackpot. In essence, multiple levels of participation can be allowed in a progressive jackpot. Even though the one-dollar ticket holder is limited to winning a lesser percentage, for example, twenty-five percent, the one-dollar ticket holder can benefit from the increase in the jackpot prize resulting from the sale of higher-priced tickets.

If the majority of potential ticket buyers are induced to purchase three-dollar tickets, the potential ticket holders that can only afford to purchase a one-dollar ticket are still provided with an incentive to participate in the lottery because these ticket holders can still win a portion of a progressive jackpot 2312 that can potentially grow quite large. The growth of the progressive jackpot 2312 can be enhanced further with the percentage contribution from the higher-priced tickets and relatively high starting jackpots resulting from probability-based third-party prize guarantees, as compared with the more traditional pari-mutuel based single-priced-online lottery model. The potential ticket holders that can afford the higher-priced instant online lottery tickets can be even further induced to purchase higher-priced tickets due to the prospect of winning a larger portion of the progressive jackpot and higher secondary prizes. As stated previously, lottery players have an incentive to buy three-dollar tickets where the more expensive tickets provide the opportunity to win a greater distribution percentage. With a progressive jackpot, players have an even greater incentive to buy tickets that are more expensive because the jackpot keeps increasing and the potential distribution grows larger.

Furthermore, when a multiple pricing scheme is utilized, players are further encouraged to buy instant online lottery tickets. In traditional lotteries, when the jackpot is won, the next game starts anew with a starting-level jackpot that is generally low. When a multiple pricing scheme is utilized, however, the jackpot is on average maintained at higher levels than without a multiple-pricing scheme.

That is, following the matching of the instant online lottery number with any one of the game-play combinations, the progressive jackpot is reduced for ongoing games. For example, instant online lottery tickets can be offered at three different prices: one dollar, two dollars, and three dollars. A player with a one-dollar ticket could win twenty-five percent of the progressive jackpot, a player with a two-dollar ticket could win fifty percent of the progressive jackpot, and a player with a three-dollar ticket could win one hundred percent of the progressive jackpot. If the player with the three-dollar instant online lottery ticket was the winner, the progressive jackpot can be reduced by the full amount of the jackpot. Then, the jackpot can start at zero or at a minimum guaranteed amount. If the player with a one-dollar instant online lottery ticket was the winner, such winner could win only twenty-five percent of the jackpot, and the remaining seventy-five percent could carry over for continuing play. Similarly, if the winner was a purchaser of a two-dollar instant online lottery ticket, such winner could only win fifty percent of the jackpot, and the balance of fifty percent could be carried over for continuing play. In essence, a rollover is provided when no player wins the progressive jackpot, and a limited rollover is provided even when there is a winner, as long as the winner has a lower-denomination or lower-priced ticket. Accordingly, where the jackpot is on average at a significantly higher level potential customers or players can be induced to participate and purchase lottery tickets or to increase the amount spent in the purchase of a ticket. This is in contrast to traditional online lottery games, which only permit the purchase of single-priced tickets and, therefore, do not have the potential for limited rollovers and have jackpots that fall to minimum levels after each jackpot win. Traditional online lottery games do not provide the same inducement to potential lottery ticket holders to purchase or increase the amount spent on lottery tickets as the multi-priced instant online model described herein.

As it is well known in the art, higher jackpots attract more players to the game. An instant online lottery game that has both a progressive jackpot that continuously grows with the instant online lottery ticket sales and a multiple-level pricing scheme can maintain the average progressive jackpot at higher levels. Higher average progressive jackpots can also be achieved through higher-starting jackpot amounts resulting from a probabilistic model and use of third-party prize guarantees. Higher average progressive jackpots further induce play and increase ticket sales revenue.

The lottery game described in FIGS. 5-11 can alternatively be provided as a daily-draw or delayed draw lottery game, as an alternative to an instant online lottery game. In one embodiment, an instant online lottery number can be selected first when the ticket is purchased and, at the end of the game day, following the last ticket purchase, by a draw of each of the game-play combinations. In another embodiment, an instant draw or selection can be made by a random number generator for all of the game-play combinations in the form of a matrix or grid and set forth in the purchased ticket. Upon the completion of the game there can be a subsequent draw for the selection of the winning lottery number. Two or more ticket holders can have instant online lottery numbers that provide a match and qualify for the jackpot or a percentage of the jackpot. In one embodiment, the jackpot distribution can be shared among the winning ticket holders.

Inter-sharing and intra-sharing methodologies can be implemented in this daily online lottery game. For instance, if two players win a progressive jackpot following the same draw, the two players can intra-share if they purchased daily online lottery tickets for the same price or can inter-share if they purchased daily online lottery tickets for different prices. If multiple players win at the same time, the players can inter-share across price categories and can intra-share within the same price category.

In one example, there can be a three-dollar ticket winner and a one-dollar ticket winner. The jackpot can be for ten million dollars. The three-dollar ticket winner can share the jackpot with the one-dollar ticket winner. The one-dollar ticket winner can receive one million two hundred fifty thousand dollars through an inter-sharing distribution. Further, the three-dollar ticket winner can receive one million two hundred fifty thousand dollars through an inter-sharing distribution formula. Finally, the three-dollar ticket winner can receive seven million five hundred thousand dollars through an intra-shared distribution.

In one embodiment, a second multi-priced instant game can be provided. The instant game can be similar in certain respects to the traditional instant peel-off or scratch-off games but can be offered and played with a ticket that is printed at a traditional online lottery terminal instead of using a traditional pre-printed instant-style ticket. In addition, the multi-priced instant game can include a multiple pricing scheme that offers ticket purchasers the option of playing for larger prizes if a higher-priced ticket is purchased and for smaller prizes if a lower-priced ticket is purchased. In one embodiment, the instant game can be provided by itself. In another embodiment, the instant game can be offered in combination with the lottery game described in FIGS. 5-11 and without any separate charge. In another embodiment, the instant game can be offered as an add-on game requiring a second or optional purchase.

Figure 24:
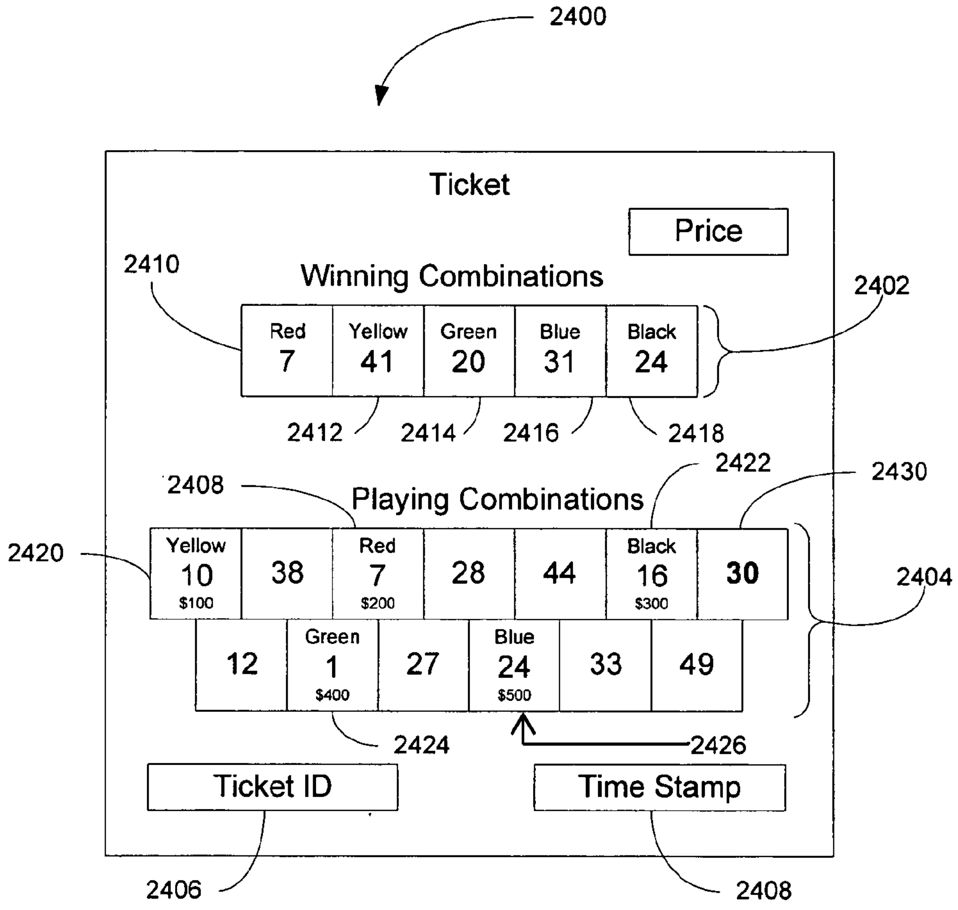
FIG. 24 illustrates a multi-priced instant game ticket.

FIG. 24 illustrates a multi-priced instant game ticket 2400. In one embodiment, the instant game ticket can include a set of winning combinations 2402, a set of playing combinations 2404, a ticket identifier 2406 and a timestamp 2408. In one embodiment, the set of winning combinations 2402 can include squares each having a number and symbol combination that is utilized to compare against the playing combinations 2404. In addition, the set of playing combinations 2404 can each have a number and symbol combination. The symbol utilized in the playing combinations 2404 and the winning combinations 2402 can be a word, a color, a picture, a geometrical FIG., a Greek symbol, a Latin symbol, a Hebrew symbol, to name a few. In another embodiment, the combination utilized can be a symbol-symbol combination, etc. The ticket identifier 2406 can be, for example, a serial number, a bar code, etc., that can uniquely identify the instant game ticket among other instant game tickets. In addition, a time stamp 2408 can also be provided on the instant online lottery ticket 2400 to display the time at which the ticket was printed and presented to the player.

In one embodiment, all of the playing combinations in the set of playing combinations can have a number and symbol combination. In another embodiment, only some of the playing combinations in the set of playing combinations can be seeded with number and symbol combinations. For example, only playing combinations 2420, 2422, 2424, 2426, and 2428 are seeded with a number and symbol combination.

In another embodiment, the playing combinations having a number and symbol combination can include a prize designation. For example, playing combination 2420 includes a prize designation of $100, playing combination 2428 includes a prize designation of $200, playing combination 2422 includes a prize designation of $300, playing combination 2424 includes a prize designation of $400, and playing combination 2426 includes a prize designation of $500.

A player can win if one of the squares in the set of playing combinations 2404 matches one of the winning combinations 2402 as to both the number and symbol combination. For example, playing combination 2428 includes a {7, Red} combination. Winning combination 2410 also includes a {7, Red} combination. Therefore, instant game ticket 2400 can win two hundred dollars according to the prize designation in playing combination 2428.

In another example, winning combination 2412 includes a {41, Yellow} combination. "Yellow" only appears in playing combination 2420 which includes a {10, Yellow} combination. Thus, instant game ticket 2400 does not win based on winning combination 2412.

In yet another example, winning combination 2414 includes a {20, Green} combination. The number "30" only appears in playing combination 2430, and has no symbol in combination with this number. Therefore, instant game ticket 2400 does not win based on winning combination 2414 either. In another example, winning combination 2416 includes a {31, Blue} combination. In yet another example, winning combination 2418 includes a {Black, 24} combination.

Figure 25:
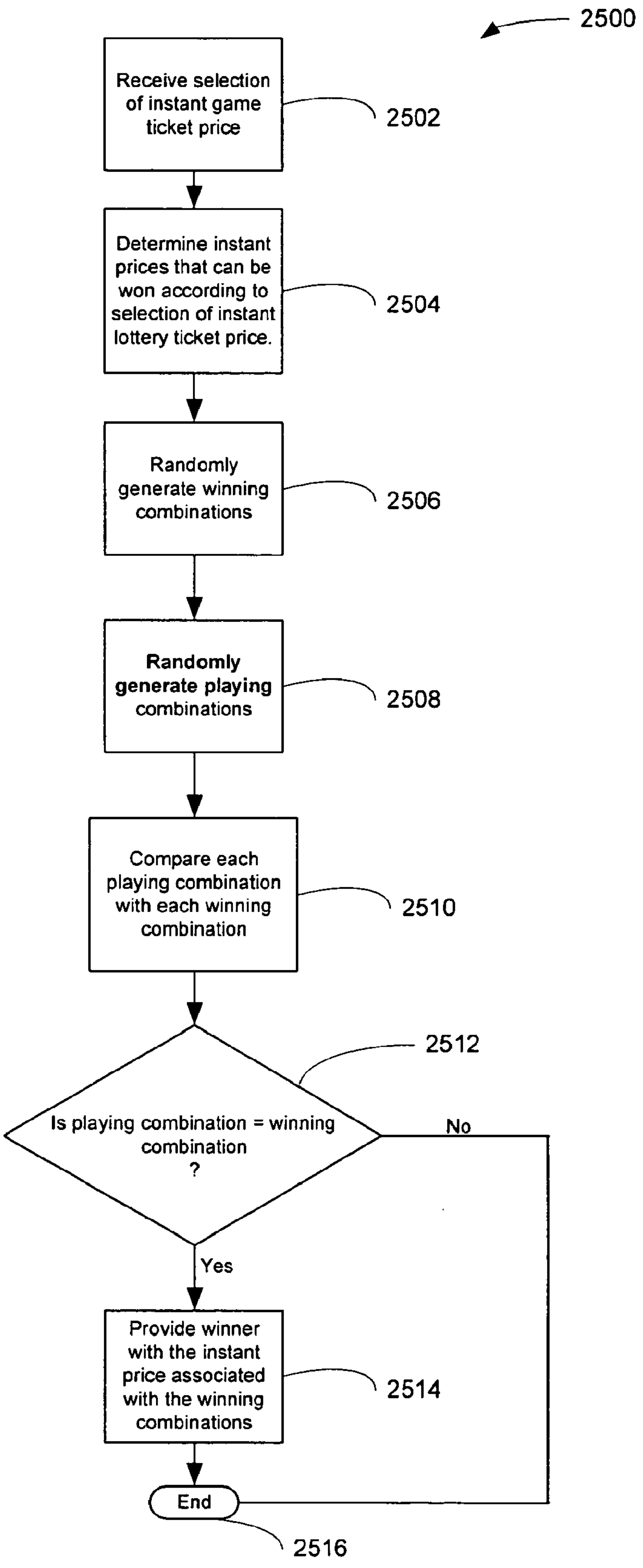
FIG. 25 illustrates a process for operating the instant game.

FIG. 25 illustrates a process 2500 for operating the instant game. At a process block 2502, a selection of an instant game ticket price can be received. A determination of the instant prizes that can be won can be made at a process block 2504. In one embodiment, the instant prizes that can be won can be displayed for all of the price categories prior to the player's selection at the process block 2502. The instant prizes that can be won can depend upon the price of the instant game ticket. A higher ticket price can increase the number of instant prizes that can be won, as well as the amount of the prizes.

At a process block 2506, the winning combinations can be randomly selected. In one embodiment, a quick pick can be utilized to randomly select the winning combinations. The player can choose the quick-pick button to have the instant game unit randomly generate the winning combinations for the player. In another embodiment, the instant game unit can receive randomly generated winning combinations from a server. At a process block 2508, the playing combinations can be generated. In one embodiment, the instant game unit can generate the playing combinations. In another embodiment, the server can generate the playing combinations.

At a process block 2510, a comparison can be made between each of the winning combinations and each of the playing combinations. In one embodiment, the instant game unit can perform this comparison. In another embodiment, the server can perform this comparison. At a decision block 2512, a determination can be made if a winning combination matches a playing combination. If there is a match, the process 2500 can proceed to a process block 2514 where the winner can be provided with the instant prize associated with the selected instant game ticket price. In one embodiment, the instant prize awarded to the winning player can be printed in the matching playing combination. The process 2500 can then proceed to the end block 2516. If none of the playing combinations matches any of the winning combinations, process 2500 can proceed to the end block 2516.

FIG. 26 illustrates a table 2600 of prizes in a multi-priced instant game. Each price category can have an associated set of prizes. The associated set of prizes for a first price category 2602 can be, for example, a set of six different prizes. In another embodiment, the number of prizes for the first price category can be any other number of prizes. In one example, the first price category 2602 can be a two-dollar category. The first price category 2602 can have a set of prizes that includes one thousand dollars, one hundred dollars, twenty dollars, ten dollars, five dollars and a free ticket prize. Each of the prizes in the set of prizes can have associated odds. In one embodiment, the odds associated with each of the prizes in the first price category can determine whether the generated winning combinations match the playing combinations. Thus, tickets in the first price category 2602 can be seeded in the appropriate playing combinations according to odds that the lottery operator sets. For example, the odds for a twenty-dollar prize for the first price category can be 1/750.

In another embodiment, there can be a second price category 2604. The associated set of prizes for the second price category 2604 can be, for example, a set of seven different prizes. In another embodiment, the number of prizes for the second price category 2604 can be any other number of prizes. In one example, the second price category 2604 can be a three-dollar category. The second price category 2604 can have a set of prizes that includes two thousand five hundred dollars, two hundred fifty dollars, fifty dollars, twenty dollars, ten dollars, five dollars and a free ticket prize. Each of the prizes in the set of prizes can have associated odds. In one embodiment, the odds associated with each of the prizes in the second price category 2604 can determine whether the generated winning combinations match the playing combinations. Thus, tickets in the second price category 2604 can be seeded in the appropriate playing combinations according to odds that the lottery operator sets. For example, the odds for a twenty-dollar prize for the second price category 2604 can be 1/750. As a result, ticket holders for a first price category and a second price category can have a chance at winning a twenty-dollar prize based on the same odds. That is, the odds of winning a twenty-dollar prize for a first price category, and the odds of winning a twenty-dollar prize for a second price category, can both be 1/750. In another embodiment, there can be different odds applicable to the same prize for different price categories.

In yet another embodiment, there can be a third price category 2606. The associated set of prizes for the third price category 2606 can be, for example, a set of eight different prizes. In another embodiment, there can be a fourth price category 2608. The associated set of prizes for the fourth price category 2608 can be, for example, a set of nine different prizes. In yet another embodiment, the set of prizes can be the same in number for different price categories but differ in amount or with respect to the odds of winning a prize of a fixed amount.

Figure 27A:
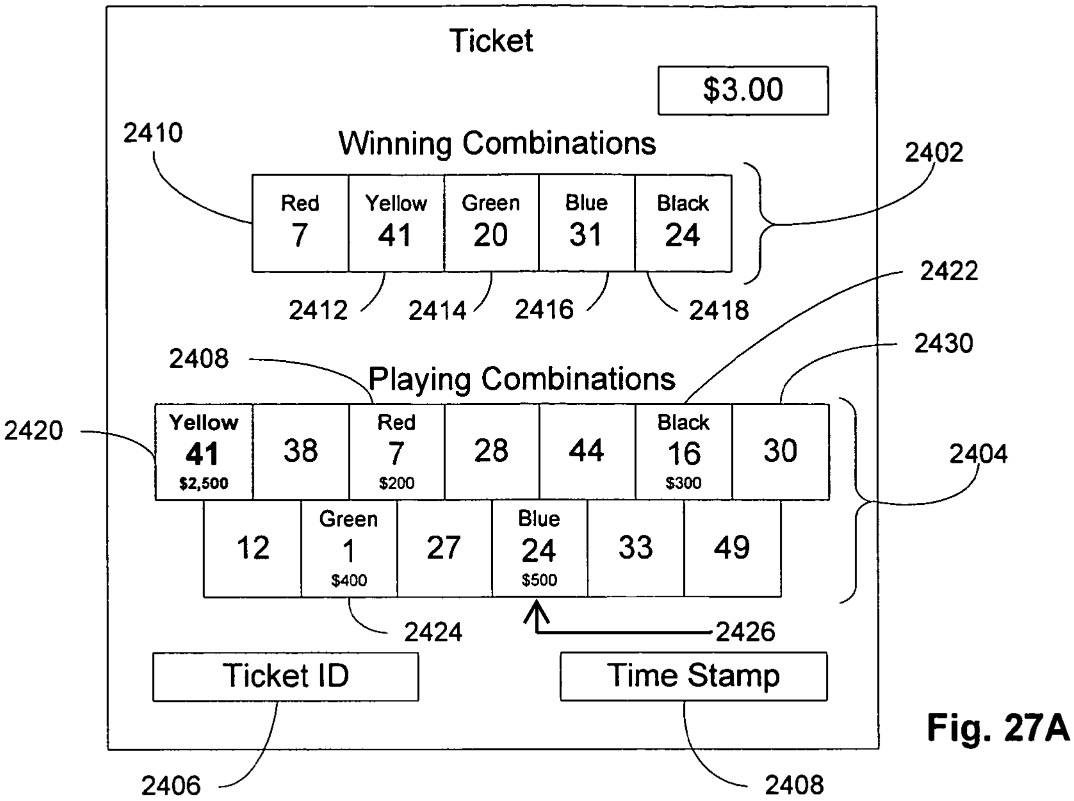
FIG. 27A illustrates an instant game ticket in a first price category.

FIG. 27A illustrates an instant game ticket in a first price category. In one embodiment, the first price category can be a three-dollar ticket price. A playing combination 2420 can include the number-symbol combination {41, Yellow}. An associated prize with the playing combination 2420 can be two thousand five hundred dollars. Therefore, if the ticket includes a matching winning combination of {41, Yellow}, the ticket holder can win the prize of two thousand five hundred dollars. Winning combination 2412 includes the number-symbol combination {41, Yellow}. Accordingly, the three-dollar ticket holder can win two thousand five hundred dollars.

Figure 27B:
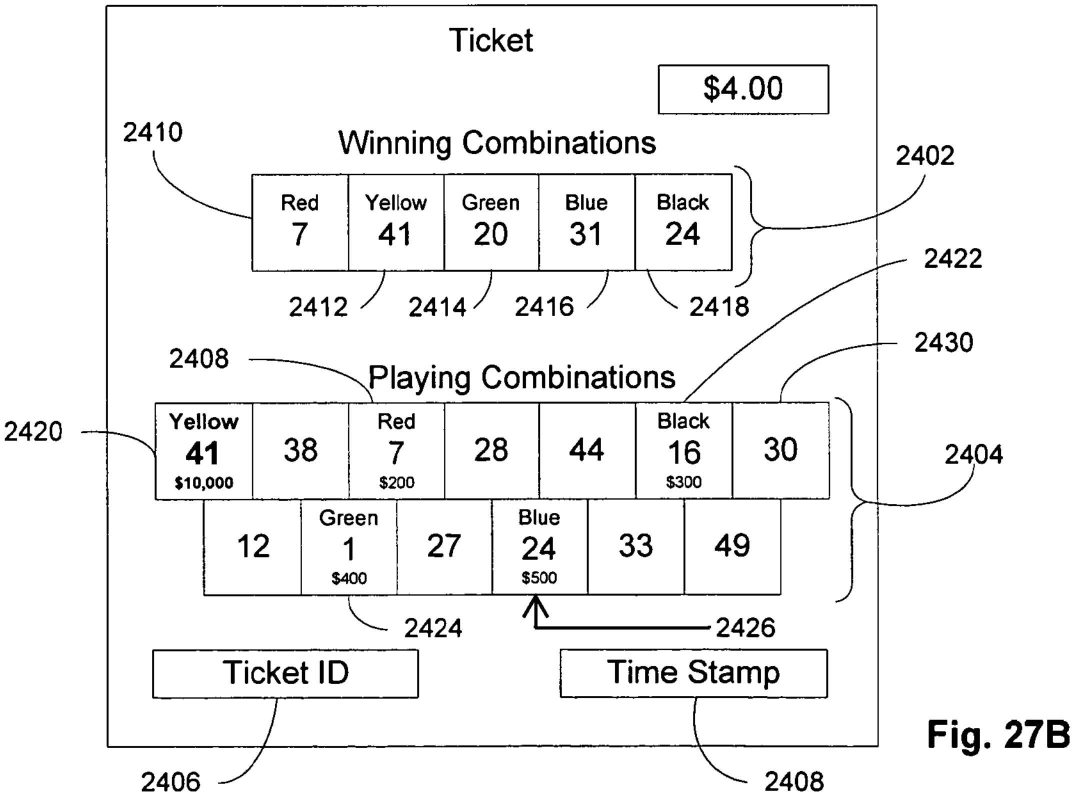
FIG. 27B illustrates an instant game ticket in a second price category.

FIG. 27B illustrates an instant game ticket in a second price category. In one embodiment, the second price category can be a four-dollar ticket price. A similar set of winning combinations and playing combinations as those in FIG. 27A can be randomly generated for the four-dollar ticket. A playing combination 2420 can include the number-symbol combination {41, Yellow}. An associated prize with the playing combination 2420 can be ten thousand hundred dollars. Therefore, if the ticket includes a matching winning combination of {41, Yellow}, the ticket holder can win the prize of ten thousand dollars. Winning combination 2412 includes the number-symbol combination {41, Yellow}. Accordingly, the four-dollar ticket holder can win ten thousand dollars.

FIG. 28 illustrates the prize distributions for an instant online lottery game in combination with a separate instant game offered online. The instant online lottery game described in reference to FIGS. 5-11 can be provided in conjunction with the instant game. In one embodiment, the instant game can be provided as a free addition to the instant online lottery game for the same price. In another embodiment, the instant game can be available as an option to players who can choose to pay an additional price for playing the instant game.

The prize distributions 2804 for the instant game can be separate from those attributable to the previously described instant online lottery game referenced in FIGS. 5-11. In the instant online lottery game, a lottery number is provided to the player and compared to a set of game-play combinations. The prize a player can win can depend on the ticket price selected by the player and whether there was a complete or a partial match of the set of numbers with one of the game-play combinations.

On the other hand, the prize distributions 2806 for the instant game can be awarded as described above in reference to FIGS. 24-27. As such, the prize distributions 2804 and 2806 can be based on different odds. An example of a jackpot 2802 is two million five hundred thousand dollars.

In one embodiment, the price categories of the instant online lottery game correspond directly with the price categories of the instant game. In one example, the first price category for the instant online lottery game can correspond directly to the first price category of the instant game. Thus, a two-dollar player, for example, can play an instant online lottery game with a prize distribution of five hundred thousand dollars for a complete match. Further, secondary prizes of one hundred dollars, ten dollars, and two dollars can be available for partial matches. The same two-dollar player can also play the instant game with potential prizes of one thousand dollars, one hundred dollars, twenty dollars, ten dollars five dollars and a free ticket.

In another embodiment, where the instant game is provided at an extra cost, an instant online lottery game can be provided with a set of price categories, and an optional add-on instant game can be provided with a different set of price categories. The price categories for the instant game can be the add-on prices.

Figure 29:
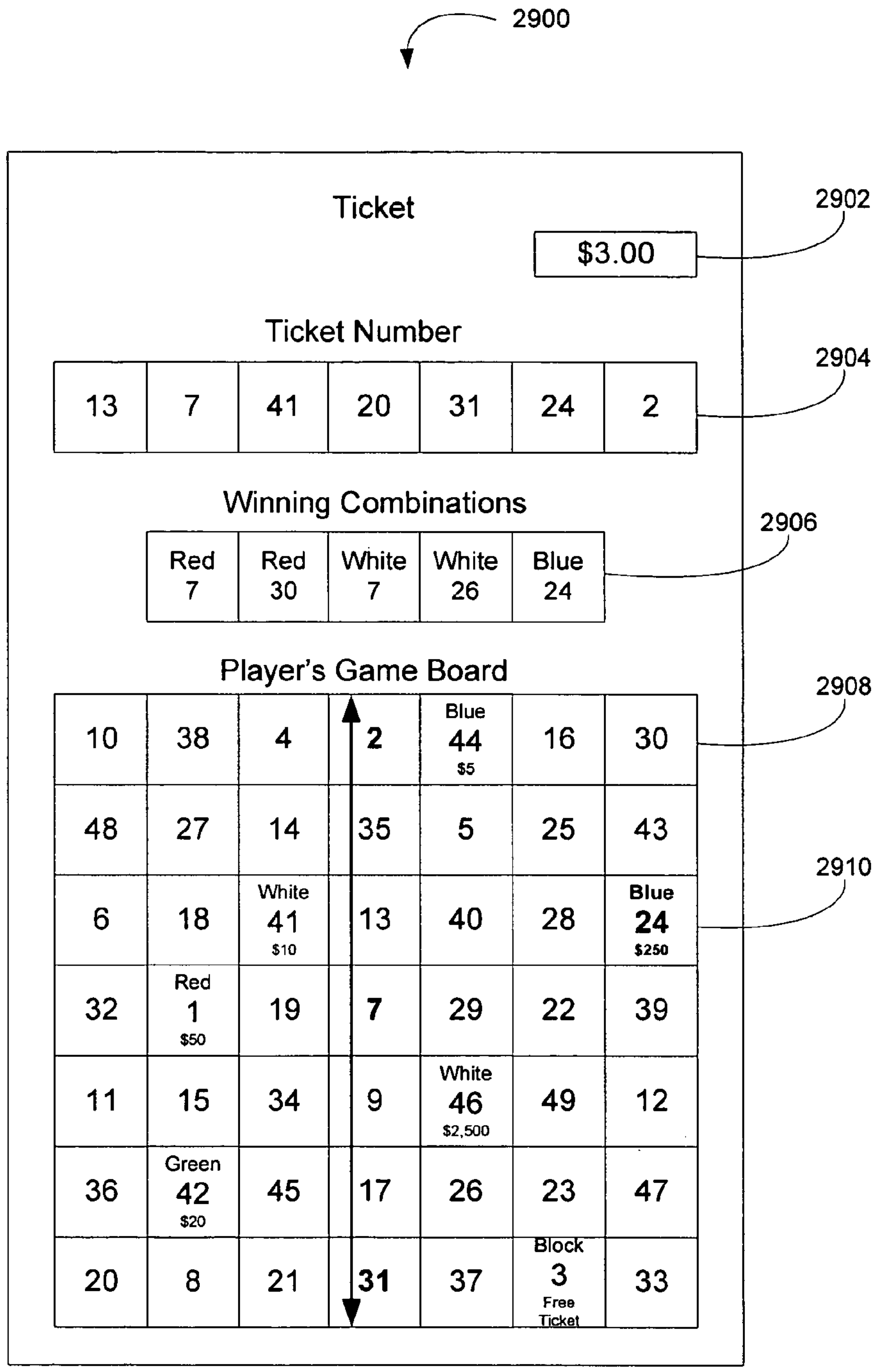
FIG. 29 illustrates a three-dollar ticket for an instant online lottery game in combination with an instant game offered online.

FIG. 29 illustrates a three-dollar ticket for an instant online lottery game in combination with an instant game offered online. The instant online lottery game and the instant game can be combined together in a single ticket 2900. In one embodiment, the playing combinations for the instant game can be seeded to reflect a fixed allocation of prizes representing a pre-determined percentage of ticket sales revenues and allocated among the squares in a grid or matrix used for the instant online lottery game. In one example, the ticket price 2902 can be three dollars. An instant online lottery number 2904 can be provided for playing the instant online lottery game. Further, a set of winning combinations 2906 can also be provided for playing the instant game. Finally, a player's game board 2908 can be a seven-by-seven matrix with numbers one to forty-nine randomly placed on the player's game board 2908.

In one example, the fourth column of the player's game board 2908 can include four of the seven numbers in the instant online lottery number 2904. If column four is designated as a playline that includes a winning subset of the lottery numbers, the ticket 2900 can win a prize for matching four numbers. For example, the instant online lottery number {2, 35, 13, 7, 9, 17, 31} matches the numbers {2, 13, 7, 31} in the game-play combination. If the prize distribution illustrated in FIG. 28 is used, the three-dollar ticket holder can win two dollars.

In another example, the same four-dollar ticket holder can play the instant game. Only playing combination 3010 matches the number-symbol combination. Playing combination 3010 includes the combination {24, Blue}, and a winning combination 3006 has the combination {24, Blue}. As a further example, playing combination 3012 has the combination {46, Red}. As a result, the four-dollar ticket holder can win the amount indicated in the playing combination 3010, five hundred dollars.

Figure 30:
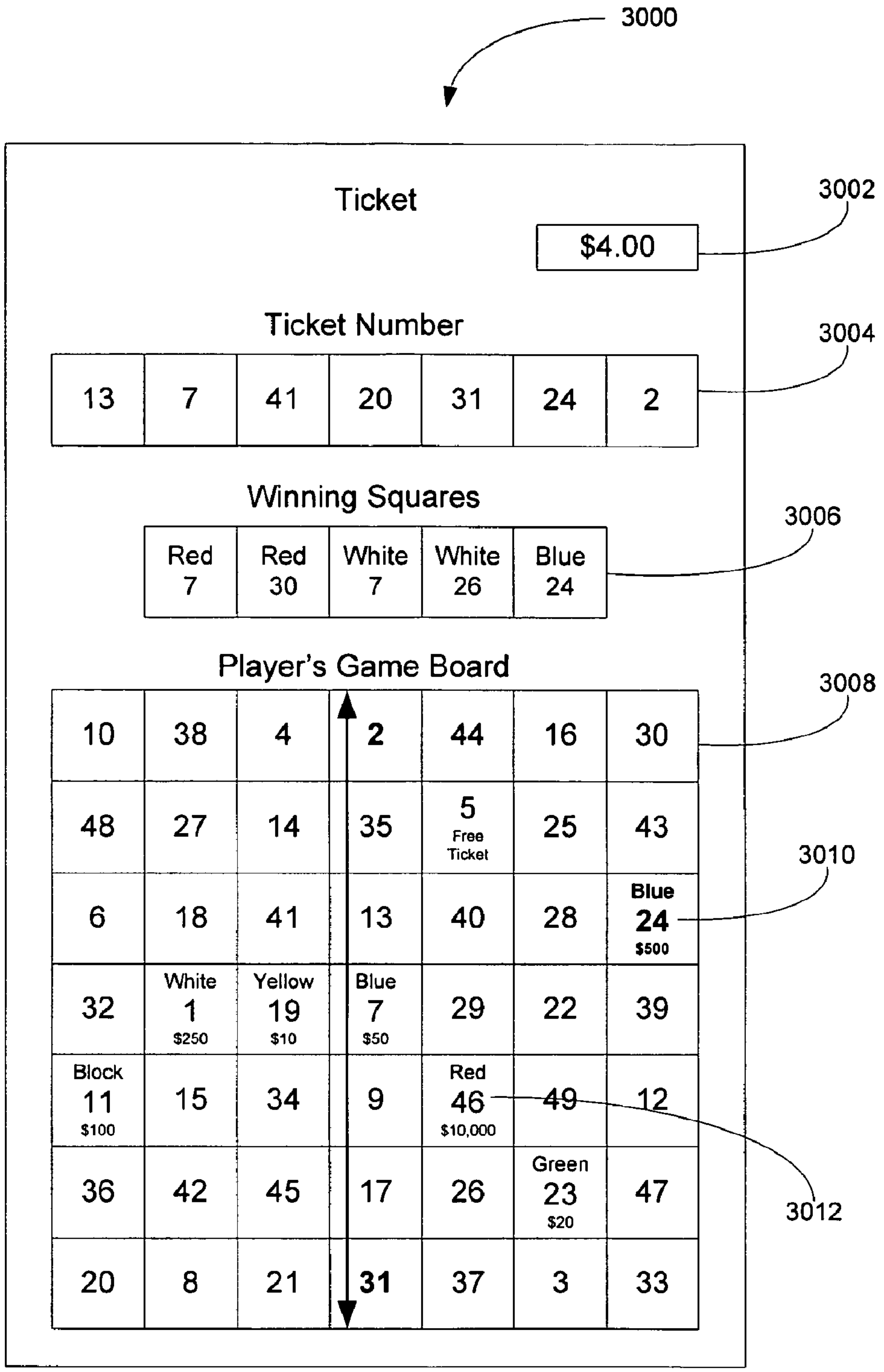
FIG. 30 illustrates a four-dollar ticket for an instant online lottery game in combination with an instant game.

FIG. 30 illustrates a four-dollar ticket for an instant online lottery game in combination with an instant game. The instant online lottery game and the instant game can be combined together in a single ticket 3000 such that the playing combinations can be seeded in the instant online lottery game matrix. In one example, the ticket price 3002 can be four dollars. Like the three-dollar ticket illustrated in FIG. 31, the four-dollar ticket can include the instant online lottery game as well as the instant game. However, the playing combinations seeded on the player's game board can include higher prizes, and/or present a greater chance of winning a prize as discussed with reference to FIG. 28.

In one example, the fourth column of the player's game board 3008 can include four of the seven numbers in the instant online lottery number 3004. If column four is designated as a playline that includes one of the game-play combinations, the ticket 2900 can win a prize for matching four numbers. Namely, the instant online lottery number {2, 35, 13, 7, 9, 17, 31} matches the numbers {2, 13, 7, 31} in the game-play combination. If the prize distribution illustrated in FIG. 28 is used, the four-dollar ticket holder can win three dollars.

In another example, the same four-dollar ticket holder can play the instant game. Only playing combination 2910 matches the number-symbol combination. Playing combination 3010 includes the combination {24, Blue}. One of the winning combinations has the combination {24, Blue}. As a result, the four-dollar ticket holder can win the amount indicated in the playing combination 3010, five hundred dollars.

Figure 31:
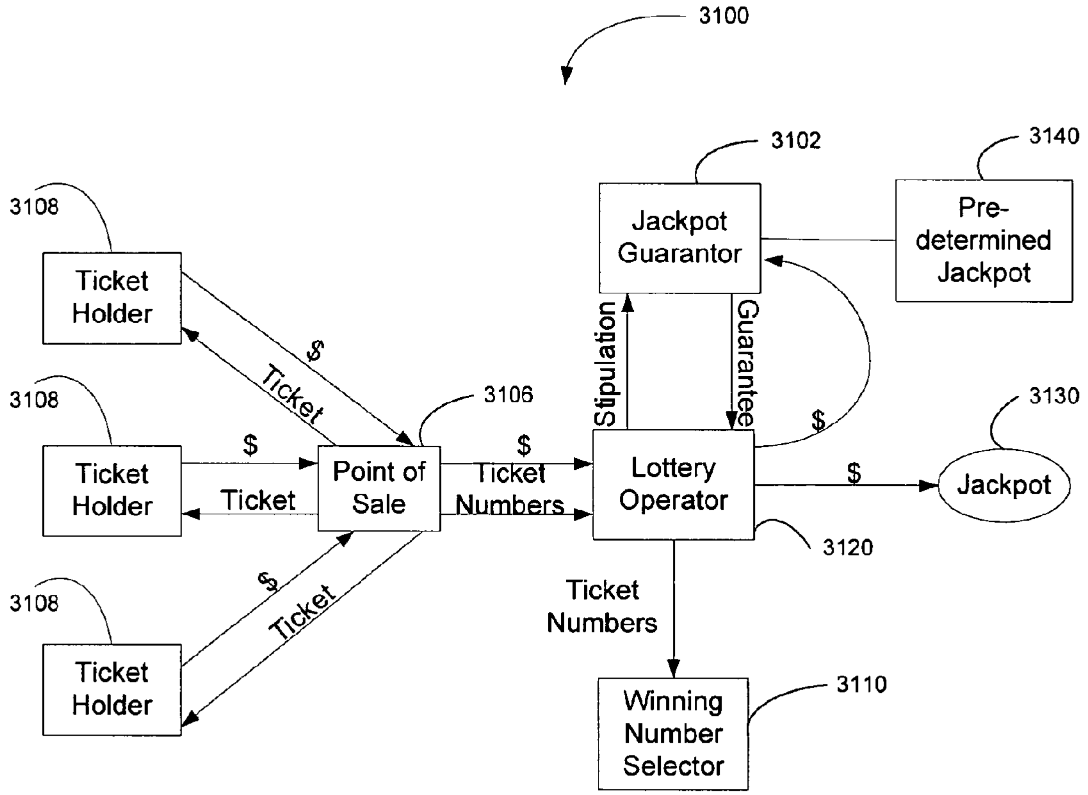
FIG. 31 illustrates a probabilistic instant online lottery game system.

FIG. 31 illustrates a probabilistic instant online lottery game system 3100. The instant online lottery game system with a progressive jackpot 2300 can be used in conjunction with the probabilistic lottery system 3100. In one embodiment, a jackpot guarantor 3102 can assume the risk that would normally not exist in a pure pari-mutuel lottery game. In another embodiment, the risk can be assumed in whole or in part by the lottery operator 3120, or by the sponsoring jurisdiction, government, or quasi-government body. In another embodiment, the jackpot guarantor 3102 can be a privately owned organization other than a jurisdiction. In another embodiment, the jackpot guarantor 3102 can be a publicly held company. In yet other embodiments, the jackpot guarantor 3102 can be an individual or a not-for-profit organization. In another embodiment, the obligation of the jackpot guarantor 3102 can be supported through the purchase and application of prize indemnity insurance provided by an insurance company or reinsurer. The jackpot guarantor 3102 can establish a pre-determined starting jackpot 3140. In one embodiment, the pre-determined starting jackpot 3140 can be a substantial prize that can entice ticket holders 108 that would not normally purchase a lottery ticket to do so. The lottery operator 3120 can advertise the pre-determined starting jackpot 3140 in order to stimulate and increase ticket sales. In one embodiment, the pre-determined starting jackpot 3140 is unfunded. Instead, the jackpot guarantor 3102 can set the pre-determined starting jackpot 3140 at an amount that is large enough so that there is a probability that the allocable prize portion of ticket sales can equal or exceed the pre-determined starting jackpot 3140. If the allocable prize portion of ticket sales is less than the pre-determined starting jackpot 3140, the jackpot guarantor 3102 would assume the risk for paying the differential between the ticket sales, or the allocable portion thereof, and the jackpot 3130.

In one embodiment, the jackpot guarantor 3102 can provide a guarantee to the lottery operator 3120. In one embodiment, the guarantee can provide that the jackpot guarantor 3102 assumes the risk for paying the pre-determined starting jackpot 3140 if the allocable prize portion of ticket sales is not sufficient to cover the pre-determined starting jackpot 3140. In another embodiment, the guarantee can provide that the jackpot guarantor assumes the risk of paying the amount of any secondary prizes that are won, to the extent that the allocable prize portion of ticket sales is not sufficient.

In one embodiment, the jackpot guarantor 3102 can provide the guarantee in exchange for a stipulation. In one embodiment, the stipulation can include an obligation by the lottery operator 3120 to provide a percentage of revenue generated from future ticket sales in exchange for the guarantee. In another embodiment, the stipulation includes an obligation by the lottery operator 3120 to provide a fee in exchange for the guarantee.

The lottery operator 3120 can receive payments for ticket sales from the point of sale 106. Further, the lottery operator 3120 can receive instant online lottery numbers from the tickets sold to the ticket holders 108 from the point of sale 3106. The lottery operator can provide the instant online lottery numbers to the winning number selector 3110 to determine which tickets are the winning tickets.

In one embodiment, the jackpot guarantor 3102 can allocate the funds to the pre-determined starting jackpot 3140 pool. In one embodiment, the entity can set aside the large prize in a protected account to provide for payment. Therefore, the lottery operator can advertise a large prize because another entity actually has set aside the large prize. In another embodiment, the starting jackpot amount is not set aside but payment of the jackpot is assured through prize indemnity insurance, a performance bond or another form of financial insurance or protection which can be provided by a financially secure insurance company through a policy naming the lottery as a beneficiary. In another embodiment, the financial condition of the jackpot guarantor 3102 can be sufficient to provide necessary financial assurance without the need for any bond or other form financial protection.

Figure 32:
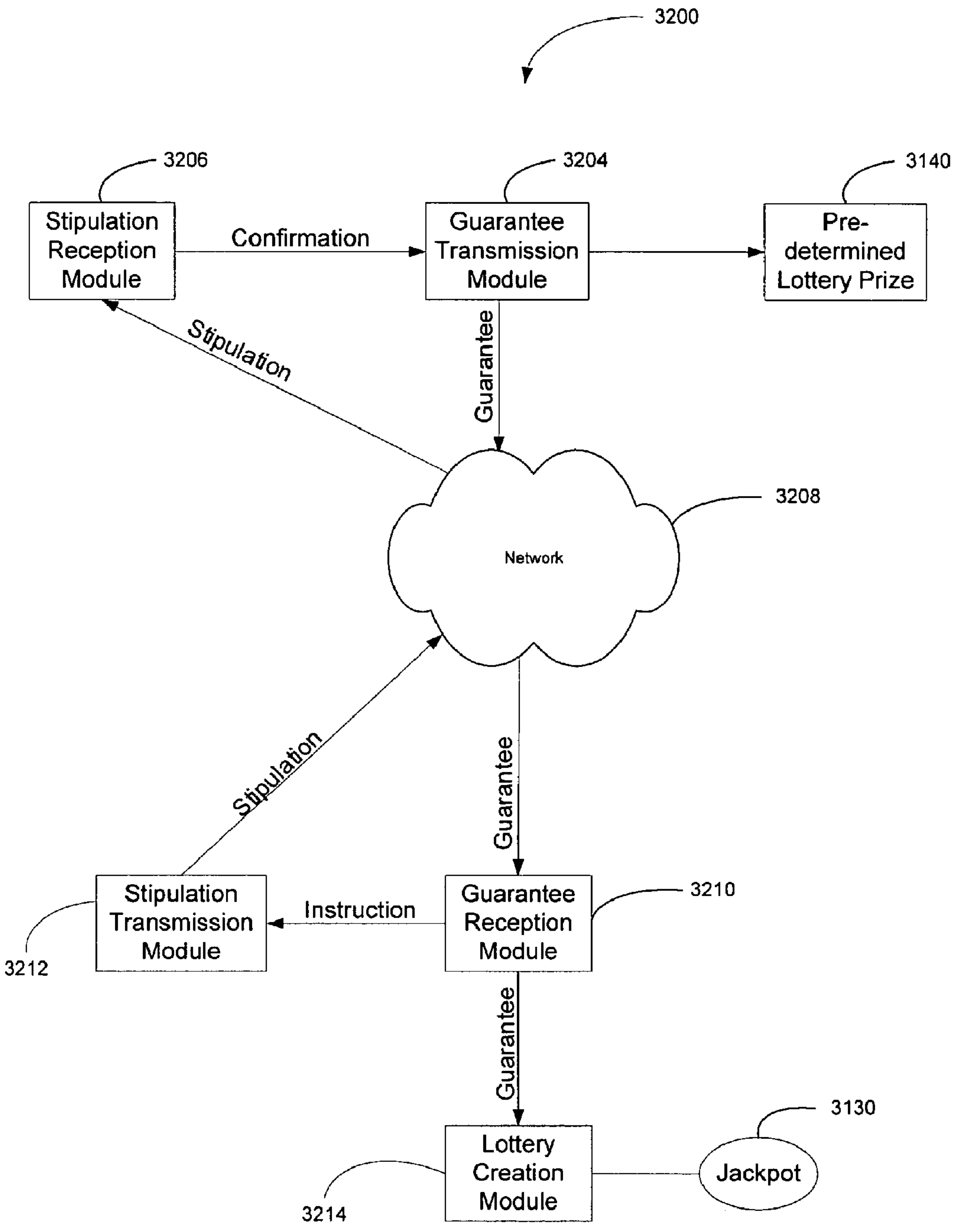
FIG. 32 illustrates a probabilistic software configuration that can be used with the probabilistic lottery system in conjunction with the multiple pricing shared jackpot system.

FIG. 32 illustrates a probabilistic software configuration 3200 that can be used with the probabilistic lottery system in conjunction with the multiple-pricing shared-jackpot system 1800. As can be seen from FIG. 32, the probabilistic software configuration 3200 can include software for establishing a guarantee for a pre-determined lottery prize 3140. A guarantee transmission module 3204 can transmit the guarantee through a network 3208. The network 3208 can be a wide-area network, a local area network, the network, a wireless network, or any other network known to one of ordinary skill in the art. The guarantee transmission module 3204 can transmit the guarantee in exchange for a stipulation. In one embodiment, the stipulation can be an obligation for a percentage of future ticket sales. A stipulation reception module 3206 can receive the stipulation through the network 3208. In one embodiment, after the stipulation reception module 3206 receives the stipulation, the stipulation reception module 3206 can transmit a confirmation that the stipulation was received to the guarantee transmission module 3204.

A guarantee reception module 3210 can receive the guarantee from the network 3208. In one embodiment, upon receiving the guarantee, the guarantee reception module 3210 can provide an instruction to a stipulation transmission module 3212. The stipulation transmission module 3212 can then send the stipulation through the network 3208. As discussed above, the stipulation reception module 3206 can receive the stipulation and send the confirmation to the guarantee transmission module 3204 that the guarantee has been sent and that the stipulation, in exchange for which the guarantee was sent, has been received. The lottery creation module 3214 creates the lottery game, upon receiving the guarantee, with the jackpot 3130.

Figure 33:
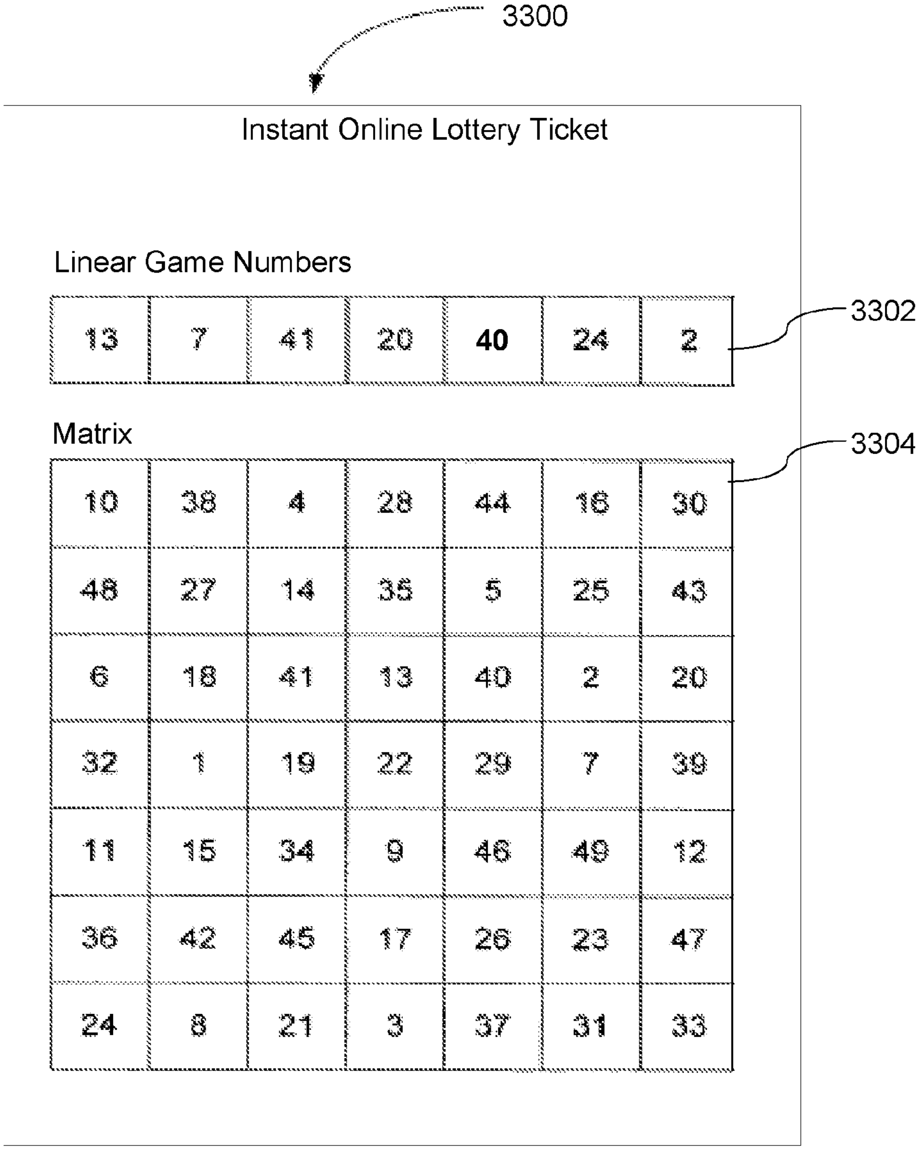
FIG. 33 illustrates an example of an instant online lottery game ticket. A set of instant online game numbers may be selected for utilization in the instant online lottery game.

In an alternative embodiment, an instant online lottery ticket 3300 may be purchased for the possibility of winning a linear prize in the instant online lottery game. FIG. 33 illustrates an example of an instant online lottery game ticket. A set of instant online game numbers may be selected for utilization in the instant online lottery game. For example, the numbers 1-49 may be selected. An assortment of these instant online game numbers is randomly generated for each instant online lottery ticket. For example, a matrix 3304 with that has seven rows and seven columns may be utilized. On each instant online lottery ticket, the position of each of the instant online game numbers is randomly generated. In the illustrated example of the instant online lottery ticket 3300, the number 10 was randomly determined to occupy the position in the first row and first column. Similarly, the positions in the matrix 3304 of the remaining instant online game numbers are also randomly determined.

Further, a set of linear game numbers 3302 is randomly generated. The set of linear game numbers is a subset of the instant online game numbers. In one embodiment, the subset of the instant online game numbers contains less numbers than the total quantity of the instant online game numbers. For example, the subset of the instant online game numbers may contain 7 numbers that are randomly selected from the set of instant online game numbers. In the illustrated example, the linear game numbers 3302 include 13, 7, 41, 20, 40, 24, and 2, all of which form a subset of numbers randomly selected from the set of instant online game numbers. In another embodiment, the subset of the instant online game numbers is selected from the set of the instant online game numbers by the player. For example, an instant online lottery player may select these numbers by marking them, communicating his or her selection to a retail clerk, or having these numbers randomly generated using the "quick pick" method.

Figure 34A:
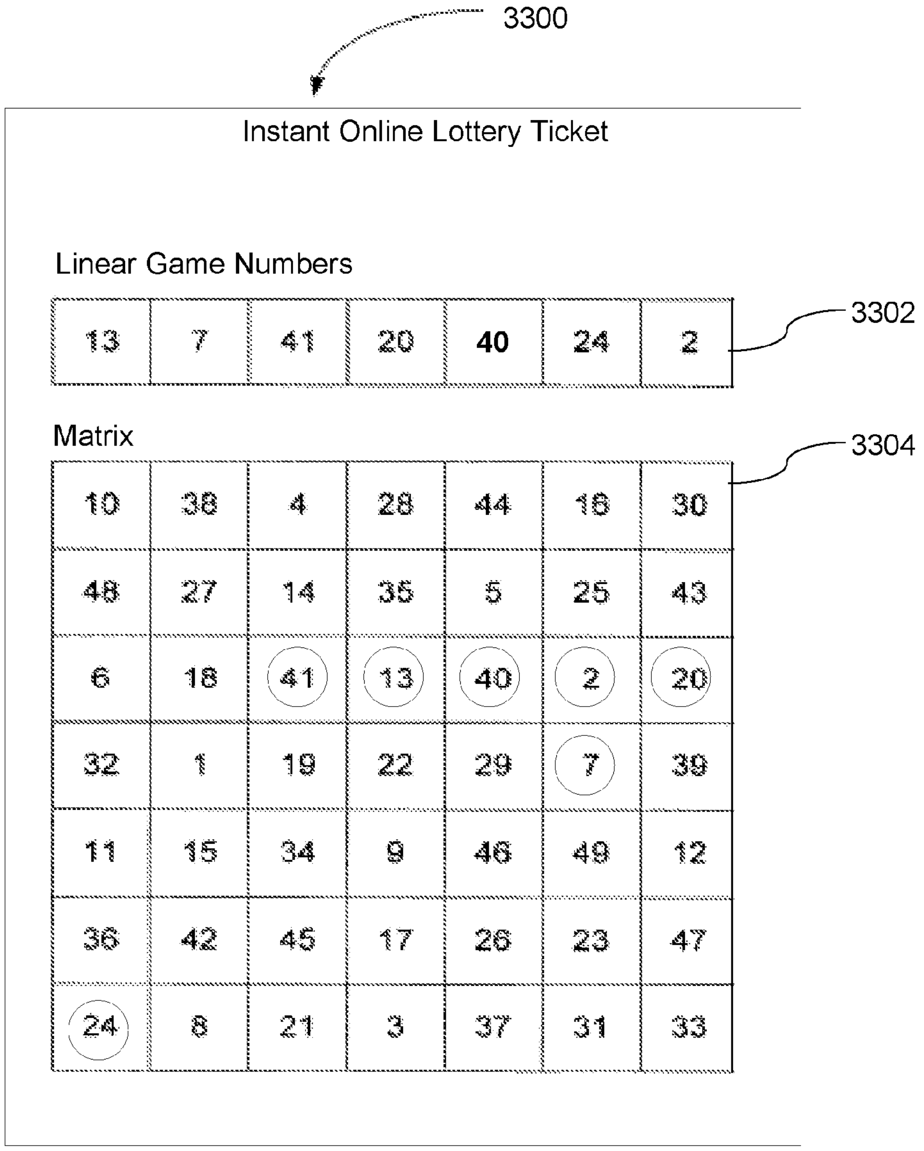
FIG. 34A indicates the linear game numbers as indicated by the player in the matrix.

The linear game numbers 3302 are utilized by the player to determine if a linear match occurs within the matrix 3304. FIG. 34A indicates the linear game numbers 3302 as indicated by the player in the matrix 3304. In one embodiment, the linear match is a linear display in the matrix 3304 of at least a predetermined quantity of numbers from the linear game numbers 3302. The distribution of the instant online lottery prize is based on the quantity of the numbers from the linear game numbers 3302. For example, the predetermined quantity of numbers may be four numbers. The linear display may be any horizontal, vertical, or diagonal match. Further, the linear display may be a partial match in the matrix 3304. For example, the numbers 41, 13, 40, 2, and 20 form a linear display in the matrix 3304 as they appear in a row of the matrix 3304, but they are only a partial match as they occupy only part of that particular row.

In one embodiment, the matching is performed by a computer rather than the player. Accordingly, the computer may determine if there is a linear match between the linear game numbers 3302 and the matrix 3304 and print an indication of such on the instant online lottery ticket 3300.

Figure 34B:
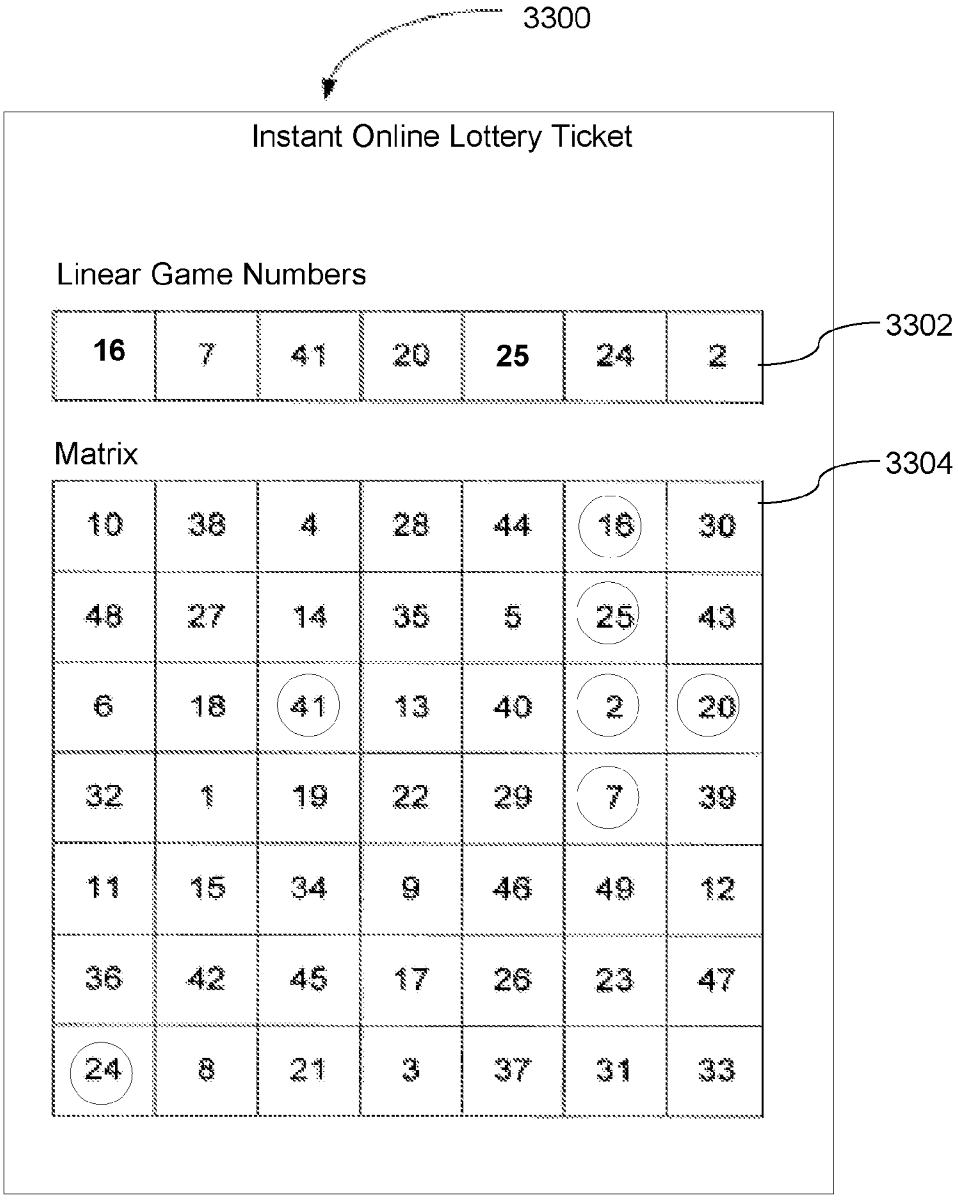
FIG. 34B illustrates another example of the linear game numbers as indicated by the player in the matrix.

FIG. 34B illustrates another example of the linear game numbers 3302 as indicated by the player in the matrix 3304. As an example, the numbers 16, 25, 2, and 7 form a linear display as they appear in a column in the matrix 3304.

Figure 34C:
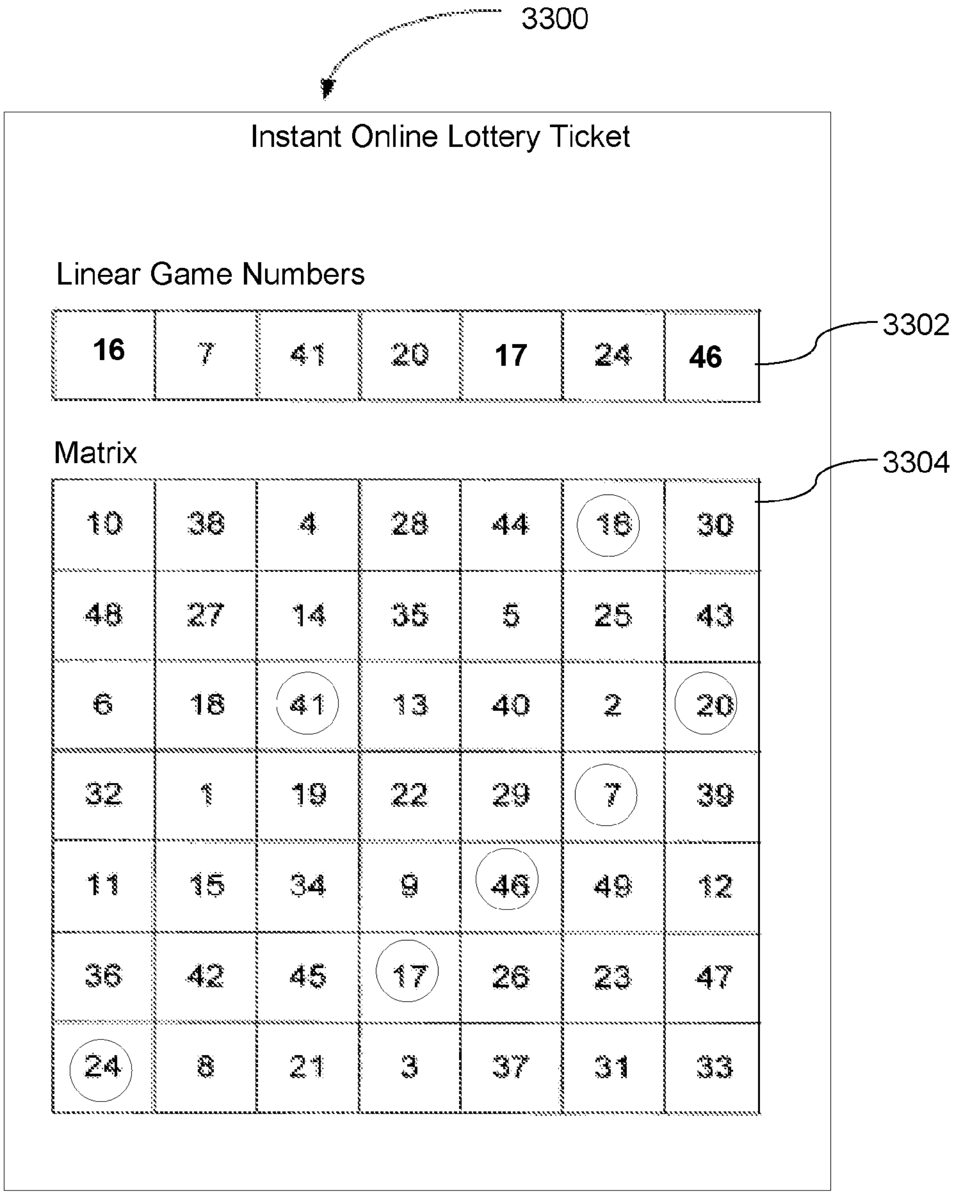
FIG. 34C illustrates yet another example of the linear game numbers as indicated by the player in the matrix.

FIG. 34C illustrates yet another example of the linear game numbers 3302 as indicated by the player in the matrix 3304. As an example, the numbers 20, 7, 46, and 17 form a linear display as they appear in a diagonal in the matrix 3304. The diagonal may, but need not be between two corners in the matrix 3304. Any diagonal formed that displays the predetermined quantity of instant online game numbers shall be considered a linear display.

In one embodiment, a consecutive match is needed for a linear display. In other words, a number that is not in the linear game numbers does not appear between any two numbers in the linear display of linear game numbers 3302 in the matrix 3304. For example, FIG. 34A has a linear display of the linear game numbers 3302 of 41, 13, 40, 2, and 20 without a number such as 18, which is not one of the linear game numbers 3302, appearing between any of these numbers. As another example, FIG. 34B has a linear display of the linear game numbers 3302 of 16, 25, 2, and 7 without a number such as 49, which is not one of the linear game numbers 3302, appearing between any of these numbers. As yet another example, FIG. 34C has a linear display of the linear game numbers 3302 of 20, 7, 46, and 17 without a numbers such as 21, which is not one of the linear game numbers 3302, appearing between any of these numbers.

In another embodiment, a consecutive match is not needed for a linear display. In other words, a non-consecutive match may be utilized for a linear display. The non-consecutive match allows one or more numbers that are not within the linear game numbers 3302 to be between numbers from the linear game numbers 3302 in the linear display in the matrix 3304. The total numbers from the linear game numbers 3302 in the linear match is from at least a predetermined quantity of numbers from the linear game numbers 3302.

Figure 35A:
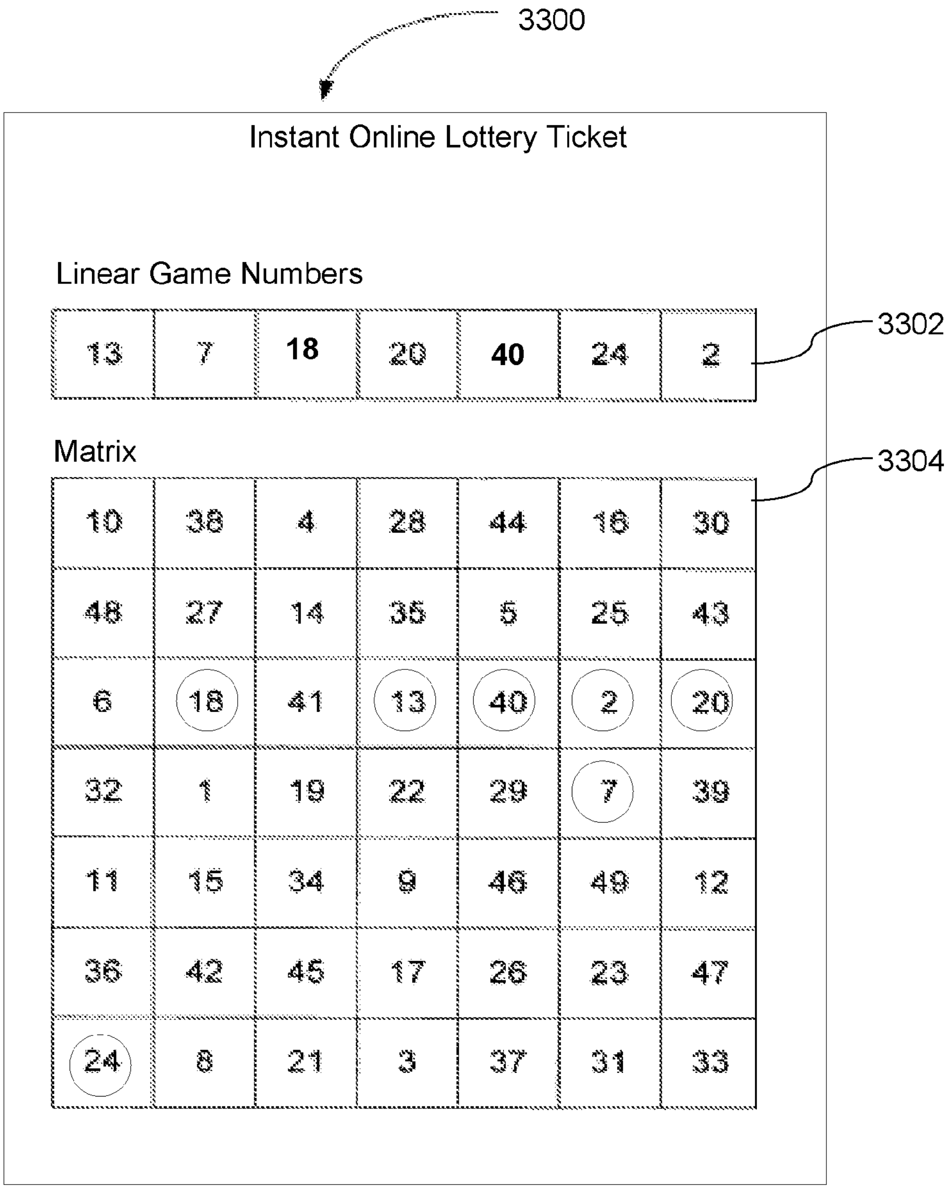
FIG. 35A illustrates an example of non-consecutive linear display.

FIG. 35A illustrates an example of non-consecutive linear display. As an example, the numbers 18, 13, 40, 2, and 20 form a linear display as they appear in a row in the matrix 3304 even though the number 41, which is not one of the linear game numbers 3302, is between the numbers 18 and 13. In one embodiment, more than one non-linear game number may be between two linear game numbers in the linear display.

Figure 35B:
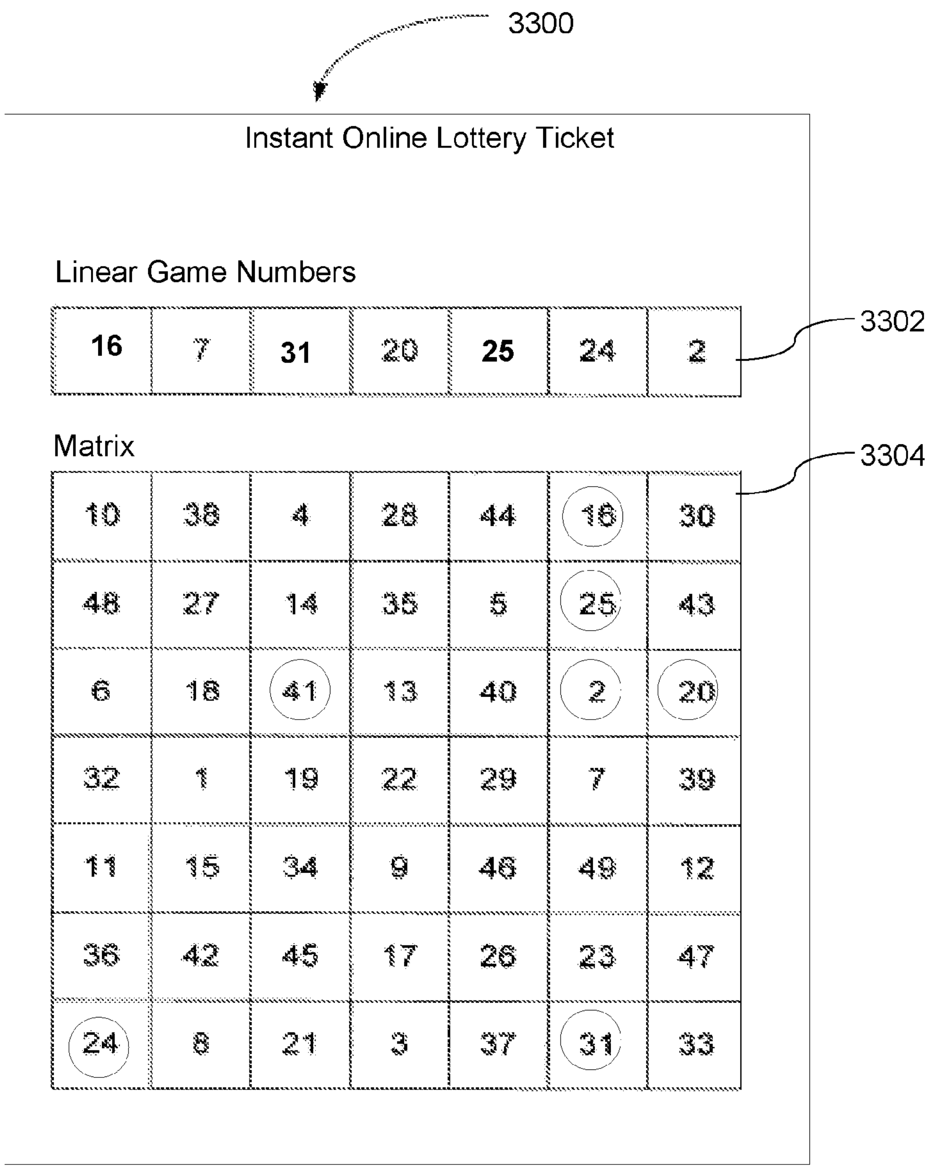
FIG. 35B illustrates another example of a non-consecutive linear display.

FIG. 35B illustrates another example of a non-consecutive linear display. As an example, the numbers 16, 25, 2, and 31 form a linear display as they appear in a row in the matrix 3304 even though the numbers 7, 49, and 23, which are not linear game numbers 3302, are between the numbers 16 and 31. In this example, the linear match is from at least a predetermined quantity of numbers equaling four from the linear game numbers 3302. Accordingly, the numbers 16, 25, 2, and 31 form a linear match, but the numbers 41, 2, and 20 do not form a linear match as the total quantity of these numbers is only three. Further, the numbers 24 and 31 do not form a linear mach as the total quantity of these numbers is only two.

Figure 35C:
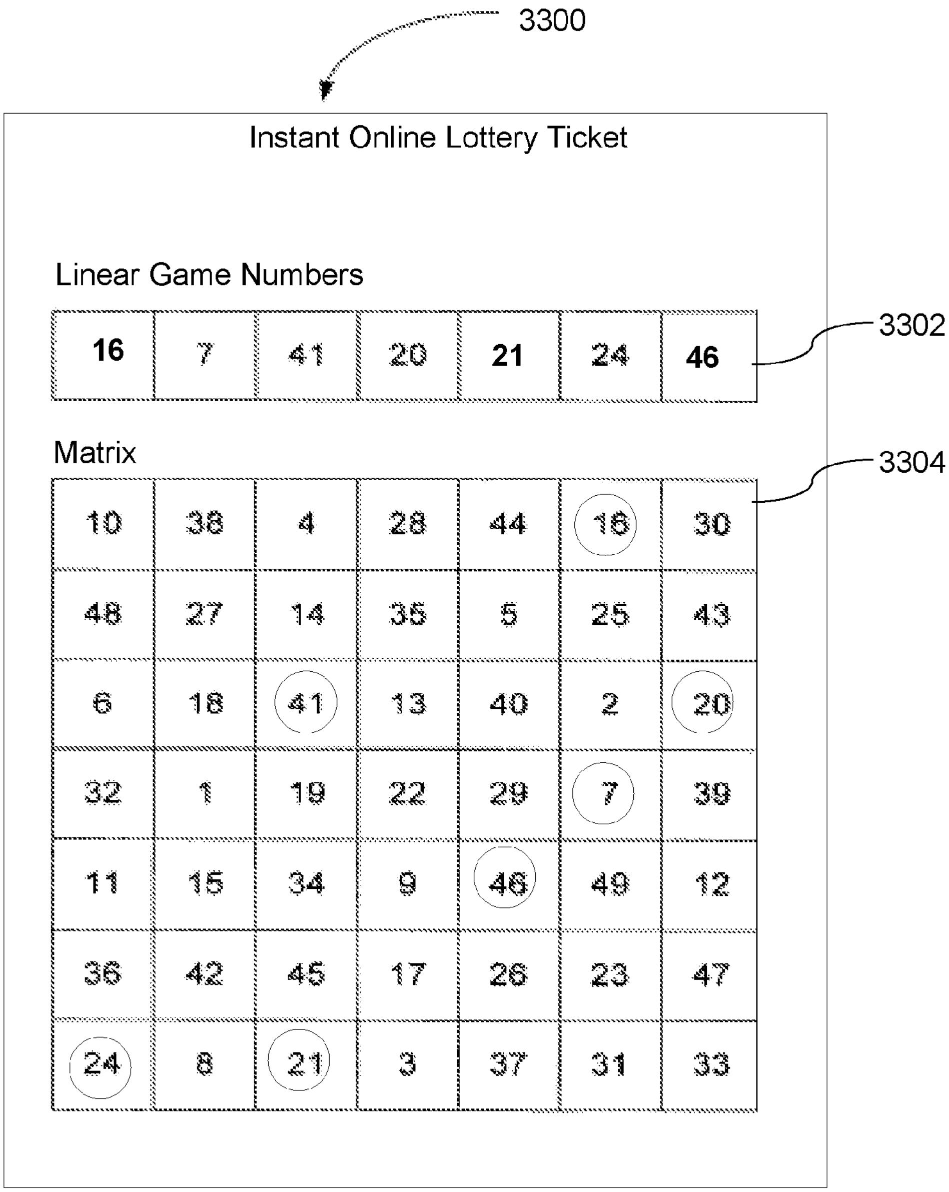
FIG. 35C illustrates yet another example of a non-consecutive linear display.

FIG. 35C illustrates yet another example of a non-consecutive linear display. As an example, the numbers 20, 7, 46, and 21 form a linear display as they appear in a diagonal in the matrix 3304 even though the number 17, which is not one of the linear game numbers 3302, is between the numbers 46 and 21.

Figure 36A:
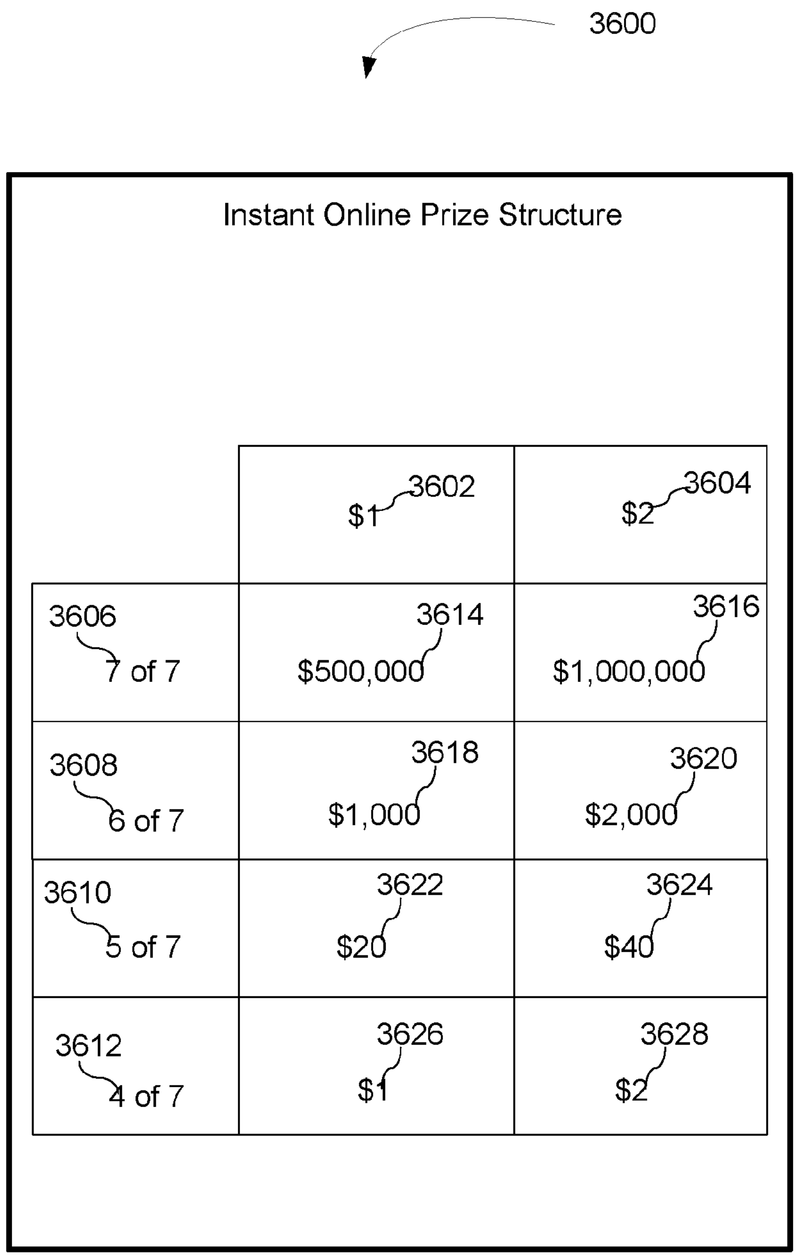
FIG. 36A illustrates an example of the instant online lottery game configuration as discussed above implemented with a constant ratio based system.

In one embodiment, the prize distribution is based on the quantity of numbers in the linear match and the price category from which the instant online lottery ticket was purchased. FIG. 36A illustrates an example of the instant online lottery game configuration as discussed above implemented with a constant ratio based system. A known instant online prize structure 3600 may allow for two or more price categories. In the illustrated example, the known instant online prize structure 3600 has a first price category 3602 of one dollar and a second price category 3604 of two dollars. Further, the known instant online prize structure includes at least two linear match quantities that each correspond to prize distributions in the different price categories. In the illustrated example, a full linear match of 7 of 7 results in a prize distribution 3614 of five hundred thousand dollars if the instant online player purchased an instant online ticket from the first price category 3602 of one dollar or a prize distribution 3616 of one million dollars if the instant online player purchased an instant online ticket from the second price category 3604 of two dollars. A first association between the first price category 3602 of one dollar and the prize distribution 3614 of five hundred thousand dollars can be the quotient of five hundred thousand divided by one, which equals five hundred thousand. Similarly, a second association between the second price category of two dollars and the prize distribution 112 of one million dollars can be the quotient of one million divided by two, which equals five hundred thousand. A constant ratio exists when the first association equals the second association. In one embodiment, an instant online ticket player can purchase one two dollar ticket as opposed to two one dollar tickets to avoid having to purchase multiple tickets.

As the linear match quantities decrease, the corresponding prize distributions also decrease. For example, a partial linear match of 6 of 7 results in a prize distribution 3618 of one thousand dollars if the instant online ticket is purchased from the first price category 3602 and a prize distribution 3620 of two thousand dollars if the instant online ticket is purchased from the second price category 3604. As can be seen, a constant ratio (although possibly different from the other constant ratios in the known instant online prize structure 3600) is still maintained between the first price category 3602 and the second prize category 3604 even as the linear match quantities decrease. Further, a partial linear match of 5 of 7 results in a prize distribution 3622 of twenty dollars if the instant online ticket is purchased from the first price category 3602 or a prize distribution 3624 of forty dollars if the instant online ticket is purchased from the second price category 3604. In addition, a partial linear match of 4 of 7 results in a prize distribution 3626 of one dollar if the instant online ticket is purchased from the first price category 3602 or a prize distribution 3628 of two dollars if the instant online ticket is purchased from the second price category 3604.

Figure 36B:
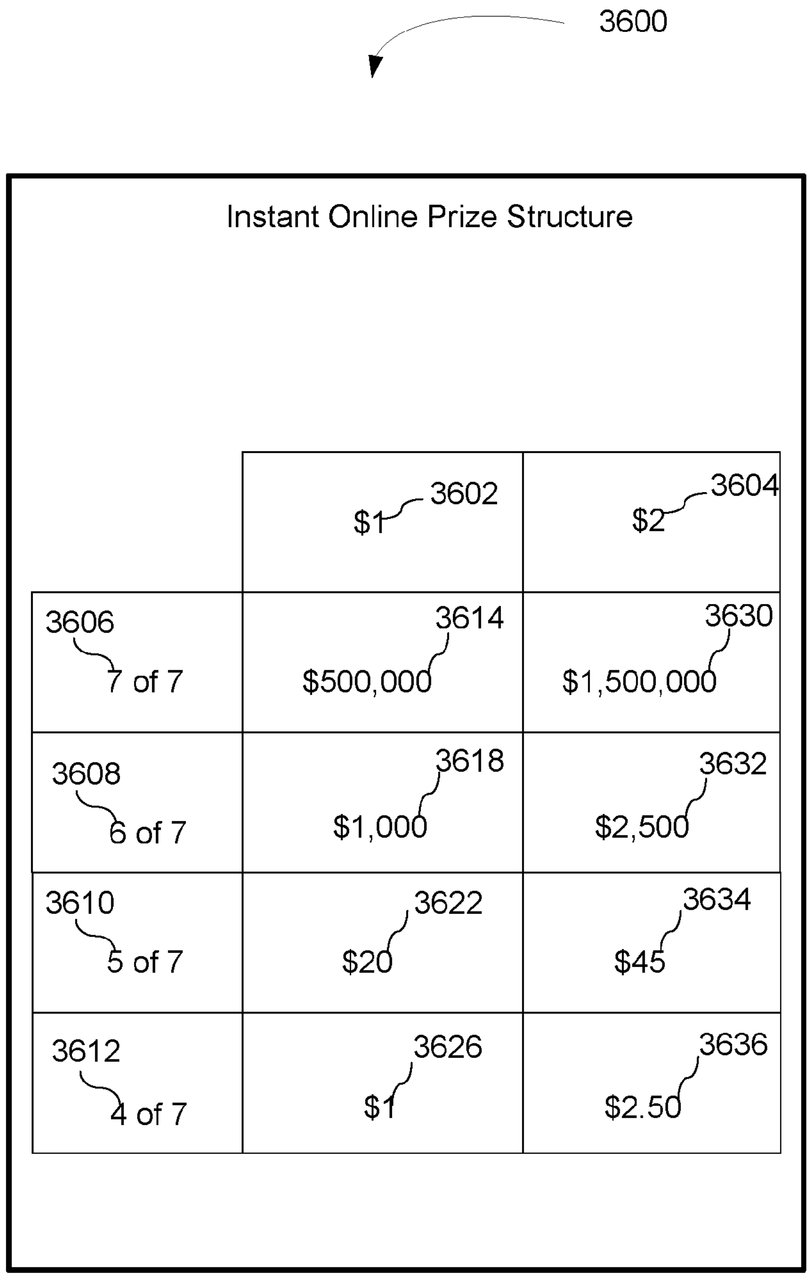
FIG. 36B illustrates an example of the instant online lottery game configuration as discussed above implemented with a variable ratio based system.

FIG. 36B illustrates an example of the instant online lottery game configuration as discussed above implemented with a variable ratio based system. For example, a full linear match of 7 of 7 results in a prize distribution 3614 of five hundred thousand dollars if the instant online player purchased an instant online ticket from the first price category 3602 of one dollar or a prize distribution 3630 of one million five hundred thousand dollars if the instant online player purchased an instant online ticket from the second price category 3604 of two dollars. A first association between the first price category 3602 of one dollar and the prize distribution 3614 of five hundred thousand dollars can be the quotient of five hundred thousand divided by one, which equals five hundred thousand. Similarly, a second association between the second price category 3604 of two dollars and the prize distribution 3630 of one million five hundred thousand dollars can be the quotient of one five million five hundred thousand divided by two, which equals seven hundred fifty thousand. A variable ratio exists because the first association does not equal the second association. In one embodiment, this variable ratio provides the instant online player with incentive to purchase a two dollar ticket. In one embodiment, the instant online player can purchase the two dollar ticket as opposed to two one dollar tickets because the potential distribution is greater by purchasing the two dollar ticket as opposed to the two one dollar tickets. As a result, the variable ratio configuration induces purchase of a higher priced instant online ticket.

As the linear match quantities decrease, the corresponding prize distributions also decrease. For example, a partial linear match of 6 of 7 results in a prize distribution 3618 of one thousand dollars if the instant online ticket is purchased from the first price category 3602 and a prize distribution 3632 of two thousand five hundred dollars if the instant online ticket is purchased from the second price category 3604. As can be seen, a variable ratio (although possibly different from the other variable ratios in the known instant online prize structure 3600) is still maintained between the first price category 3602 and the second prize category 3604 even as the linear match quantities decrease. Further, a partial linear match of 5 of 7 results in a prize distribution 3622 of twenty dollars if the instant online ticket is purchased from the first price category 3602 or a prize distribution 3634 of forty five dollars if the instant online ticket is purchased from the second price category 3604. In addition, a partial linear match of 4 of 7 results in a prize distribution of 3626 of one dollar if the instant online ticket is purchased from the first price category 3602 or a prize distribution 3628 of two dollars fifty cents if the instant online ticket is purchased from the second price category 3604.

Figure 36C:
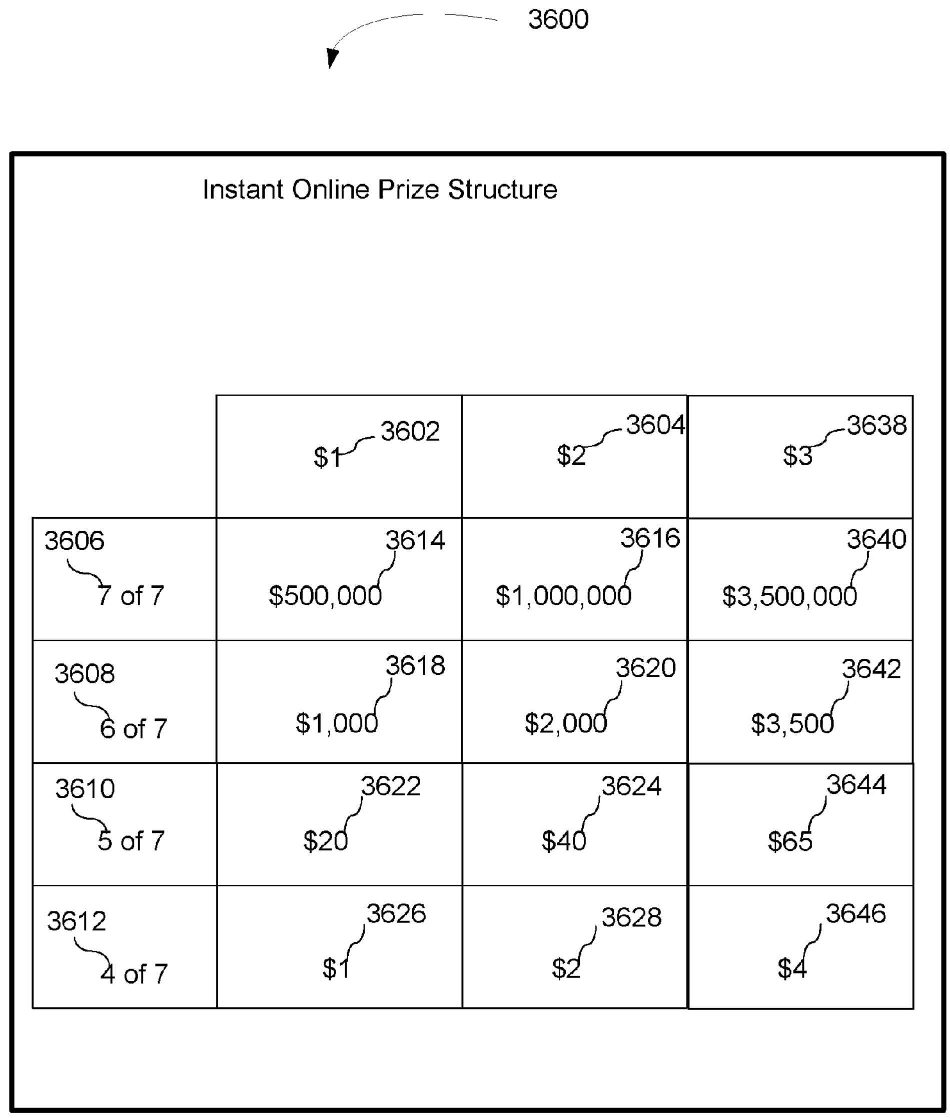
FIG. 36C illustrates an example of the instant online lottery game configuration as discussed above implemented with both constant and variable ratios.

FIG. 36C illustrates an example of the instant online lottery game configuration as discussed above implemented with both constant and variable ratios. As an example, an additional price category 3638 of three dollars is provided in which a player can win a prize distribution 3640 of three million five hundred thousand dollars for a full match of 3606 of 7 of 7, a prize distribution 3642 of three thousand five hundred dollars for a partial match 3608 of 6 of 7, a prize distribution 3644 of sixty five dollars, or a prize distribution 3646 for a partial mach of 4 of 7. The constant ratio exists between the first price category 3602 and the second price category 3604, as explained with respect to FIG. 36A, but a variable ratio exists between the first price category 3602 and the third price category 3638. Further, a variable ratio exists between the second price category 3604 and the third price category 3638. As a result, there is inducement to purchase the an instant online lottery ticket from the third price category 3638 rather than the first price category 3602 or the second price category 3604.

Since a prize distribution for a match with a larger quantity of numbers may subsume a prize distribution for a match with a smaller quantity of numbers, an instant online lottery operator may provide a distribution only for the highest distribution. For example, if a row in the matrix included all the linear game numbers 3302 as seen in FIG. 33 of 13, 7, 41, 20, 40, 24, and 2, an instant online lottery player would automatically have a full match of 7 of 7, a partial match of 6 of 7, a partial match of 5 of 7, and a partial match of 4 of 7. As a result, the instant online lottery provides may provide the highest prize distribution, e.g., the prize for the full match, and not the lower prizes for the matches that are completely subsumed. However, two matches may occur without the second match being completely subsumed by the first match. For example, the number 20 may occupy a center position in the matrix 3304, the numbers 13, 7, 41, and 20 may form a row in the matrix 3304, and the numbers 20, 40, 24, and 2 may form a column in the matrix 3304. As a result, one of the numbers, e.g., 20, is overlapping. In one embodiment, the lottery operator provides two prize distributions, e.g., pays a total of $2 ($1 twice for two matches of 4 of 7 on an instant online ticket purchased form the first price category 3602) when an overlapping, rather than subsuming match, occurs. In another embodiment, the lottery operator provides only one distribution irrespective of whether the match is overlapping or subsuming.

Figure 37A:
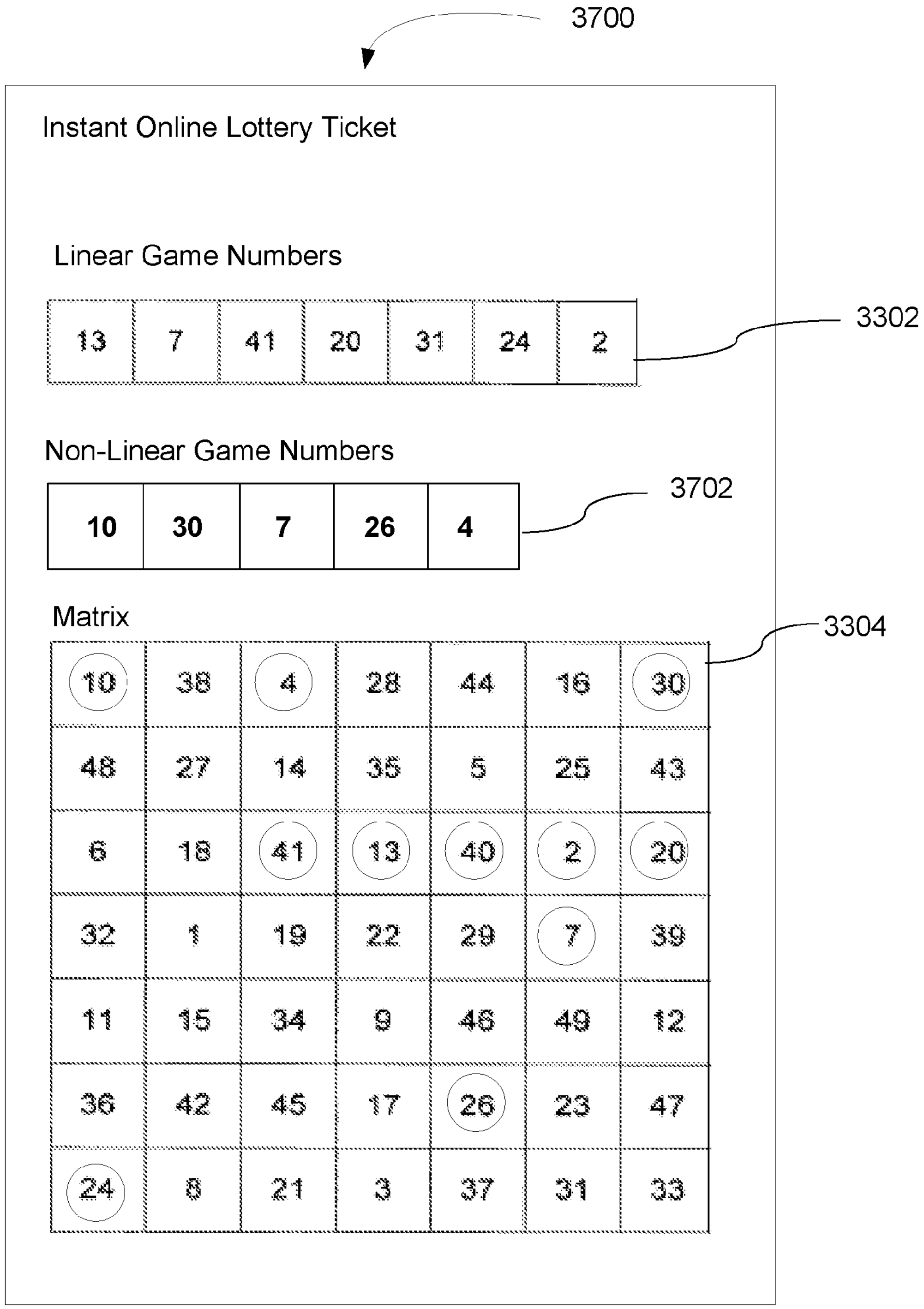
FIG. 37A illustrates an instant online ticket in which a set of non-linear game numbers is randomly generated in addition to the linear game numbers.

In one embodiment, a non-linear game may be played in addition to the linear game. FIG. 37A illustrates an instant online ticket 3700 in which a set of non-linear game numbers 3702 is determined in addition to the linear game numbers 3302. The set of non-linear game numbers 3702 may be randomly generated or selected by the player. The set of non-linear game numbers is also a subset of the instant online game numbers. In one embodiment, the subset of the instant online game numbers contains less numbers than the total quantity of the instant online game numbers. For example, the subset of the instant online game numbers may contain 5 numbers that are randomly selected from the set of instant online game numbers. In the illustrated example, the non-linear game numbers 3702 include 10, 30, 7, 26, and 4, all of which form a subset of numbers randomly selected from the set of instant online game numbers. Further, overlap may exist between the linear game numbers and the non-linear game numbers. For example, the number 7 was randomly generated for both the linear game numbers 3302 and the non-linear game numbers and may therefore be utilized for both a linear match and a non-linear match. However, a non-overlapping number may only be utilized for a match corresponding to the type of game number for which the non-overlapping number is randomly generated. In the illustrated example, the number 13 is randomly generated as a linear game number 3302 and, therefore, may only be utilized for a linear match, not a non-linear match. Further, in the illustrated example, the number 10 is randomly generated as a non-linear game number 3702 and, therefore, may only be utilized for a non-linear match, not a linear match.

In one embodiment, the non-linear match is a display of non-linear game numbers in the matrix 3304 of a quantity of numbers that is less than the predetermined quantity of numbers applicable to the linear game. In the example above, the predetermined quantity of numbers applicable to the linear game was four. Accordingly, a non-linear match is a display of the non-linear game numbers in a predetermined pattern and such that less than four non-linear numbers appear in a linear pattern. For example, the predetermined non-linear pattern may be one or more corners. The numbers 10 and 30 form a non-linear match as they occupy two corners of the matrix 3304 and are not a linear match as they only occupy a row with one other number, i.e., the number 4, as opposed to two or more other numbers. Further, the number 24 is not eligible as a corner as that number is a linear game number, not a non-linear game number. Various non-linear patterns may be established. An example of a configuration of non-linear patterns for which non-linear prizes may be won includes 4 corners and the center number, 4 corners, 3 corners, and 2 corners.

Figure 37B:
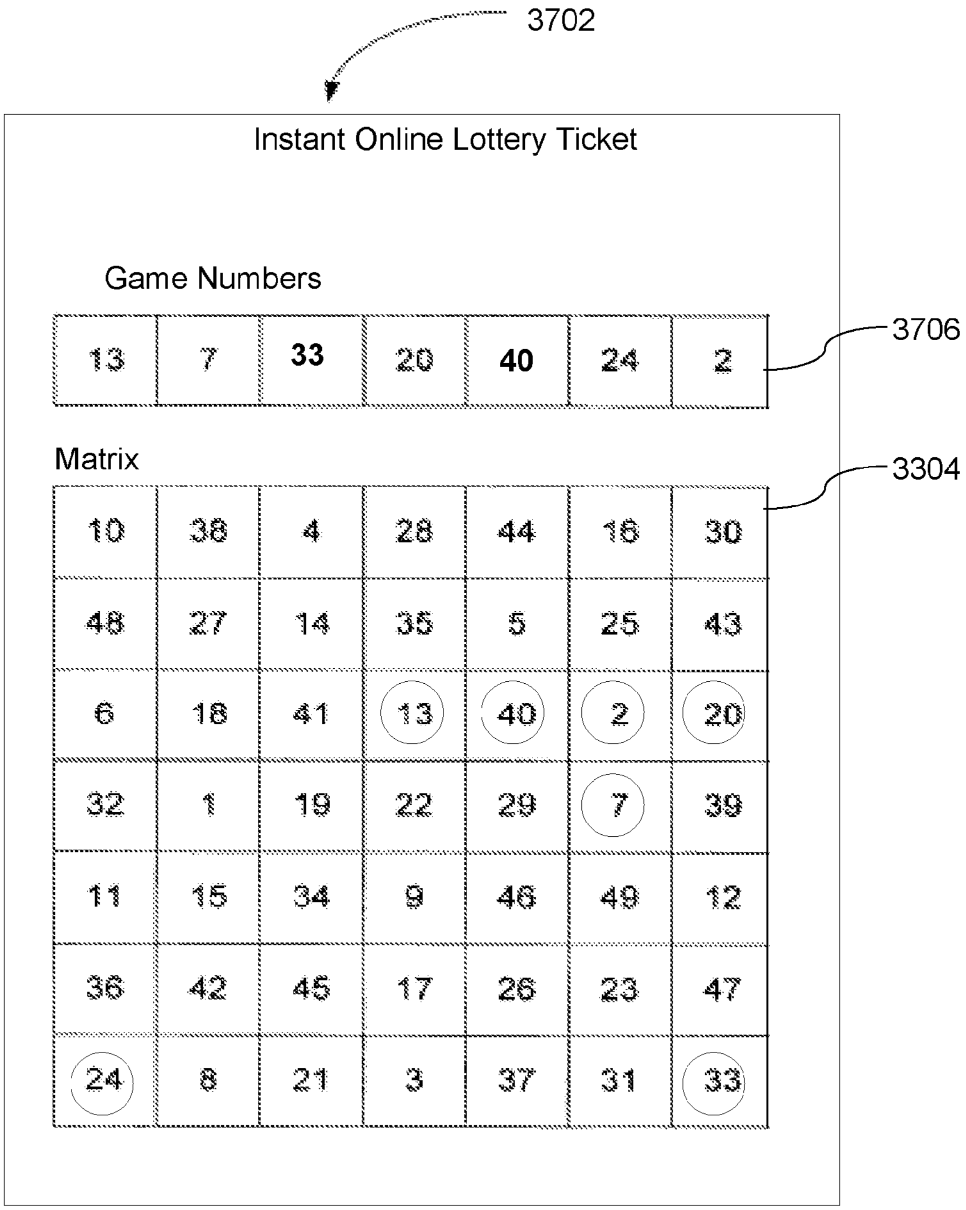
FIG. 37B illustrates an instant online ticket in which a set of game numbers 3706 is determined.

In yet another embodiment, only one set of games numbers, as opposed to separate sets of linear game numbers and non-linear game numbers, is randomly generated. That set of game numbers is utilized to determine both linear matches and non-linear matches. FIG. 37B illustrates an instant online ticket 3702 in which a set of game numbers 3706 is determined. The game numbers 3706 may be randomly generated or selected by the player.

For example, the game numbers 3706 may be a subset of the instant online game numbers that contain 7 numbers that are determined from the set of instant online game numbers. The 7 numbers may be randomly generated or selected by the player from the set of instant online game numbers, e.g., 1-49. In the illustrated example, the game numbers 3706 include the numbers 13, 7, 33, 20, 40, 24, and 2. Accordingly, these numbers are utilized to determine whether a linear match and/or a non-linear match exists. A linear match of 4 of 4 exists because the numbers 13, 40, 2, and 40 are displayed as a row in the matrix 3304. Further, a non-linear match of 2 corners exists as 24 and 33 occupy two corners of the matrix 3304. In this instance, a lottery operator may allow prizes for both a linear match and a non-linear match, or only a non-linear match if no prize is won with a linear match.

FIG. 38 illustrates an example of the prize structure 3800 from FIG. 36C that is utilized for both linear game prizes and non-linear game prizes. In addition to the linear prizes discussed above in FIG. 36C, for a nonlinear match 3802 of four corners and a center, the prize structure 3800 provides a prize distribution 3814 of five thousand dollars if the instant online lottery ticket is purchased from the first price category 3602 of one dollar, a prize distribution 3816 of ten thousand dollars if the instant online lottery ticket is purchased from the second price category 3604 of two dollars, or a prize distribution 3818 of thirty five thousand dollars if the instant online lottery ticket is purchased from the third price category 3638. Further, for a nonlinear match 3804 of four corners, the prize structure 3800 provides a prize distribution 3820 of two hundred dollars if the instant online lottery ticket is purchased from the first price category 3602 of one dollar, a prize distribution 3822 of four hundred dollars if the instant online lottery ticket is purchased from the second price category 3604 of two dollars, or a prize distribution 3824 of six hundred fifty dollars if the instant online lottery ticket is purchased from the third price category 3638. In addition, for a nonlinear match 3806 of three corners, the prize structure 3800 provides a prize distribution 3826 of twenty dollars if the instant online lottery ticket is purchased from the first price category 3602 of one dollar, a prize distribution 3828 of forty dollars if the instant online lottery ticket is purchased from the second price category 3604 of two dollars, or a prize distribution 3830 of sixty five dollars if the instant online lottery ticket is purchased from the third price category 3638. Finally, for a nonlinear match 3812 of two corners, the prize structure 3800 provides a prize distribution 3832 of one dollar if the instant online lottery ticket is purchased from the first price category 3602 of one dollar, a prize distribution 3834 of two dollars if the instant online lottery ticket is purchased from the second price category 3604 of two dollars, or a prize distribution 3836 of four dollars if the instant online lottery ticket is purchased from the third price category 3638.

A variety of different configurations may be utilized for either or both the linear game and the non-linear game. Accordingly, the prize structures provided above are provided merely for illustrative purposes. In addition, the non-linear game may be implemented with a variable ratio configuration, constant ratio configuration, or both.

In one embodiment, a player may win a prize for a non-linear match only if the player does not win a prize for a linear match. In another embodiment, a player may win a prize for the both a linear match and a non-linear match.

The instant online lottery game payout for the linear prize and/or non-linear prize may be guaranteed by a third party entity. As a result, an instant online lottery provider may be able to provide a larger instant online lottery prize than might otherwise be the case.

The instant online lottery game may include the linear game alone, the non-linear game alone, or a combination of the linear game and the non-linear game described above. Further, the instant online lottery ticket for the linear game and/or non-linear game may be printed in paper form from the lottery ticket dispensing machine, displayed in electronic form, or provided in any other fashion that is viewable by an instant online player. In addition, an apparatus may be provided for establishing the instant online lottery game. A price category module may established the price categories, random number generators may randomly generate instant online game numbers, linear game numbers, and/or non-linear game numbers, and prize distribution modules may distribute and/or calculate the winning prizes.

The instant online lottery game may provide a variety of types of prizes such as fixed prizes, progressive prizes, or probabilistic jackpot prizes for the linear prize and/or the non-linear prize. These prizes may be cash prizes or non-cash prizes such as merchandise prizes, travel prizes, merchandise cards, merchandise certificates, etc. Further, the linear prize and the non-linear prize may be the same type or different types of prizes. In addition, different price categories may correspond to different types of prizes for either or both of the linear prizes and non-linear prizes. For example, a one dollar price category may correspond to a progressive jackpot prize for the linear prize and the non-linear prize whereas a two dollar price category may correspond to a fixed prize for the linear prize and the non-linear prize. A variety of different combinations and/or sub-combinations of prize types are contemplated herein.

Figure 39:
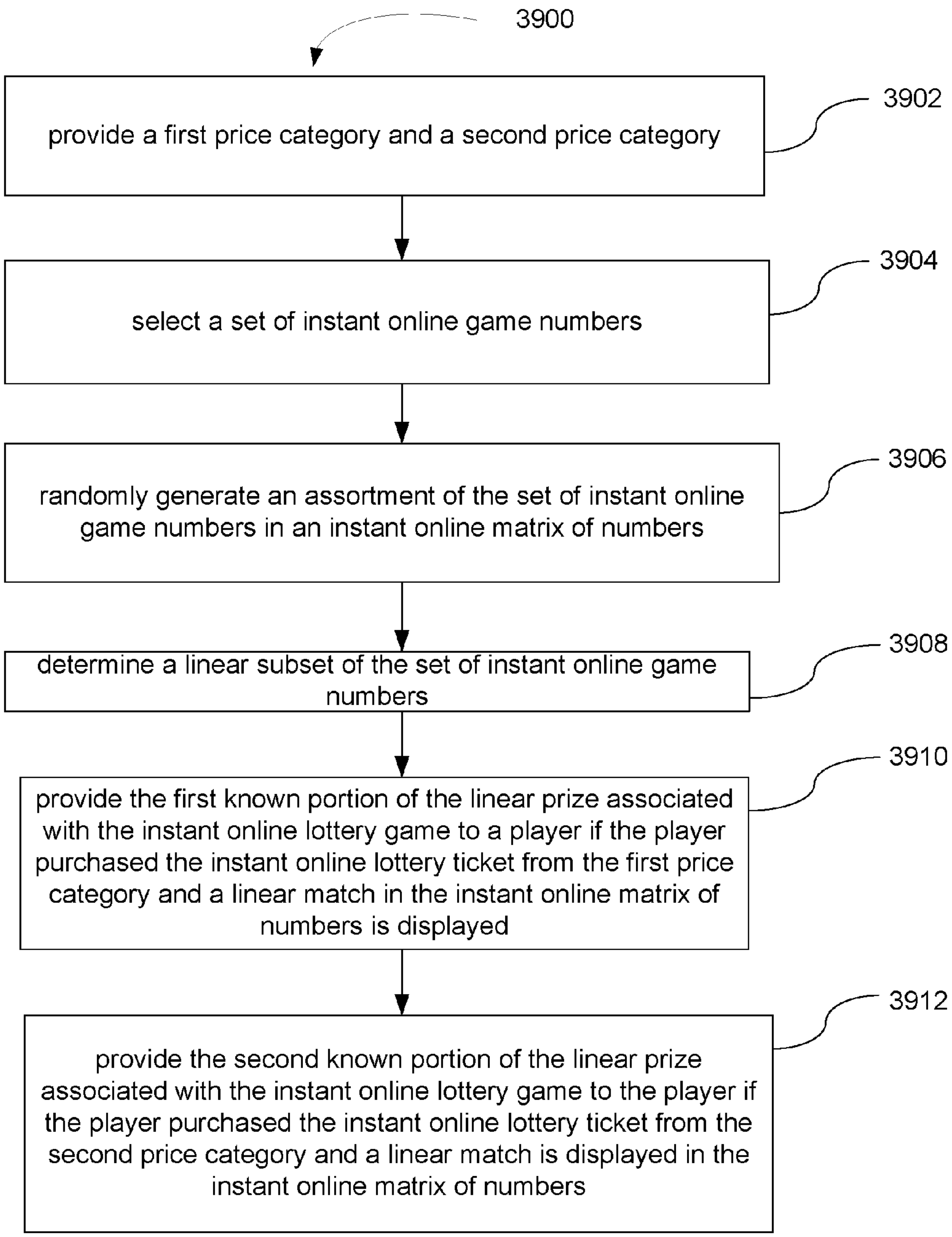
FIG. 39 illustrates a process that may be utilized to provide an instant online lottery game.

FIG. 39 illustrates a process 3900 that may be utilized to provide an instant online lottery game. At a process block 3902, the process 3900 provides a first price category and a second price category in which a lottery ticket can be purchased for an instant online lottery game. The first price category is distinct from the second price category. Further, the first price category corresponds to a first known portion of a linear prize. In addition, the second price category corresponds to a second known portion of a linear prize. The second known portion of the linear prize is more than the first known portion of the linear prize. Further, at a process block 3904, the process selects a set of instant online game numbers. In addition, at a process block 3906, the process 3900 randomly generates an assortment of the set of instant online game numbers in an instant online matrix of numbers. At a process block 3908, the process also determines a linear subset of the set of instant online game numbers such that each number in the linear subset is matched with corresponding numbers in the instant online matrix of numbers. Further, at a process block 3910, the process 3900 provides the first known portion of the linear prize associated with the instant online lottery game to a player if the player purchased the lottery ticket from the first price category and a linear match in the instant online matrix of numbers is displayed, the linear match being a linear display in the instant online matrix of numbers of at least four numbers from the linear subset. Finally, at a process block 3912, the process 3900 provides the second known portion of the linear prize associated with the instant online lottery game to the player if the player purchased the lottery ticket from the second price category and a linear match is displayed in the instant online matrix of numbers.

In another embodiment, a drawing game is provided. A drawing may be utilized to determine the linear game numbers and/or the non-linear game numbers. In other words, the lottery ticket may include only a lottery matrix. An example of a lottery matrix is a grid type matrix. In one embodiment, the lottery matrix has the same number of rows as columns, e.g., a seven-by-seven matrix. In another embodiment, the lottery matrix has a different number of rows as columns, e.g., an eight-by-six matrix with eight rows and six columns. Various configurations may be utilized for numbers drawn with respect to the lottery matrix. In an example utilizing a ball hopper for a seven-by-seven matrix, the ball hopper may be utilized to randomly generate forty nine unique numbers to each occupy a position in the lottery matrix. Accordingly, once a ball is drawn, it is not put back in the ball hopper and, as a result, duplicate numbers do not occupy positions in the lottery matrix. In another configuration, once a ball is drawn, it is put back into the ball hopper to allow for duplicate numbers occupying positions in the lottery matrix. For example, forty nine numbers may be drawn from the ball hopper such that drawn numbers are placed back into the ball hopper to allow for duplicative numbers occupying positions in the lottery matrix. Therefore, the forty nine numbers that are drawn may or may not be unique. In yet another configuration, less balls than positions in the lottery matrix are drawn to ensure that duplicative numbers are drawn. For example, forty two balls may be available in a ball hopper for forty nine possible positions in a seven-by-seven matrix. Accordingly, balls need to be placed back in the ball hopper to ensure that a full forty nine numbers are selected. As a result, duplicative numbers will be drawn. In another configuration, more balls than positions in the lottery matrix are drawn. For example, the ball hopper may have fifty four balls available to be drawn for forty nine possible positions in the lottery matrix. As only forty nine numbers from the fifty four available numbers may be drawn, some of the numbers from one through fifty four will not occupy a position in the lottery matrix. In this configuration, duplicates may or may not be allowed depending on whether balls are permitted to be placed back within the ball hopper after being drawn. The various configurations described with respect to the lottery matrix are applicable to any matrix described herein. For example, these configurations may be utilized for a drawing game and/or an instant game.

The linear game numbers and/or the non-linear game numbers may then be selected after the lottery tickets are sold. The linear game numbers and/or the non-linear game numbers drawn are then applicable to the lottery tickets that were previously sold.

Figure 40A:
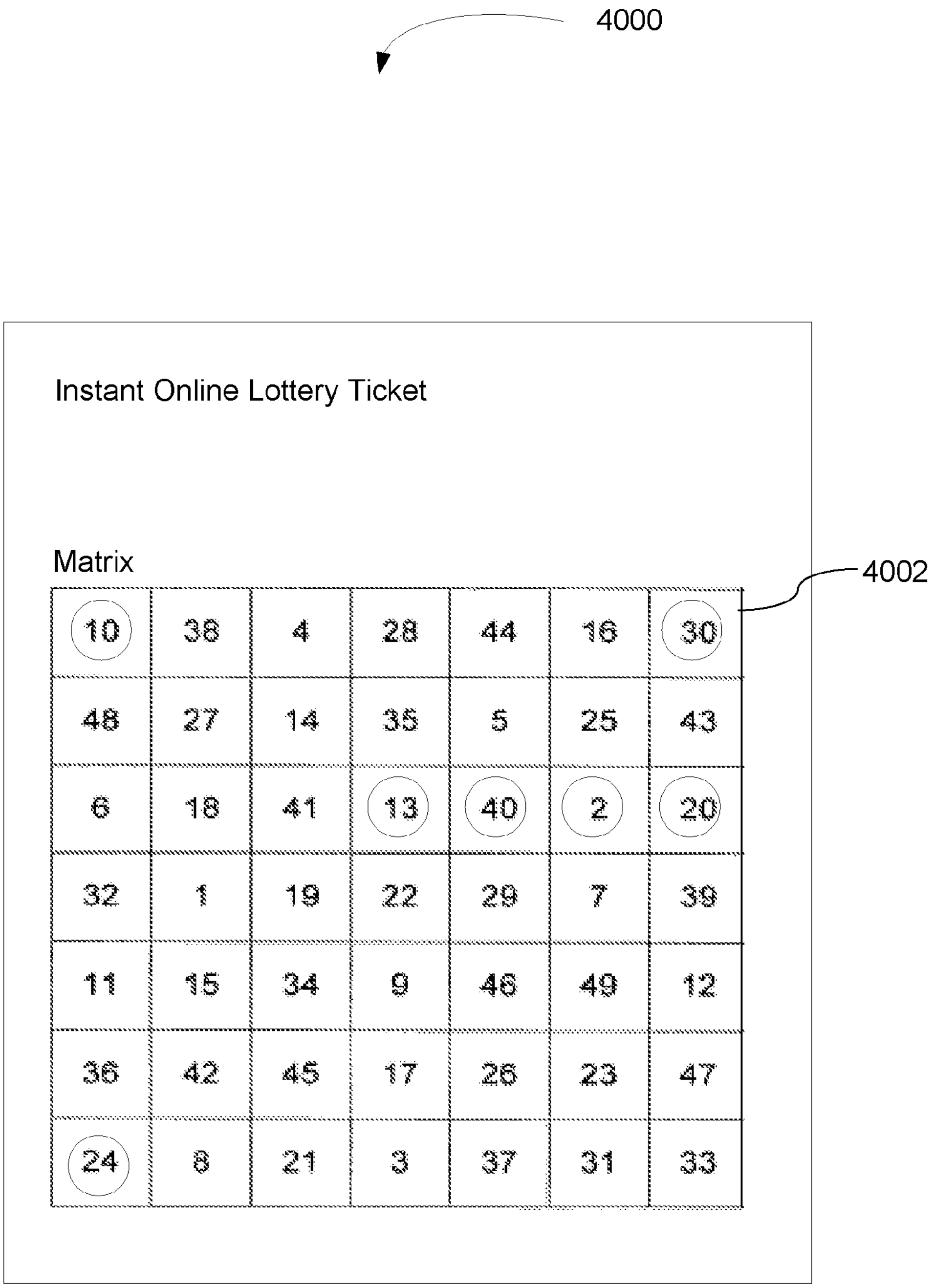
FIG. 40A illustrates an example of a lottery ticket for which a single drawing is utilized for both the linear game and the non-linear game.

FIG. 40A illustrates an example of a lottery ticket 4000 for which a single drawing is utilized for both the linear game and the non-linear game. As an example, only the lottery matrix 4002 is provided on the lottery ticket 4000. In one embodiment, the lottery matrix 4002 is randomly generated for each lottery ticket 4000. The drawing game numbers are drawn after lottery tickets 4000 are sold. Further, the drawn game numbers are applicable to the lottery tickets. In other words, each lottery ticket has a randomly generated lottery matrix 4002 that is randomly generated and may be distinct, but the same set of drawn game numbers is applicable to each lottery ticket. After the drawn game numbers are displayed, announced, etc., a player may then attempt to match the game numbers with the numbers in the lottery matrix 4002 to determine if there is a linear match and/or a non-linear match. The player may indicate such matches by drawing a circle or utilizing other indicia on the lottery ticket 4000.

As an example, the drawn game numbers may be 10, 13, 40, 24, 2, 20, and 30. A linear match of 13, 40, 2, and 20 and a non-linear match of 10, 30, and 24 are displayed on the illustrated lottery ticket. The drawn game numbers may be displayed as different matches or no matches on different lottery tickets.

Figure 40B:
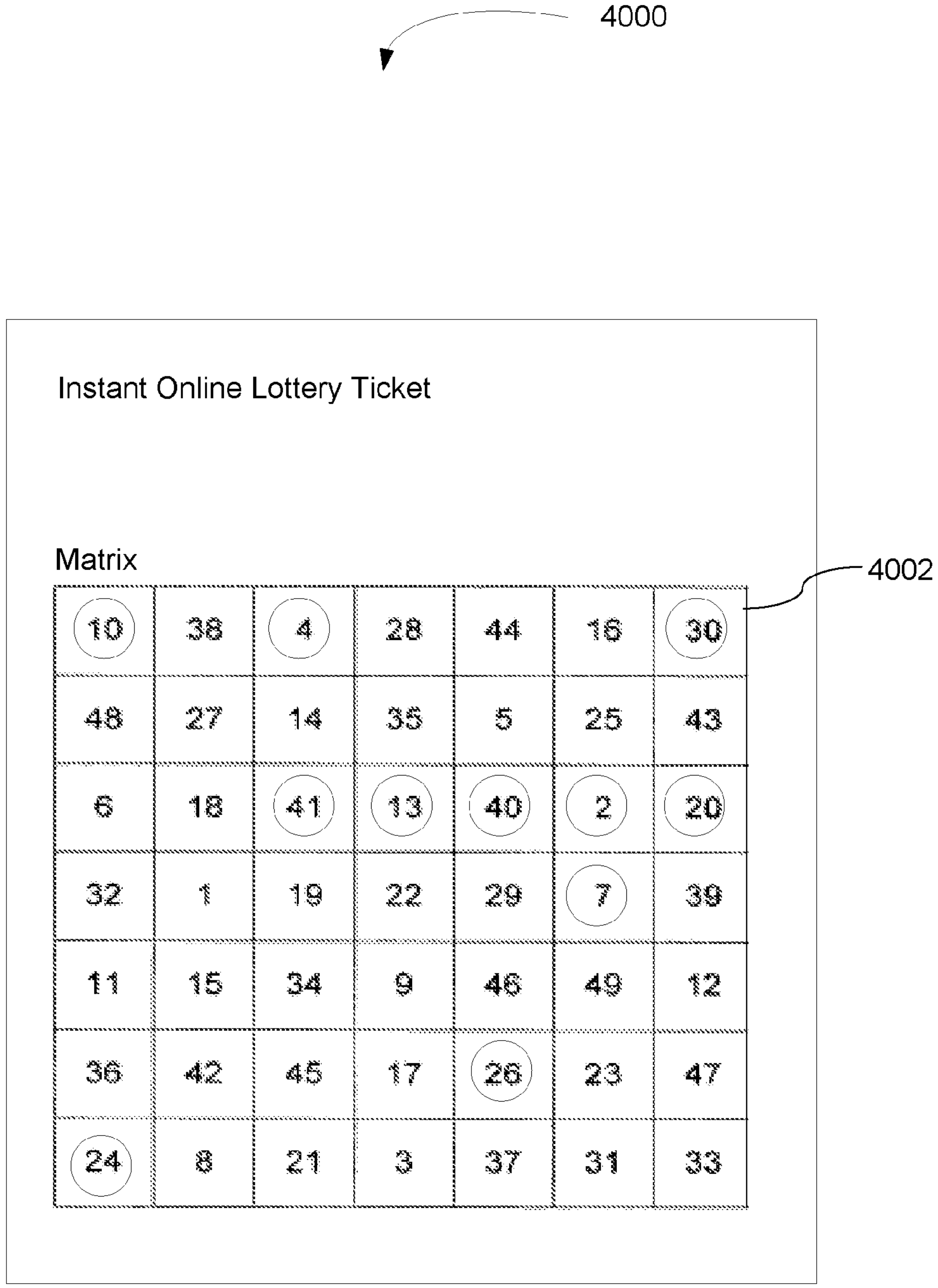
FIG. 40B illustrates an example of a lottery ticket for which a drawing is utilized for the linear game and a separate drawing is utilized for the non-linear game.

FIG. 40B illustrates an example of a lottery ticket 4000 for which a drawing is utilized for the linear game and a separate drawing is utilized for the non-linear game. As an example, the drawn game numbers for the linear game may be the numbers 24, 30, 41, 13, 40, 2, and 20, and the drawn game numbers for the non-linear game may be the numbers 10, 4, 7, and 26. Accordingly, a linear match is formed as the numbers 41, 13, 40, 2, and 20 are displayed as a row in the lottery matrix 4002. However, in one embodiment, a non-linear match is not formed as the numbers 30 and 24 are applicable only for linear matches and are not eligible as corners for a non-linear match. In another embodiment, the numbers from both drawings are eligible for linear and/or non-linear matches.

In one embodiment, the separate drawings do not have duplicate numbers. In other words, once numbers are selected for one drawing, they may not be selected for another drawing. As an example, if 24, 30, 41, 13, 40, 2, and 20 are drawn from 49 numbers for the linear game numbers, only 42 remaining numbers are available for a subsequent drawing for the non-linear game numbers. In another embodiment, the separate drawings may have duplicate numbers. In other words, once numbers are selected for one drawing, they may be selected again for another drawing. As an example, if 24, 30, 41, 13, 40, 2, and 20 are drawn from 49 numbers in a ball hopper for the linear game numbers, those numbers are placed back into the ball hopper for the drawing of the non-linear game numbers. As a result, a plurality of numbers may be drawn from the 49 numbers in the ball hopper, and some the plurality of numbers may be duplicative of numbers previously drawn for the linear game numbers.

Figure 41A:
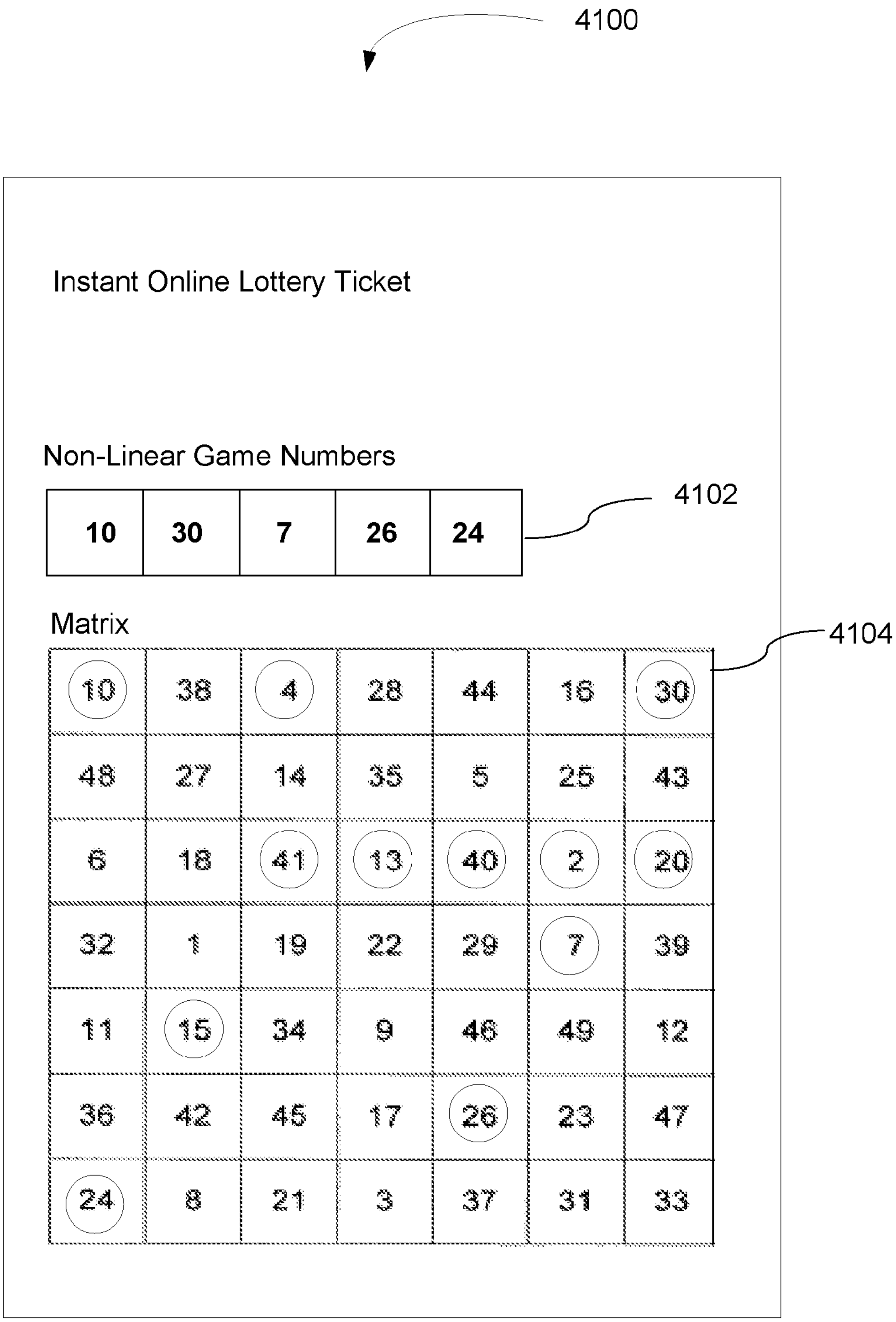
FIG. 41A illustrates an example of a lottery ticket for which a drawing game is utilized for the linear game and an instant game is the non-linear game.

In another embodiment, the lottery game may be a combination of a drawing game and an instant game. FIG. 41A illustrates an example of a lottery ticket 4100 for which a drawing game is utilized for the linear game and an instant game is the non-linear game. Accordingly, only the non-linear game numbers 4102 and the lottery matrix 4104 are provided to the player on the lottery ticket 4100 at the time that the lottery ticket 4100 is sold to the player. The player or a computer may then instantly determine whether the non-linear game prize has been won by determining whether a non-linear match of the non-linear game numbers 4102 is displayed in the lottery matrix 4104. However, the player waits until the linear game numbers are drawn to determine if a linear match is displayed in the lottery matrix 4104. In one embodiment, the non-linear game numbers are determined separately for each lottery ticket for an instant game. For example, the non-linear game numbers may be randomly generated or selected by a player at the time of purchase of the lottery ticket 4100. Accordingly, the non-linear game numbers may or may not be similar for different lottery tickets 4100. However, in one embodiment, the same linear game numbers for a drawing game are applicable to different lottery tickets 4100.

As an example, the non-linear game numbers 4102 may be the numbers 10, 30, 7, 26, and 24. As the lottery matrix 4104 has a corner for each of the numbers 10, 30, and 24, a non-linear match of three corners is displayed in the lottery matrix 4104. The player will instantly know if the non-linear prize has been won after purchase of the lottery ticket 4100. Further, these non-linear game numbers may be specifically selected for the particular lottery ticket 4100, and therefore, may or may not be the same as the non-linear game numbers on other lottery tickets. However, the lottery ticket 4100 does not have an indication of the linear game numbers as the linear game numbers are determined in a drawing that may occur a significant time period, e.g., minutes, hours, days, etc., after purchase of the lottery ticket. In one embodiment, once a drawing occurs, the same linear game numbers are applicable to the lottery tickets that have been sold rather than to a particular lottery ticket 4100. As an example, the linear game numbers may be the numbers 15, 41, 13, 40, 2, 4, and 20. Accordingly, the non-linear game numbers displayed in the lottery matrix 4104 may be marked with indicia, e.g., circles, by the player or a computer immediately after purchase of the lottery ticket 4100 and the linear game numbers may be later marked with indicia, e.g., circles, by the player or a computer after the purchase of the lottery ticket 4100 and a drawing of the linear game numbers.

In another embodiment, the determination of a winner of the non-linear game may be based on program parameters. For instance, a predetermined number of lottery tickets that have been provided, e.g., sold, may be a program parameter. As an example, every nth, e.g., one hundredth, lottery ticket that is sold may result in a win of the non-linear game prize. Accordingly, after a predetermined number of lottery tickets, e.g., ninety nine, have been sold, the lottery ticket consecutively sold after the predetermined number of lottery tickets, e.g., the one hundredth lottery ticket, results in a win of the non-linear game prize. At the time that the one hundred lottery ticket is sold, a set of non-linear game numbers 4102 may be specifically generated to provide a non-linear match in the lottery matrix 4104. For example, if the lottery ticket 4100 in FIG. 41A is a one hundredth lottery ticket sold, a computing device may randomly generate an assortment of the numbers 1-49, but specifically generate non-linear numbers 4102 such as the numbers 10, 30, 7, 26, and 24 to ensure a non-linear match. Alternatively, if the lottery ticket 4100 in FIG. 41A is a 100th lottery ticket sold, a computing device may randomly generate the non-linear game numbers 4102, but specifically generate an assortment of the numbers 1-49 in the lottery matrix 4104 to ensure a non-linear match, e.g., placing some of the non-linear game numbers such as the numbers 10, 30, and 24 in corner positions within the lottery matrix 4104.

In one configuration of an nth ticket implementation, a player may still have the possibility of winning the non-linear prize for a lottery ticket that is not an nth ticket. For example, a player with the 90th lottery ticket sold, as opposed to the 100th lottery ticket sold, may still win the non-linear prize if the non-linear game numbers are randomly generated to form a non-linear match. In an alternative configuration of the nth ticket implementation, the non-linear game numbers 4102 and/or the lottery matrix 4104 are specifically selected for non-nth lottery tickets to ensure that a non-linear match does not occur. As a result, a player in this configuration may only win the non-linear prize if the player purchased an nth ticket lottery ticket, e.g., 100th, 200th, 300th, etc.

Figure 41B:
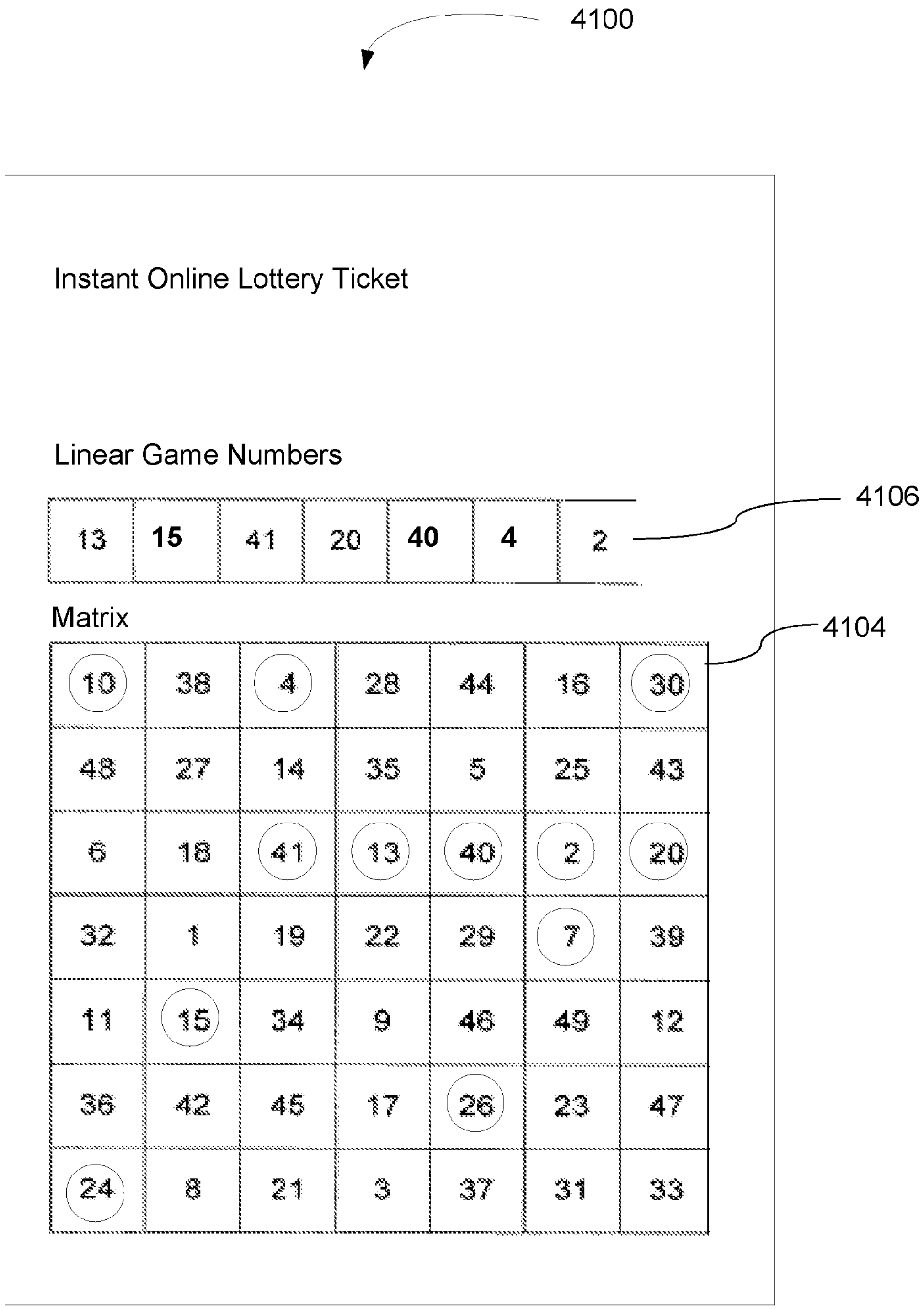
FIG. 41B illustrates an example of the lottery ticket of FIG. 41A for which an instant game is utilized for the linear game and a drawing game is utilized for the non-linear game.

FIG. 41B illustrates an example of the lottery ticket 4100 of FIG. 41A for which an instant game is utilized for the linear game and a drawing game is utilized for the non-linear game. Accordingly, only the linear game numbers 4106 and the lottery matrix 4104 are provided to the player on the lottery ticket 4100 at the time that the lottery ticket 4100 is sold to the player. The player or a computer may then instantly determine whether a linear game prize has been won by determining whether a linear match of the linear game numbers 4106 is displayed in the instant online game matrix 4104. However, the player waits until the non-linear game numbers are drawn to determine if a non-linear match is displayed in the lottery matrix 4104. In one embodiment, the linear game numbers are determined separately for each lottery ticket for an instant game. For example, the linear game numbers may be randomly generated or selected by a player at the time of purchase of the lottery ticket 4100. Accordingly, the linear game numbers may or may not be similar for different lottery tickets 4100. However, in one embodiment, the same non-linear game numbers for a drawing game are applicable to different lottery tickets 4100.

As an example, the linear game numbers 4106 may be the numbers 15, 41, 13, 40, 2, 4, and 20. As the lottery matrix 4104 has a row with the numbers 41, 13, 40, 2, and 20, a linear match is displayed is displayed in the lottery matrix 4104. The player will instantly know if the linear prize has been won after purchase of the lottery ticket. Further, these linear game numbers may be specifically selected for the particular lottery ticket 4100, and therefore, may or may not be the same as the linear game numbers on other lottery tickets. However, the lottery ticket 4100 does not have an indication of the non-linear game numbers as the non-linear game numbers are determined in a drawing that may occur a significant time period, e.g., minutes, hours, days, etc., after purchase of the lottery ticket 4100. In one embodiment, once a drawing occurs, the same non-linear game numbers are applicable to the lottery tickets that have been sold rather than to a particular lottery ticket 4100. As an example, the non-linear game numbers may be the numbers 10, 30, 7, 26, and 24.

In another embodiment, the determination of a winner of the linear game may be based on program parameters. For instance, a predetermined number of lottery tickets that have been provided, e.g., sold, may be a program parameter. As an example, every nth, e.g., one hundredth, lottery ticket that is sold may result in a win of the linear game prize. Accordingly, after a predetermined number of lottery tickets, e.g., ninety nine, have been sold, the lottery ticket consecutively sold after the predetermined number of lottery tickets, e.g., the one hundredth lottery ticket, results in a win of the linear game prize. At the time that the 100th lottery ticket is sold, a set of linear game numbers 4106 may be specifically generated to provide a linear match in the lottery matrix 4104. For example, if the lottery ticket 4100 in FIG. 41A is a 100th lottery ticket sold, a computing device may randomly generate an assortment of the numbers 1-49, but specifically generate linear numbers 4104 such as the numbers 13, 15, 41, 20, 40, 4, and 2 to ensure a non-linear match. Alternatively, if the lottery ticket 4100 in FIG. 41A is a 100th lottery ticket sold, a computing device may randomly generate the linear game numbers 4106, but specifically generate an assortment of the numbers 1-49 in the lottery matrix 4104 to ensure a linear match, e.g., placing some of the linear game numbers 4106 such as the numbers 41, 13, 40, 2, and 20 within the lottery matrix 4104.

In one configuration of an nth ticket implementation, a player may still have the possibility of winning the linear prize for a lottery ticket that is not an nth ticket. For example, a player with the 90th lottery ticket sold, as opposed to the 100th lottery ticket sold, may still win the linear prize if the linear game numbers 4106 are randomly generated to form a linear match. In an alternative configuration of the nth ticket implementation, the linear game numbers 4106 and/or the lottery matrix 4104 are specifically selected for non-nth lottery tickets to ensure that a linear match does not occur. As a result, a player in this configuration may only win the linear prize if the player purchased an nth ticket lottery ticket, e.g., 100th, 200th, 300th, etc.

Figure 42:
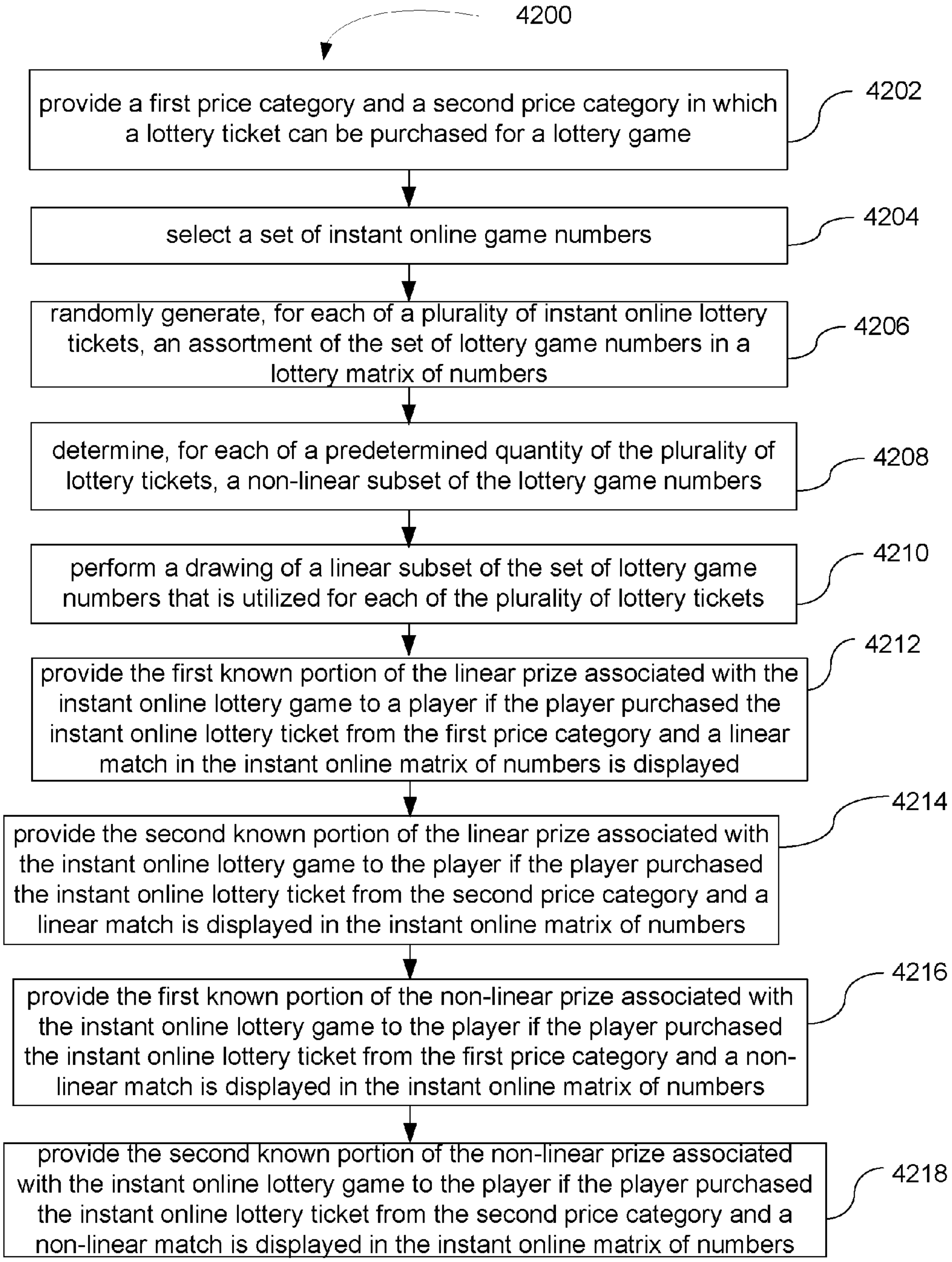
FIG. 42 illustrates a process that may be utilized to provide a lottery game.

FIG. 42 illustrates a process 4200 that may be utilized to provide a lottery game. At a process block 4202, the process 4200 provides a first price category and a second price category in which a lottery ticket can be purchased for a lottery game. The first price category is distinct from the second price category. The first price category corresponds to a first known portion of a linear prize and a first known portion of a non-linear prize associated with the lottery game. The second price category corresponds to a second known portion of a linear prize and a second known portion of a non-linear prize associated with the lottery game. The second known portion of the linear prize is more than the first known portion of the linear prize. Further, the second known portion of the non-linear prize is more than the first known portion of the non-linear prize. In addition, at a process block 4204, the process 4200 selects a set of lottery game numbers. At a process block 4206, the process 4200 randomly generates, for each of a plurality of lottery tickets, an assortment of the set of lottery game numbers in a lottery matrix of numbers. At a process block 4208, the process 4200 determines, for each of a predetermined quantity of the plurality of lottery tickets, a non-linear subset of the lottery game numbers. Further, at a process block 4210, the process 4200 performs a drawing of a linear subset of the set of lottery game numbers that is utilized for each of the plurality of lottery tickets. At a process block 4212, the process 4200 also provides the first known portion of the linear prize associated with the lottery game to a player if the player purchased the lottery ticket from the first price category and a linear match in the lottery matrix of numbers is displayed. The linear match is a linear display in the lottery matrix of numbers of at least a predetermined quantity of numbers from the linear subset. Further, at a process block 4214, the process 4200 provides the second known portion of the linear prize associated with the lottery game to the player if the player purchased the lottery ticket from the second price category and a linear match is displayed in the lottery matrix of numbers. In addition, at a process block 4216, the process 4200 provides the first known portion of the non-linear prize associated with the lottery game to the player if the player purchased the lottery ticket from the first price category and a non-linear match is displayed in the lottery matrix of numbers, the non-linear match being a predetermined arrangement of numbers in the non-linear subset that is a display in the lottery matrix of numbers. The quantity of numbers in the predetermined arrangement of numbers is less than the predetermined quantity of numbers. In addition, at a process block 4218, the process 4200 provides the second known portion of the non-linear prize associated with the lottery game to the player if the player purchased the lottery ticket from the second price category and a non-linear match is displayed in the lottery matrix of numbers.

A variety of prize structures may be utilized for the combination of a drawing and nth ticket game. Further, a variety of drawing prize structures may be utilized for multiple drawing games. For example, the instant online prize structure 3800 as shown in FIG. 38 may be utilized as a prize structure for these configurations.

The variable and/or constant ratio configurations may be utilized with any of the configurations discussed above. Further any of the drawing based games may be implemented or played as a monitor game. In other words, a display apparatus may be provided in a display area so that multiple viewers may watch a video presentation of the drawing. The video presentation may be interspersed with games other than those described herein.

Although certain illustrative embodiments and methods have been disclosed herein, it will be apparent form the foregoing disclosure to those skilled in the art that variations and modifications of such embodiments and methods can be made without departing from the true spirit and scope of the art disclosed. Many other examples of the art disclosed exist, each differing from others in matters of detail only. For instance, various variations of matrices can be utilized, such as a four-by-four matrix, a five-by-five matrix, a six-by-six matrix, a nine-by-nine matrix, etc. Further, other arrangements of numbers may be utilized other than a matrix such as a circular configuration or a triangular configuration. Further, different prize distributions, price categories, and the various features of the lottery game and the instant game can be combined into discrete lottery configurations.

Finally, it will also be apparent to one skilled in the art that other indicia can be printed on a lottery ticket such as advertising, media, news, coupons, passes to events, etc. Accordingly, it is intended that the art disclosed shall be limited only to the extent required by the appended claims and the rules and principles of applicable law.

We claim:

1. A method comprising:

providing a first price category and a second price category in which a lottery ticket can be purchased for a lottery game, the first price category being distinct from the second price category, the first price category corresponding to a first known portion of a linear prize and a first known portion of a non-linear prize associated with the lottery game, the second price category corresponding to a second known portion of a linear prize and a second known portion of a non-linear prize associated with the lottery game, the second known portion of the linear prize being more than the first known portion of the linear prize, the second known portion of the non-linear prize being more than the first known portion of the non-linear prize;

selecting a set of lottery game numbers;

randomly generating, for each of a plurality of lottery tickets, an assortment of the set of lottery game numbers in a lottery matrix of numbers with a processor;

determining, for each of a predetermined quantity of the plurality of lottery tickets, a non-linear subset of the lottery game numbers;

performing a drawing of a linear subset of the set of lottery game numbers that is utilized for each of the plurality of lottery tickets;

providing the first known portion of the linear prize associated with the lottery game to a player if the player purchased the lottery ticket from the first price category and a linear match in the lottery matrix of numbers is displayed, the linear match being a linear display in the lottery matrix of numbers of at least a predetermined quantity of numbers from the linear subset;

providing the second known portion of the linear prize associated with the lottery game to the player if the player purchased the lottery ticket from the second price category and a linear match is displayed in the lottery matrix of numbers;

providing the first known portion of the non-linear prize associated with the lottery game to the player if the player purchased the lottery ticket from the first price category and a non-linear match is displayed in the lottery matrix of numbers, the non-linear match being a predetermined arrangement of numbers in the non-linear subset that is a display in the lottery matrix of numbers, the quantity of numbers in the predetermined arrangement of numbers being less than the predetermined quantity of numbers; and providing the second known portion of the non-linear prize associated with the lottery game to the player if the player purchased the lottery ticket from the second price category and a non-linear match is displayed in the lottery matrix of numbers.

2. The method of claim 1, wherein the predetermined quantity of numbers equals four.

3. The method of claim 1, wherein the lottery game is implemented as a monitor game.

4. The method of claim 1, wherein the determining the non-linear subset of the set of lottery game numbers is randomly generating the non-linear subset of the set of lottery game numbers.

5. The method of claim 1, wherein the determining the non-linear subset of the set of lottery game numbers is receiving a selection of the non-linear subset of the set of lottery game numbers from the player.

6. The method of claim 1, wherein the linear prize is more than the non-linear prize.

7. The method of claim 1, wherein the non-linear prize is more than the linear prize.

8. The method of claim 1, wherein a variable ratio is established between the first price category and the second price category for distribution of the linear prize.

9. The method of claim 1, wherein a constant ratio is established between the first price category and the second price category for distribution of the linear prize.

10. The method of claim 1, wherein a variable ratio is established between the first price category and the second price category for distribution of the non-linear prize.

11. The method of claim 1, wherein a constant ratio is established between the first price category and the second price category for distribution of the non-linear prize.

12. The method of claim 1, wherein the linear match includes a consecutive linear display in the lottery matrix of a plurality of numbers in the linear subset.

13. The method of claim 1, wherein the linear match includes a non-consecutive linear display in the lottery matrix of a plurality of numbers in the linear subset such that a number that is not within the linear subset is between numbers that are within the linear subset.

14. The method of claim 1, wherein the non-linear match includes a plurality of corners in the lottery matrix of numbers of a plurality of numbers in the non-linear subset.

15. The method of claim 1, wherein the non-linear match includes a plurality of corners a center number in the lottery matrix of numbers.

16. The method of claim 1, wherein the prize is a fixed prize.

17. The method of claim 1, wherein the prize is a progressive prize.

18. The method of claim 1, wherein the prize is guaranteed by a third party.

19. The method of claim 1, wherein the linear match is a row in the lottery matrix.

20. The method of claim 1, wherein the linear match is a portion of a row in the lottery matrix.

21. The method of claim 1, wherein the linear match is a column in the lottery matrix.

22. The method of claim 1, wherein the linear match is a portion of a column in the lottery matrix.

23. The method of claim 1, wherein the linear match is a diagonal in the lottery matrix.

24. The method of claim 1, wherein the linear match is a portion of a diagonal in the lottery matrix.

25. A method comprising:

providing, with a processor, a first price category and a second price category in which a lottery ticket can be purchased for a lottery game, the first price category being distinct from the second price category, the first price category corresponding to a first known portion of a linear prize and a first known portion of a non-linear prize associated with the lottery game, the second price category corresponding to a second known portion of a linear prize and a second known portion of a non-linear prize associated with the lottery game, the second known portion of the linear prize being more than the first known portion of the linear prize, the second known portion of the non-linear prize being more than the first known portion of the non-linear prize;

selecting a set of lottery game numbers;

randomly generating, for each of a plurality of lottery tickets, an assortment of the set of lottery game numbers in a lottery matrix of numbers;

determining, for each of a predetermined quantity of the plurality of lottery tickets, a non-linear subset of the lottery game numbers;

selecting, for a lottery ticket provided consecutively after the predetermined quantity of lottery tickets, a non-linear subset of the set of lottery game numbers that results in a non-linear match, the non-linear match being a predetermined arrangement of numbers in the non-linear subset that is a display in the lottery matrix of numbers, the quantity of numbers in the predetermined arrangement of numbers being less than a predetermined quantity of numbers;

performing a drawing of a linear subset of the set of lottery game numbers that is utilized for each of the plurality of lottery tickets;

providing the first known portion of the linear prize associated with the lottery game to a player if the player purchased the lottery ticket from the first price category and a linear match in the lottery matrix of numbers is displayed, the linear match being a linear display in the lottery matrix of numbers of at least the predetermined quantity of numbers from the linear subset;

providing the second known portion of the linear prize associated with the lottery game to the player if the player purchased the lottery ticket from the second price category and a linear match is displayed in the lottery matrix of numbers;

providing the first known portion of the non-linear prize associated with the lottery game to the player if the player purchased the lottery ticket from the first price category and a non-linear match is displayed in the lottery matrix of numbers; and providing the second known portion of the non-linear prize associated with the lottery game to the player if the player purchased the lottery ticket from the second price category and a non-linear match is displayed in the lottery matrix of numbers.

26. The method of claim 25, wherein the predetermined quantity of numbers equals four.

27. The method of claim 25, wherein the lottery game is implemented as a monitor game.

28. The method of claim 25, wherein a variable ratio is established between the first price category and the second price category for distribution of the linear prize.

29. The method of claim 25, wherein a constant ratio is established between the first price category and the second price category for distribution of the linear prize.

30. The method of claim 25, wherein a variable ratio is established between the first price category and the second price category for distribution of the non-linear prize.

31. The method of claim 25, wherein a constant ratio is established between the first price category and the second price category for distribution of the non-linear prize.

32. The method of claim 25, wherein the determining, for each of a predetermined quantity of the plurality of lottery tickets, a non-linear subset of the lottery game numbers randomly generates a non-linear subset.

33. The method of claim 25, wherein the determining, for each of a predetermined quantity of the plurality of lottery tickets, a non-linear subset of the lottery game numbers selects a non-linear subset such that a non-linear match does not occur.

34. A method comprising:

providing a first price category and a second price category in which a lottery ticket can be purchased for a lottery game, the first price category being distinct from the second price category, the first price category corresponding to a first known portion of a linear prize and a first known portion of a non-linear prize associated with the lottery game, the second price category corresponding to a second known portion of a linear prize and a second known portion of a non-linear prize associated with the lottery game, the second known portion of the linear prize being more than the first known portion of the linear prize, the second known portion of the non-linear prize being more than the first known portion of the non-linear prize;

selecting a set of lottery game numbers;

determining, for each of a predetermined quantity of a plurality of lottery tickets, an assortment of the set of lottery game numbers in a lottery matrix of numbers;

randomly generating, for each of the predetermined quantity of the plurality of lottery tickets and a lottery ticket that is provided consecutively after the predetermined quantity of the plurality of lottery tickets, a non-linear subset of the lottery game numbers with a processor;

select, for the lottery ticket that is provided consecutively after the predetermined quantity of the plurality of lottery tickets, an assortment of the set of lottery game numbers in the lottery matrix of numbers such that a non-linear match is displayed for the non-linear subset of the lottery game numbers randomly generated for the lottery ticket that is provided consecutively after the predetermined quantity of the plurality of lottery tickets, the non-linear match being a predetermined arrangement of numbers in the non-linear subset that is a display in the lottery matrix of numbers, the quantity of numbers in the predetermined arrangement of numbers being less than a predetermined quantity of numbers;

performing a drawing of a linear subset of the set of lottery game numbers that is utilized for each of the plurality of lottery tickets;

providing the first known portion of the linear prize associated with the lottery game to a player if the player purchased the lottery ticket from the first price category and a linear match in the lottery matrix of numbers is displayed, the linear match being a linear display in the lottery matrix of numbers of at least the predetermined quantity of numbers from the linear subset;

providing the second known portion of the linear prize associated with the lottery game to the player if the player purchased the lottery ticket from the second price category and a linear match is displayed in the lottery matrix of numbers; and providing the first known portion of the non-linear prize associated with the lottery game to the player if the player purchased the lottery ticket from the first price category and a non-linear match is displayed in the lottery matrix of numbers; and providing the second known portion of the non-linear prize associated with the lottery game to the player if the player purchased the lottery ticket from the second price category and a non-linear match is displayed in the lottery matrix of numbers.

35. The method of claim 34, wherein the predetermined quantity of numbers equals four.

36. The method of claim 34, wherein the lottery game is implemented as a monitor game.

37. The method of claim 34, wherein a variable ratio is established between the first price category and the second price category for distribution of the linear prize.

38. The method of claim 34, wherein a constant ratio is established between the first price category and the second price category for distribution of the linear prize.

39. The method of claim 34, wherein a variable ratio is established between the first price category and the second price category for distribution of the non-linear prize.

40. The method of claim 34, wherein a constant ratio is established between the first price category and the second price category for distribution of the non-linear prize.

41. The method of claim 34, wherein the determining, for each of a predetermined quantity of a plurality of lottery tickets, an assortment of the set of lottery game numbers in the lottery matrix of numbers randomly generates an assortment of the set of lottery game numbers in the lottery matrix of numbers.

42. The method of claim 34, wherein the determining, for each of a predetermined quantity of a plurality of lottery tickets, an assortment of the set of lottery game numbers in the lottery matrix of numbers selects an assortment of the set of lottery game numbers in the lottery matrix of numbers such that a non-linear match does not occur.

43. A method comprising:

providing a first price category and a second price category in which a lottery ticket can be purchased for a lottery game, the first price category being distinct from the second price category, the first price category corresponding to a first known portion of a linear prize and a first known portion of a non-linear prize associated with the lottery game, the second price category corresponding to a second known portion of a linear prize and a second known portion of a non-linear prize associated with the lottery game, the second known portion of the linear prize being more than the first known portion of the linear prize, the second known portion of the non-linear prize being more than the first known portion of the non-linear prize;

selecting a set of lottery game numbers;

randomly generating an assortment of the set of lottery game numbers in a lottery matrix of numbers with a processor;

determining a subset of the set of lottery game numbers;

performing a drawing of a subset of the set of lottery game numbers that is utilized for each of the plurality of lottery tickets;

providing the first known portion of the linear prize associated with the lottery game to a player if the player purchased the lottery ticket from the first price category and a linear match in the lottery matrix of numbers is displayed, the linear match being a linear display in the lottery matrix of numbers of at least the predetermined quantity of numbers from the subset;

providing the second known portion of the linear prize associated with the lottery game to the player if the player purchased the lottery ticket from the second price category and a linear match is displayed in the lottery matrix of numbers; and providing the first known portion of the non-linear prize associated with the lottery game to the player if the player purchased the lottery ticket from the first price category and a non-linear match in the lottery matrix of numbers is displayed, the non-linear match being a predetermined arrangement of numbers from the plurality of numbers in the subset that is not a linear display in the lottery matrix of numbers of at least the predetermined quantity of numbers from the subset; and providing the second known portion of the non-linear prize associated with the lottery game to the player if the player purchased the lottery ticket from the second price category and a non-linear match is displayed in the lottery matrix of numbers.

44. The method of claim 43, wherein the predetermined quantity of numbers equals four.

45. The method of claim 43, wherein the lottery game is implemented as a monitor game.

46. The method of claim 43, wherein a variable ratio is established between the first price category and the second price category for distribution of the linear prize.

47. The method of claim 43, wherein a constant ratio is established between the first price category and the second price category for distribution of the linear prize.

48. The method of claim 43, wherein a variable ratio is established between the first price category and the second price category for distribution of the non-linear prize.

49. The method of claim 43, wherein a constant ratio is established between the first price category and the second price category for distribution of the non-linear prize.

50. A method comprising:

providing a first price category and a second price category in which a lottery ticket can be purchased for a lottery game, the first price category being distinct from the second price category, the first price category corresponding to a first known portion of a linear prize and a first known portion of a non-linear prize associated with the lottery game, the second price category corresponding to a second known portion of a linear prize and a second known portion of a non-linear prize associated with the lottery game, the second known portion of the linear prize being more than the first known portion of the linear prize, the second known portion of the non-linear prize being more than the first known portion of the non-linear prize;

selecting a set of lottery game numbers;

randomly generating an assortment of the set of lottery game numbers in a lottery matrix of numbers with a processor;

determining a subset of the set of lottery game numbers;

performing a drawing of a linear subset of the set of lottery game numbers that is utilized for each of the plurality of lottery tickets;

performing a drawing of a non-linear subset of the set of lottery game numbers that is utilized for each of the plurality of lottery tickets;

providing the first known portion of the linear prize associated with the lottery game to a player if the player purchased the lottery ticket from the first price category and a linear match in the lottery matrix of numbers is displayed, the linear match being a linear display in the lottery matrix of numbers of at least the predetermined quantity of numbers from the linear subset;

providing the second known portion of the linear prize associated with the lottery game to the player if the player purchased the lottery ticket from the second price category and a linear match is displayed in the lottery matrix of numbers; and providing the first known portion of the non-linear prize associated with the lottery game to the player if the player purchased the lottery ticket from the first price category and a non-linear match in the lottery matrix of numbers is displayed, the non-linear match being a predetermined arrangement of numbers from the plurality of numbers in the subset that is not a linear display in the lottery matrix of numbers of at least the predetermined quantity of numbers from the non-linear subset; and providing the second known portion of the non-linear prize associated with the lottery game to the player if the player purchased the lottery ticket from the second price category and a non-linear match is displayed in the lottery matrix of numbers.

51. The method of claim 50, wherein the predetermined quantity of numbers equals four.

52. The method of claim 50, wherein the lottery game is implemented as a monitor game.

53. The method of claim 50, wherein a variable ratio is established between the first price category and the second price category for distribution of the linear prize.

54. The method of claim 50, wherein a constant ratio is established between the first price category and the second price category for distribution of the linear prize.

55. The method of claim 50, wherein a variable ratio is established between the first price category and the second price category for distribution of the non-linear prize.

56. The method of claim 50, wherein a constant ratio is established between the first price category and the second price category for distribution of the non-linear prize.

57. An apparatus comprising:

a price category module that provides a first price category and a second price category in which a lottery ticket can be purchased for a lottery game, the first price category being distinct from the second price category, the first price category corresponding to a first known portion of a linear prize and a first known portion of a non-linear prize associated with the lottery game, the second price category corresponding to a second known portion of a linear prize and a second known portion of a non-linear prize associated with the lottery game, the second known portion of the linear prize being more than the first known portion of the linear prize, the second known portion of the non-linear prize being more than the first known portion of the non-linear prize;

a selection module that selects a set of lottery game numbers;

a first random number generator that randomly generates, for each of a plurality of lottery tickets, an assortment of the set of lottery game numbers in a lottery matrix of numbers;

a second random number generator that randomly generates, for each of a predetermined quantity of the plurality of lottery tickets, a non-linear subset of the lottery game numbers;

a drawing module that performs a drawing of a linear subset of the set of lottery game numbers that is utilized for each of the plurality of lottery tickets; and a prize distribution module that provides first known portion of the linear prize associated with the lottery game to a player if the player purchased the lottery ticket from the first price category and a linear match in the lottery matrix of numbers is displayed, the linear match being a linear display in the lottery matrix of numbers of at least a predetermined quantity of numbers from the linear subset, provides the second known portion of the linear prize associated with the lottery game to the player if the player purchased the lottery ticket from the second price category and a linear match is displayed in the lottery matrix of numbers, provides the first known portion of the non-linear prize associated with the lottery game to the player if the player purchased the lottery ticket from the first price category and a non-linear match is displayed in the lottery matrix of numbers, the non-linear match being a predetermined arrangement of numbers in the non-linear subset that is a display in the lottery matrix of numbers, the quantity of numbers in the predetermined arrangement of numbers being less than the predetermined quantity of numbers, and provides the second known portion of the non-linear prize associated with the lottery game to the player if the player purchased the lottery ticket from the second price category and a non-linear match is displayed in the lottery matrix of numbers.

58. The apparatus of claim 57, wherein the predetermined quantity of numbers equals four.

59. The apparatus of claim 57, wherein the lottery game is implemented as a monitor game.

60. The apparatus of claim 57, wherein a variable ratio is established between the first price category and the second price category for distribution of the linear prize.

61. The apparatus of claim 57, wherein a constant ratio is established between the first price category and the second price category for distribution of the linear prize.

62. The apparatus of claim 57, wherein a variable ratio is established between the first price category and the second price category for distribution of the non-linear prize.

63. The apparatus of claim 57, wherein a constant ratio is established between the first price category and the second price category for distribution of the non-linear prize.

64. A computer program product comprising a computer useable storage device having a computer readable program, wherein the computer readable program when executed on a computer causes the computer to:

provide a first price category and a second price category in which a lottery ticket can be purchased for a lottery game, the first price category being distinct from the second price category, the first price category corresponding to a first known portion of a linear prize and a first known portion of a non-linear prize associated with the lottery game, the second price category corresponding to a second known portion of a linear prize and a second known portion of a non-linear prize associated with the lottery game, the second known portion of the linear prize being more than the first known portion of the linear prize, the second known portion of the non-linear prize being more than the first known portion of the non-linear prize;

select a set of lottery game numbers;

randomly generate, for each of a plurality of lottery tickets, an assortment of the set of lottery game numbers in a lottery matrix of numbers with a processor;

determine, for each of a predetermined quantity of the plurality of lottery tickets, a non-linear subset of the lottery game numbers;

perform a drawing of a linear subset of the set of lottery game numbers that is utilized for each of the plurality of lottery tickets;

provide the first known portion of the linear prize associated with the lottery game to a player if the player purchased the lottery ticket from the first price category and a linear match in the lottery matrix of numbers is displayed, the linear match being a linear display in the lottery matrix of numbers of at least a predetermined quantity of numbers from the linear subset;

provide the second known portion of the linear prize associated with the lottery game to the player if the player purchased the lottery ticket from the second price category and a linear match is displayed in the lottery matrix of numbers;

provide the first known portion of the non-linear prize associated with the lottery game to the player if the player purchased the lottery ticket from the first price category and a non-linear match is displayed in the lottery matrix of numbers, the non-linear match being a predetermined arrangement of numbers in the non-linear subset that is a display in the lottery matrix of numbers, the quantity of numbers in the predetermined arrangement of numbers being less than the predetermined quantity of numbers; and provide the second known portion of the non-linear prize associated with the lottery game to the player if the player purchased the lottery ticket from the second price category and a non-linear match is displayed in the lottery matrix of numbers.

65. The computer program product of claim 64, wherein the predetermined quantity of numbers equals four.

66. The computer program product of claim 64, wherein the lottery game is implemented as a monitor game.

67. The computer program product of claim 64, wherein a variable ratio is established between the first price category and the second price category for distribution of the linear prize.

68. The computer program product of claim 64, wherein a constant ratio is established between the first price category and the second price category for distribution of the linear prize.

69. The computer program product of claim 64, wherein a variable ratio is established between the first price category and the second price category for distribution of the non-linear prize.

70. The computer program product of claim 64, wherein a constant ratio is established between the first price category and the second price category for distribution of the non-linear prize.

* * * * *